(12) United States Patent
Jhu et al.

(10) Patent No.: US 12,526,412 B2
(45) Date of Patent: Jan. 13, 2026

(54) RESIDUAL AND COEFFICIENTS CODING FOR VIDEO CODING

(71) Applicant: BEIJING DAJIA INTERNET INFORMATION TECHNOLOGY CO., LTD., Beijing (CN)

(72) Inventors: Hong-Jheng Jhu, San Diego, CA (US); Xiaoyu Xiu, San Diego, CA (US); Yi-Wen Chen, San Diego, CA (US); Wei Chen, San Diego, CA (US); Che-Wei Kuo, Beijing (CN); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 81 days.

Patent file contains an affidavit/declaration under 37 CFR 1.130(b).

(21) Appl. No.: 18/384,828

(22) Filed: Oct. 27, 2023

(65) Prior Publication Data

US 2024/0179314 A1     May 30, 2024

Related U.S. Application Data

(63) Continuation of application No. PCT/US2022/026598, filed on Apr. 27, 2022.
(Continued)

(51) Int. Cl.
*H04N 19/12*     (2014.01)
*H04N 19/174*     (2014.01)
(Continued)

(52) U.S. Cl.
CPC ........... *H04N 19/12* (2014.11); *H04N 19/174* (2014.11); *H04N 19/18* (2014.11); *H04N 19/70* (2014.11)

(58) Field of Classification Search
CPC ...... H04N 19/174; H04N 19/12; H04N 19/18; H04N 19/70
See application file for complete search history.

(56) References Cited

U.S. PATENT DOCUMENTS

| 9,918,105 | B2 | 3/2018 | Pang et al. |
| 9,936,200 | B2 | 4/2018 | Sole Rojals et al. |

(Continued)

FOREIGN PATENT DOCUMENTS

| CN | 112118456 A | 12/2020 |
| CN | 112543326 A | 3/2021 |

(Continued)

OTHER PUBLICATIONS

"Jhu et al., Slice based Rice parameter selection for transform skip residual coding, JVET 20th meeting, Oct. 7-16, 2020" (Year: 2020).*

(Continued)

*Primary Examiner* — Zhubing Ren
(74) *Attorney, Agent, or Firm* — Arch & Lake LLP

(57) ABSTRACT

Methods, apparatuses, and non-transitory computer-readable storage mediums are provided for video coding. The method includes: in response to determining that transform skip is disabled, disabling, by a decoder, a presence of a rice parameter for transform skip residual coding. The method may further include adopting a flag of transform skip, sps_transform_skip_enabled_flag, to condition a presence of sps_ts_residual_coding_rice_present_in_sh_flag.

17 Claims, 18 Drawing Sheets

Related U.S. Application Data

(60) Provisional application No. 63/181,110, filed on Apr. 28, 2021.

(51) Int. Cl.
    *H04N 19/18*     (2014.01)
    *H04N 19/70*     (2014.01)

(56) References Cited

U.S. PATENT DOCUMENTS

| | | | |
|---|---|---|---|
| 10,021,419 | B2 | 7/2018 | Karczewicz et al. |
| 2014/0307800 | A1* | 10/2014 | Sole Rojals ......... H04N 19/176 375/240.18 |
| 2015/0016537 | A1 | 1/2015 | Karczewicz et al. |
| 2017/0064336 | A1* | 3/2017 | Zhang ................. H04N 19/122 |
| 2018/0115787 | A1 | 4/2018 | Koo et al. |
| 2020/0177882 | A1* | 6/2020 | Yoo ........................ H04N 19/18 |
| 2020/0404040 | A1 | 12/2020 | Auyeung et al. |
| 2021/0105491 | A1 | 4/2021 | Karczewicz et al. |
| 2021/0266598 | A1* | 8/2021 | Hashimoto .......... H04N 19/176 |

FOREIGN PATENT DOCUMENTS

| | | |
|---|---|---|
| RU | 2643655 C2 | 2/2018 |
| WO | 2020228673 A1 | 11/2020 |
| WO | 2021040319 A1 | 3/2021 |
| WO | 2021067278 A1 | 4/2021 |
| WO | 2021138353 A1 | 7/2021 |
| WO | 2022147570 A1 | 7/2022 |
| WO | 2022268608 A2 | 12/2022 |

OTHER PUBLICATIONS

International Search Report of PCT Application No. PCT/US2022/026598 dated Aug. 9, 2022, (3p).

Hong-Jheng Jhu, et al., "CE-2.1: Slice based Rice parameter selection for transform skip residual coding", Joint Video Experts Team (JVET), Document: JVET-V0054, of ITU-T SG 16 WP 3 and ISO/IEC JTC 1/SC 29 22nd Meeting, by teleconference, Apr. 20-28, 2021 (7p).

Benjamin Bross, et al.,"Versatile Video Coding Editorial Refinements on Draft 10", Joint Video Experts Team (JVET), Document: JVET-T2001-v2, of ITU-T SG 16 WP 3 and ISO/IEC JTC 1/SC 29 20th Meeting, by teleconference, Oct. 7-16, 2020,(512p).

Jianle Chen et al., "Algorithm description for Versatile Video Coding and Test Model 12 (VTM 12)", Joint Video Experts Team (JVET) of ITU-T SG 16 WP 3 and ISO/IEC JTC 1/SC 29, 21st Meeting, by teleconference, Jan. 6-15, 2021, Document: JVET-U2002-v1 (102p).

Hong-Jheng Jhu et al., "CE-2.1: Slice based Rice parameter selection for transform skip residual coding", Joint Video Experts Team (JVET) of ITU-T SG 16 WP 3 and ISO/IEC JTC 1/SC 29, JVET-V0054, 22nd Meeting, by teleconference, Apr. 20-28, 2021, (6p).

Jhu, Hong-Jheng et al., "CE-2.1: Slice based Rice parameter selection for transform skip residual coding," Joint Video Experts Team (JVET) of ITU-T SG 16 WP 3 and ISO/IEC JTC 1/SC 29, JVET-U0075-v2, 21st Meeting by Teleconference Jan. 6-15, 2021, (6p).

* cited by examiner

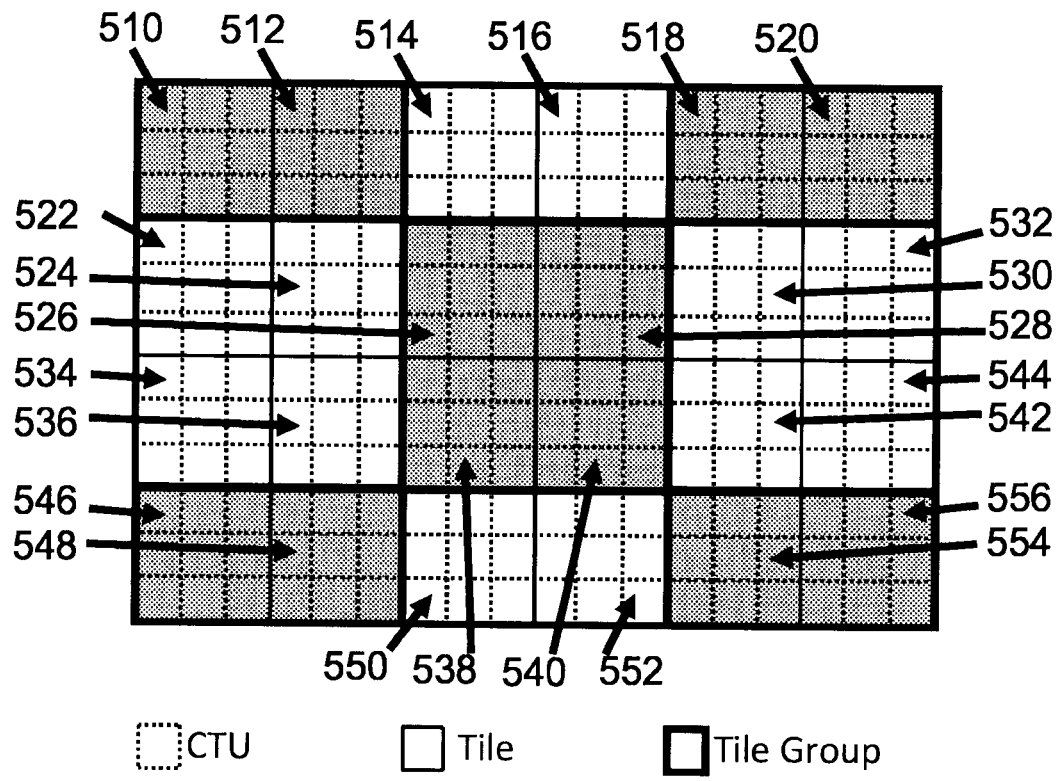
FIG. 5
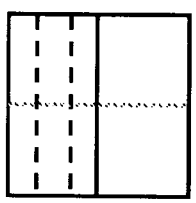
FIG. 6A
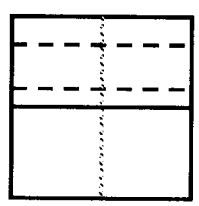
FIG. 6B
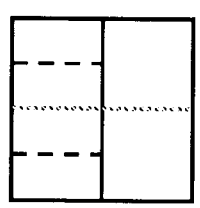
FIG. 6C
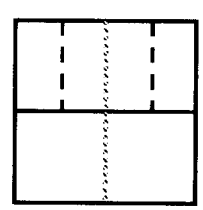
FIG. 6D
FIG. 6E
FIG. 6F
FIG. 6G
FIG. 6H

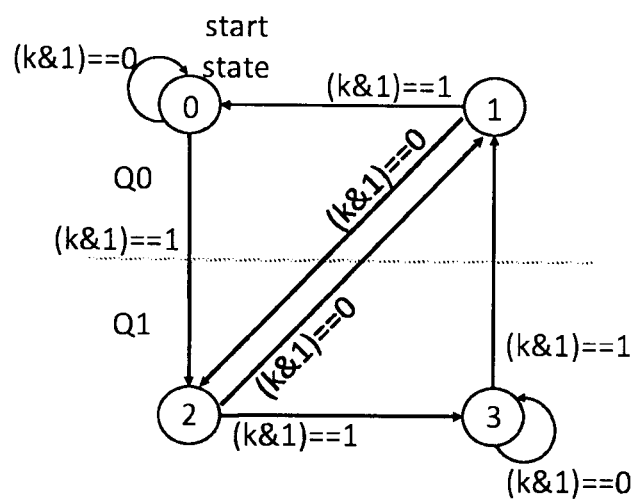
FIG. 10A    FIG. 10B
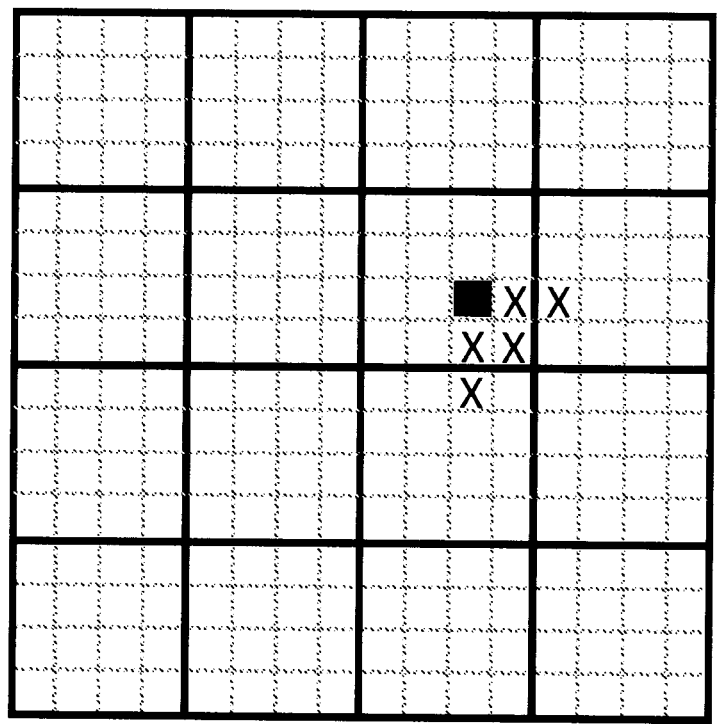
FIG. 11

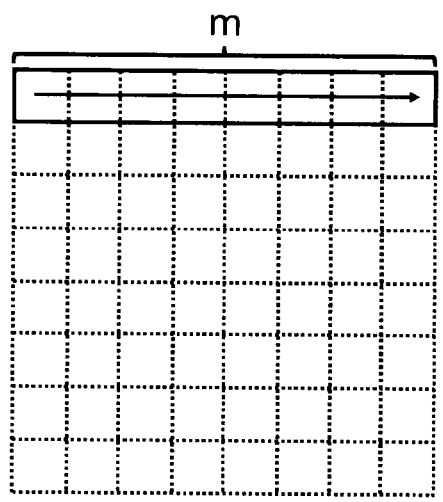
FIGS. 14A
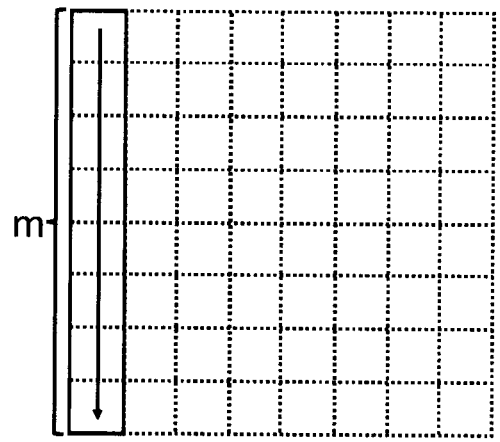
FIGS. 14B
FIGS. 15A
FIGS. 15B

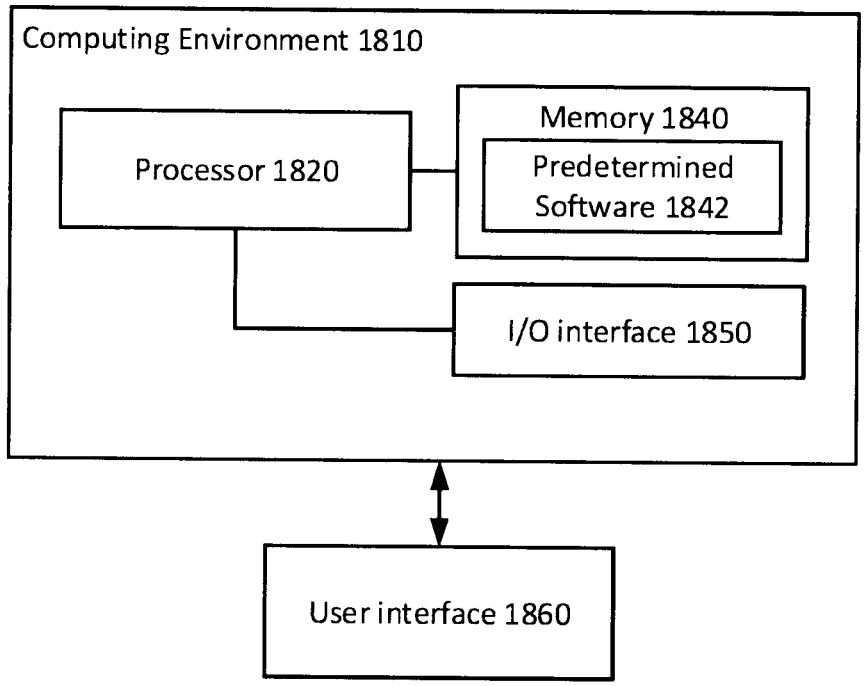

FIG. 18

| Receiving, by a decoder, a Sequence Parameter Set (SPS) range extension flag that indicates whether a syntax structure, sps_range_extension, is present in Slice Head (SH) Raw Byte Sequence Payload (RBSP) syntax structures based on a value of the SPS range extension flag  1902 |

↓

| In response to determining that the value of the SPS range extension flag equals to 1, determining that the sps_range_extension is present in the SH RBSP syntax structures  1904 |

↓

| In response to determining that the value of the range extension flag equals to 0, determining that the sps_range_extension is not present in the SH RBSP syntax structures  1906 |

FIG. 19

RESIDUAL AND COEFFICIENTS CODING FOR VIDEO CODING

CROSS-REFERENCE TO RELATED APPLICATION

This application is a continuation application of PCT application No. PCT/US2022/026598 filed on Apr. 27, 2022, which is based upon and claims priority to Provisional Applications No. 63/181,110 filed on Apr. 28, 2021, the entire content of which is incorporated herein by reference for all purposes.

TECHNICAL FIELD

This disclosure is related to video coding and compression. More specifically, this disclosure relates to the improvements and simplifications of the residual and coefficients coding for video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

Examples of the present disclosure provide methods and apparatus for video coding.

According to a first aspect of the present disclosure, a method for video coding is provided. The method may include: in response to determining that transform skip is disabled, disabling, by a decoder, a presence of a rice parameter for transform skip residual coding.

According to a second aspect of the present disclosure, a method for video coding is provided. The method may include: receiving, by a decoder, a Sequence Parameter Set (SPS) alignment enabled flag that indicates whether an index, ivlCurrRange, is aligned prior to bypass decoding of syntax elements sb_coded_flag, abs_remainder, dec_abs_level, and coeff_sign_flagn based on a value of the SPS alignment enabled.

According to a third aspect of the present disclosure, a method for video coding is provided. The method may include: receiving, by a decoder, an extended precision processing flag that indicates whether an extended dynamic range is adopted for transform coefficients and during transform processing based on a value of the extended precision processing flag.

According to a fourth aspect of the present disclosure, a method for video coding is provided. The method may include: receiving, by a decoder, a persistent rice adaption enabled flag that indicates whether a rice parameter derivation for binarization of abs_remaining and dec_abs_level is initialized at start of each sub-block adopting mode dependent statistics accumulated from previous sub-blocks based on a value of the persistent rice adaption enabled flag.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 5 is an illustration of a picture with 18 by 12 luma CTUs, according to an example of the present disclosure.

FIG. 6A is an illustration of an example of disallowed ternary tree (TT) and binary tree (BT) partitioning in VTM, according to an example of the present disclosure.

FIG. 6B is an illustration of an example of disallowed TT and BT partitioning in VTM, according to an example of the present disclosure.

FIG. 6C is an illustration of an example of disallowed TT and BT partitioning in VTM, according to an example of the present disclosure.

FIG. 6D is an illustration of an example of disallowed TT and BT partitioning in VTM, according to an example of the present disclosure.

FIG. 6E is an illustration of an example of disallowed TT and BT partitioning in VTM, according to an example of the present disclosure.

FIG. 6F is an illustration of an example of disallowed TT and BT partitioning in VTM, according to an example of the present disclosure.

FIG. 6G is an illustration of an example of disallowed TT and BT partitioning in VTM, according to an example of the present disclosure.

FIG. 6H is an illustration of an example of disallowed TT and BT partitioning in VTM, according to an example of the present disclosure.

FIG. 10A is an illustration of state transition, according to an example of the present disclosure.

FIG. 10B is an illustration of quantizer selection, according to an example of the present disclosure.

FIG. 11 is an illustration of a template used for selecting probability models, according to the present disclosure.

FIG. 14A is an illustration of a horizontal traverse scan, according to the present disclosure.

FIG. 14B is an illustration of a vertical traverse scan, according to the present disclosure.

FIG. 15A is an illustration of a sub-block-based index map scanning for a palette, according to the present disclosure.

FIG. 15B is an illustration of a sub-block-based index map scanning for a palette, according to the present disclosure.

FIG. 18 is a diagram illustrating a computing environment coupled with a user interface, according to an example of the present disclosure.

FIG. 19 illustrates a method for video coding, according to an example of the present disclosure.

DETAILED DESCRIPTION

Figure 1:
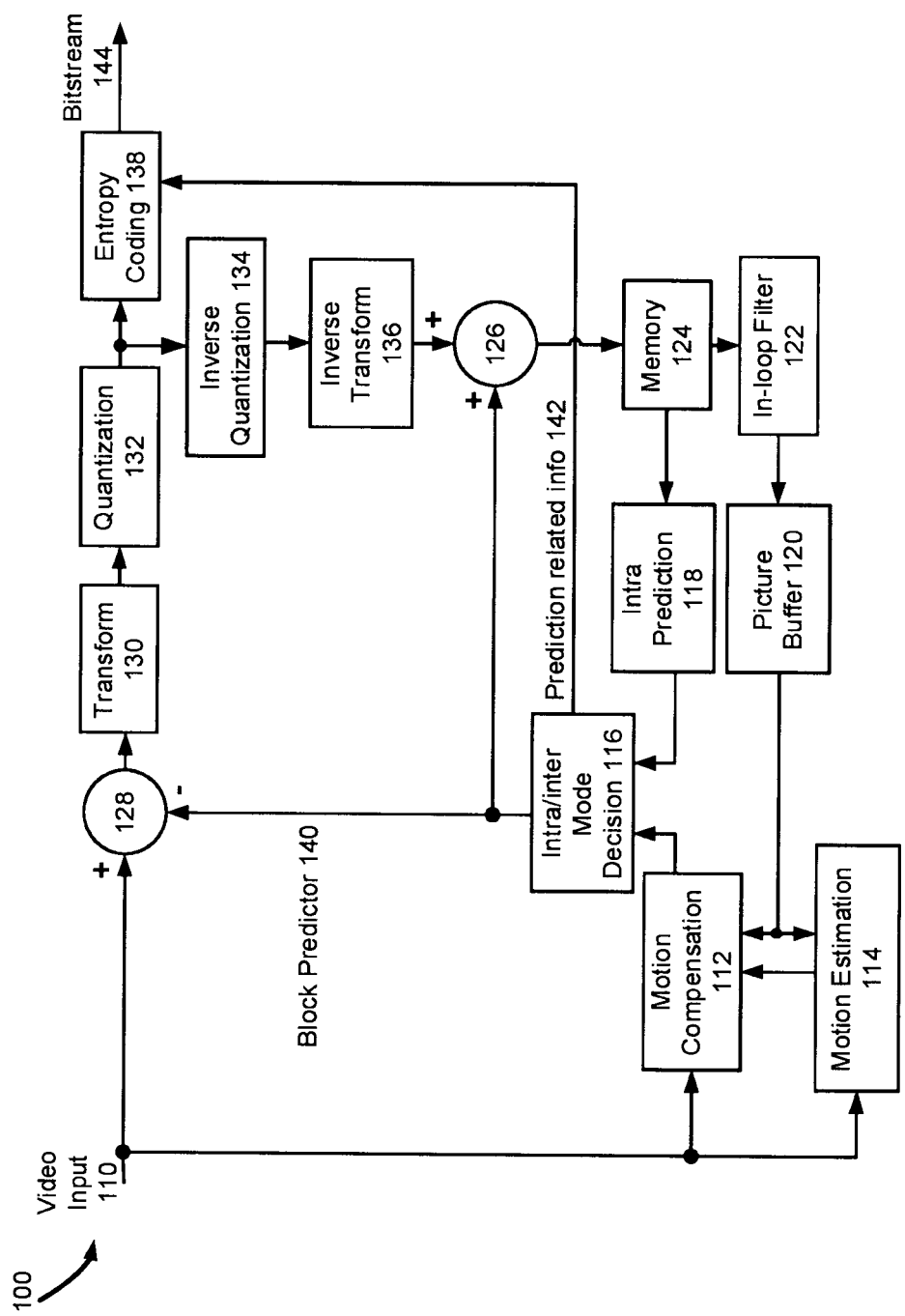
FIG. 1 is a block diagram of an encoder, according to an example of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc., may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

Like HEVC, the VVC is built upon the block-based hybrid video coding framework.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture storage, the temporal prediction signal comes from.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture storage of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

FIG. 1 gives the block diagram of a generic block-based hybrid video encoding system. The input video signal is processed block by block (called coding units (CUs)). In VTM-1.0, a CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. By definition, coding tree block (CTB) is an N×N block of samples for some value of N such that the division of a component into CTBs is a partitioning. CTU includes a CTB of luma samples, two corresponding CTBs of chroma samples of a picture that has three sample arrays, or a CTB of samples of a monochrome picture or a picture that is coded using three separate colour planes and syntax structures used to code the samples. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure. As shown in FIGS. 3A, 3B, 3C, 3D, and 3E, there are five splitting types, quaternary partitioning, horizontal binary partitioning, vertical binary partitioning, horizontal ternary partitioning, and vertical ternary partitioning.

Figures 3A, 3B, 3C:
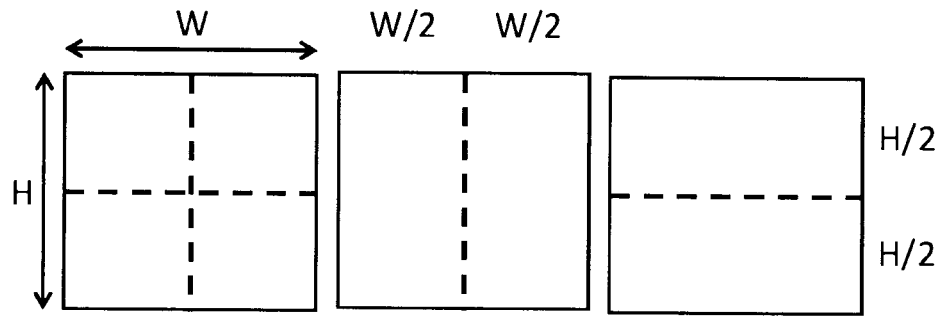
FIG. 3A is a diagram illustrating block partitions in a multi-type tree structure, according to an example of the present disclosure.
FIG. 3B is a diagram illustrating block partitions in a multi-type tree structure, according to an example of the present disclosure.
FIG. 3C is a diagram illustrating block partitions in a multi-type tree structure, according to an example of the present disclosure.

FIG. 3A shows a diagram illustrating block quaternary partition in a multi-type tree structure, in accordance with the present disclosure.

FIG. 3B shows a diagram illustrating block vertical binary partition in a multi-type tree structure, in accordance with the present disclosure.

FIG. 3C shows a diagram illustrating block horizontal binary partition in a multi-type tree structure, in accordance with the present disclosure.

Figures 3D, 3E:
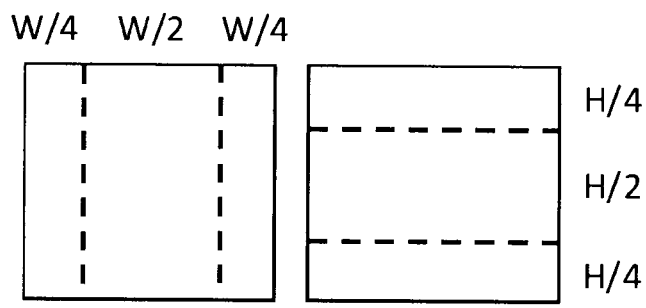
FIG. 3D is a diagram illustrating block partitions in a multi-type tree structure, according to an example of the present disclosure.
FIG. 3E is a diagram illustrating block partitions in a multi-type tree structure, according to an example of the present disclosure.

FIG. 3D shows a diagram illustrating block vertical ternary partition in a multi-type tree structure, in accordance with the present disclosure.

FIG. 3E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes. After spatial and/or temporal prediction, the mode decision block in the encoder chooses the best prediction mode, for example based on the rate-distortion optimization method. The prediction block is then subtracted from the current video block; and the prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream.

Figure 2:
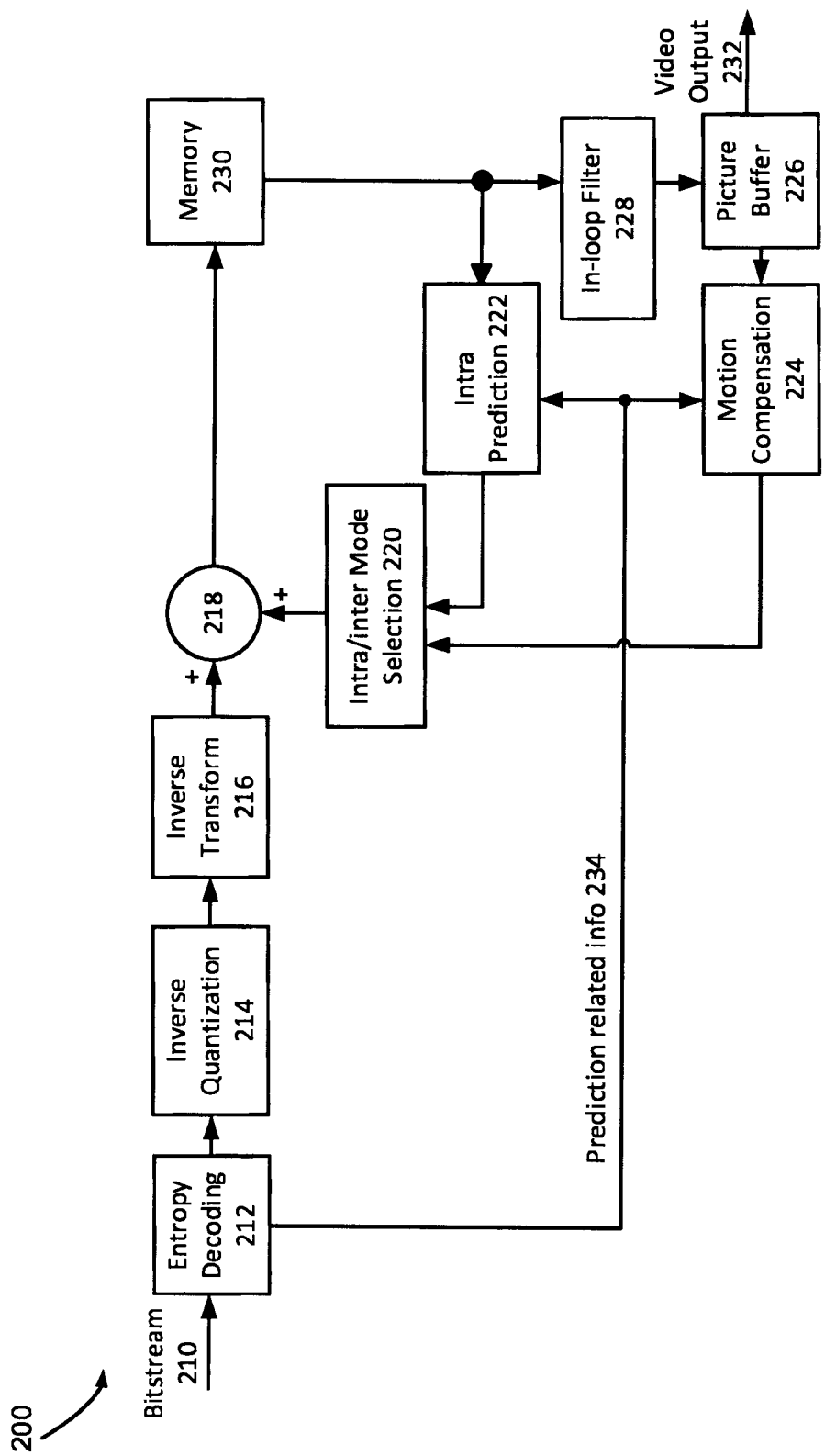
FIG. 2 is a block diagram of a decoder, according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 gives a general block diagram of a block-based video decoder. The video bit-stream is first entropy decoded at entropy decoding unit. The coding mode and prediction information are sent to either the spatial prediction unit (if intra coded) or the temporal prediction unit (if inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

In general, the basic intra prediction scheme applied in the VVC is kept the same as that of the HEVC, except that several modules are further extended and/or improved, e.g., intra sub-partition (ISP) coding mode, extended intra prediction with wide-angle intra directions, position-dependent intra prediction combination (PDPC) and 4-tap intra interpolation.

Partitioning of Pictures, Tile Groups, Tiles, and CTUs in VVC

In VVC, tile is defined as a rectangular region of CTUs within a particular tile column and a particular tile row in a picture. Tile group is a group of an integer number of tiles of a picture that are exclusively contained in a single NAL unit. Basically, the concept of tile group is the same as slice as defined in HEVC. For example, pictures are divided into tile groups and tiles. A tile is a sequence of CTUs that cover a rectangular region of a picture. A tile group contains a number of tiles of a picture. Two modes of tile groups are supported, namely the raster-scan tile group mode and the rectangular tile group mode. In the raster-scan tile group mode, a tile group contains a sequence of tiles in tile raster scan of a picture. In the rectangular tile group mode, a tile group contains a number of tiles of a picture that collectively form a rectangular region of the picture. The tiles within a rectangular tile group are in the order of tile raster scan of the tile group.

Figure 4:
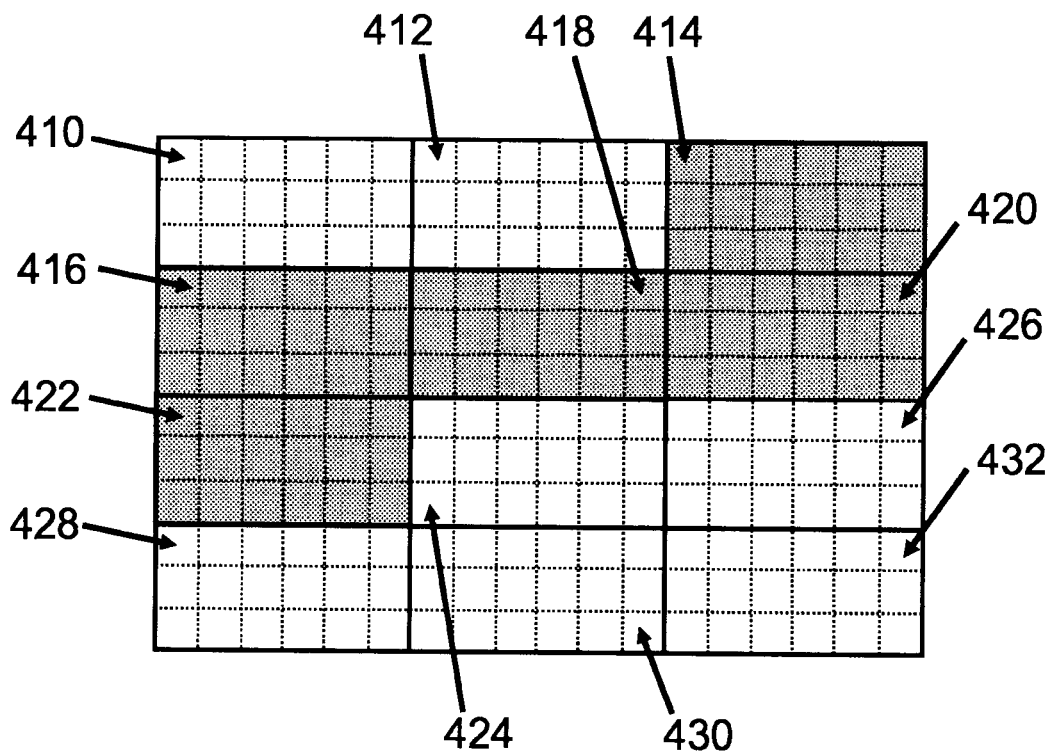
FIG. 4 is a diagram illustration of a picture with 18 by 12 luma CTUs, according to an example of the present disclosure.

FIG. 4 shows an example of raster-scan tile group partitioning of a picture, where the picture is divided into 12 tiles and 3 raster-scan tile groups. FIG. 4 includes tiles 410, 412, 414, 416, and 418. Each tile has 18 CTUs. More specifically, FIG. 4 shows a picture with 18 by 12 luma CTUs that is partitioned into 12 tiles and 3 tile groups (informative). The three tile groups are as follows (1) the first tile group includes tiles 410 and 412, (2) the second tile group includes tiles 414, 416, 418, 420, and 422, and (3) the third tile group includes tiles 424, 426, 428, 430, and 432.

FIG. 5 shows an example of rectangular tile group partitioning of a picture, where the picture is divided into 24 tiles (6 tile columns and 4 tile rows) and 9 rectangular tile groups. FIG. 5 includes tile 510, 512, 514, 516, 518, 520, 522, 524, 526, 528, 530, 532, 534, 536, 538, 540, 542, 544, 546, 548, 550, 552, 554, and 556. More specifically, FIG. 5 shows a picture with 18 by 12 luma CTUs that is partitioned into 24 tiles and 9 tile groups (informative). A tile group contains tiles and a tile contain CTUs. The 9 rectangular tile groups include (1) the two tiles 510 and 512, (2) the two tiles 514 and 516, (3) the two tiles 518 and 520, (4) the four tiles 522, 524, 534, and 536, (5) the four tiles 526, 528, 538, and 540 (6) the four tiles 530, 532, 542, and 544, (7) the two tiles 546 and 548, (8) the two tiles 550 and 552, and (9) the two tiles 554 and 556.

Large Block-Size Transforms with High-Frequency Zeroing in VVC

In VTM4, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

Virtual Pipeline Data Units (VPDUs) in VVC

Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In order to keep the VPDU size as 64×64 luma samples, the following normative partition restrictions (with syntax signaling modification) are applied in VTM5:

TT split is not allowed for a CU with either width or height, or both width and height equal to 128.

For a 128×N CU with N≤64 (i.e., width equal to 128 and height smaller than 128), horizontal BT partitioning is not allowed.

For an N×128 CU with N≤64 (i.e., height equal to 128 and width smaller than 128), vertical BT partitioning is not allowed.

FIGS. 6A, 6B, 6C, 6D, 6E, 6F, 6G, and 6H show examples of disallowed TT and BT partitioning in VTM.

Transform Coefficient Coding in VVC

Transform coefficient coding in VVC is similar to HEVC in the sense that they both use non-overlapped coefficient groups (also called CGs or subblocks). However, there are also some differences between them. In HEVC, each CG of coefficients has a fixed size of 4×4. In VVC Draft 6, the CG size becomes dependent on TB size. As a consequence, various CG sizes (1×16, 2×8, 8×2, 2×4, 4×2 and 16×1) are available in VVC. The CGs inside a coding block, and the transform coefficients within a CG, are coded according to pre-defined scan orders.

In order to restrict the maximum number of context coded bins per pixel, the area of the TB and the type of video component (e.g., luma component vs. chroma component) are used to derive the maximum number of context-coded bins (CCB) for a TB. The maximum number of context-coded bins is equal to TB_zosize*1.75. Here, TB_zosize indicates the number of samples within a TB after coefficient zero-out. Note that the coded_sub_block_flag, which is a flag indicating if a CG contains non-zero coefficient or not, is not considered for CCB count.

Coefficient zero-out is an operation performed on a transform block to force coefficients located in a certain region of the transform block to be 0. For example, in the current VVC, a 64×64 transform has an associated zero-out operation. As a result, transform coefficients located outside the top-left 32×32 region inside a 64×64 transform block are all forced to be 0. In fact, in the current VVC, for any transform block with a size over 32 along a certain dimension, coefficient zero-out operation is performed along that dimension to force coefficients located beyond the top-left 32×32 region to be 0.

Figure 7:
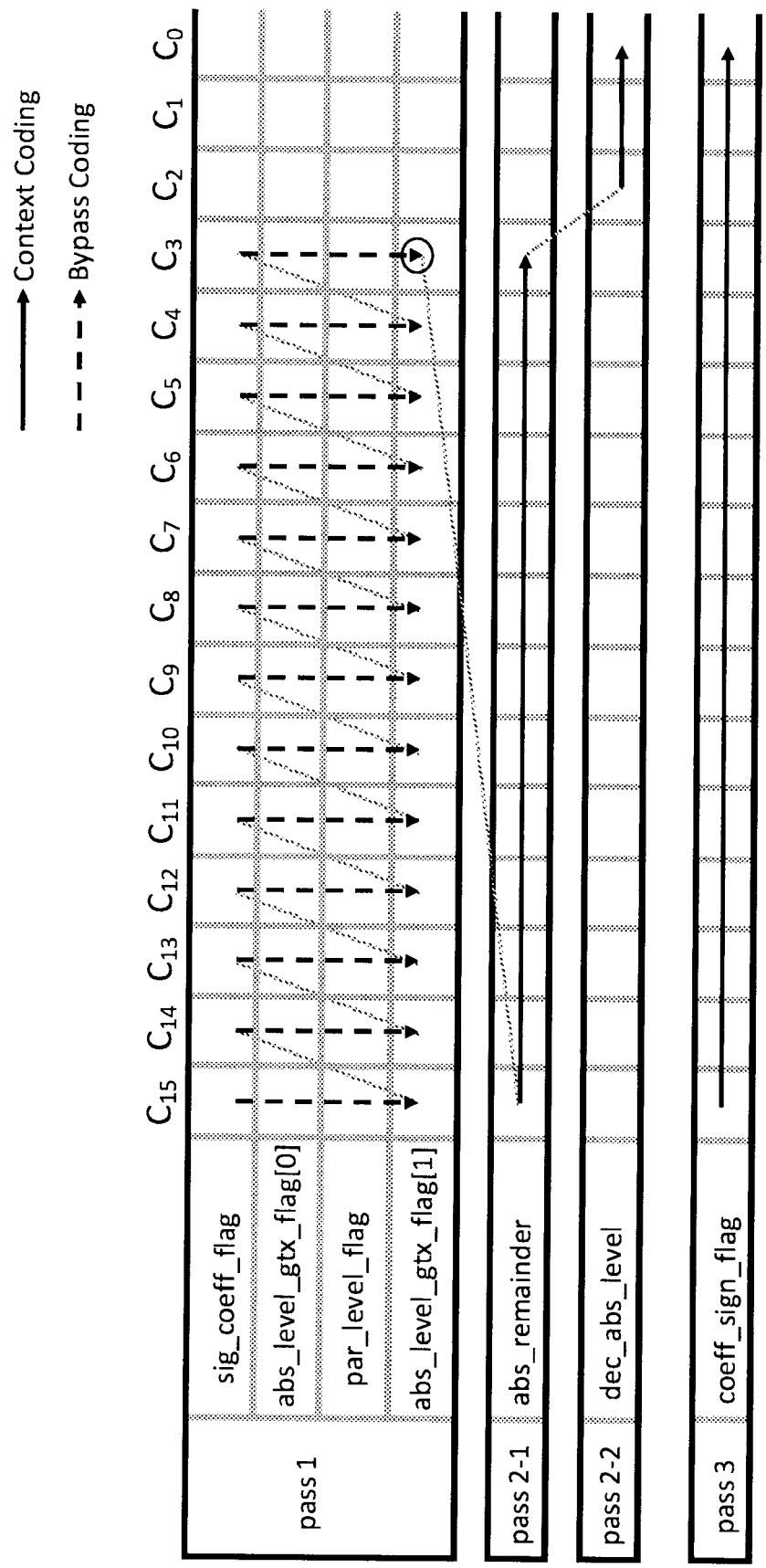
FIG. 7 is an illustration of a residual coding structure for transform blocks, according to an example of the present disclosure.

In transform coefficient coding in VVC, a variable, remBinsPass1, is first set to the maximum number of context-coded bins (MCCB) allowed. In the coding process, the variable is decreased by one each time when a context-coded bin is signaled. While the remBinsPass1 is larger than or equal to four, a coefficient is firstly signaled through syntaxes of sig_coeff_flag, abs_level_gt1_flag, par_level_flag, and abs_level_gt3_flag, all using context-coded bins in the first pass. The rest part of level information of the coefficient is coded with syntax element of abs_remainder using Golomb-rice code and bypass-coded bins in the second pass. When the remBinsPass1 becomes smaller than 4 while coding the first pass, a current coefficient is not coded in the first pass, but directly coded in the second pass with the syntax element of dec_abs_level using Golomb-Rice code and bypass-coded bins. The rice parameter derivation process for dec_abs_level[ ] is derived as specified in Table 3. After all the above mentioned level coding, the signs (sign flag) for all scan positions with sig_coeff_flag equal to 1 is finally coded as bypass bins. Such a process is depicted in FIG. 7. The remBinsPass1 is reset for every TB. The transition of using context-coded bins for the sig_coeff_flag, abs_level_gt1_flag, par_level_flag, and abs_level_gt3_flag to using bypass-coded bins for the rest coefficients only happens at most once per TB. For a coefficient subblock, if the remBinsPass1 is smaller than 4 before coding its very first coefficient, the entire coefficient subblock is coded using bypass-coded bins.

FIG. 7 shows an illustration of residual coding structure for transform blocks.

The unified (same) rice parameter (RicePara) derivation is used for signaling the syntax of abs_remainder and dec_abs_level. The only difference is that the base level, baseLevel, is set to 4 and 0 for coding abs_remainder and dec_abs_level, respectively. Rice parameter is determined based on not only the sum of absolute levels of neighboring five transform coefficients in local template, but also the corresponding base level as follows:

RicePara=RiceParTable[max(min(31,sumAbs−5*baseLevel),0)]

The syntax and the associated semantic of the residual coding in current VVC draft specification is illustrated in Table 1 and Table 2, respectively. How to read the Table 1 is illustrated in the appendix section of this present disclosure which could also be found in the VVC specification.

TABLE 1

| Syntax of residual coding | Descriptor |
|---|---|
| residual_coding( x0, y0, log2TbWidth, log2TbHeight, cIdx ) { | |
|   if( sps_mts_enabled_flag && cu_sbt_flag && cIdx = = 0 && | |
|     log2TbWidth = = 5 && log2TbHeight < 6 ) | |
|     log2ZoTbWidth = 4 | |
|   else | |
|     log2ZoTbWidth = Min( log2TbWidth, 5 ) | |
|   if( sps_mts_enabled_flag && cu_sbt_flag && cIdx = = 0 && | |
|     log2TbWidth < 6 && log2TbHeight = = 5 ) | |
|     log2ZoTbHeight = 4 | |
|   else | |
|     log2ZoTbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2TbWidth = log2ZoTbWidth | |
|   log2TbHeight = log2ZoTbHeight | |
|   remBinsPass1 = ( ( 1 << ( log2TbWidth + log2TbHeight ) ) * 7 ) >> 2 | |
|   log2SbW = ( Min( log2TbWidth, log2TbHeight ) < 2 ? 1 : 2 ) | |

TABLE 1-continued

Syntax of residual coding

| | Descriptor |
|---|---|

```
   log2SbH = log2SbW
   if( log2TbWidth + log2TbHeight > 3 )
     if( log2TbWidth < 2 ) {
        log2SbW = log2TbWidth
        log2SbH = 4 - log2SbW
     } else if( log2TbHeight < 2 ) {
        log2SbH = log2TbHeight
        log2SbW = 4 - log2SbH
     }
   numSbCoeff = 1 << ( log2SbW + log2SbH )
   lastScanPos = numSbCoeff
   lastSubBlock = (
1 << ( log2TbWidth + log2TbHeight - ( log2SbW + log2SbH ) ) ) - 1
   do {
     if( lastScanPos = = 0 ) {
        lastScanPos = numSbCoeff
        lastSubBlock- -
     }
     lastScanPos- -
     xS =
DiagScanOrder[ log2TbWidth - log2SbW ][ log2TbHeight - log2SbH ]
                 [ lastSubBlock ][ 0 ]
     yS =
DiagScanOrder[ log2TbWidth - log2SbW ][ log2TbHeight - log2SbH ]
                 [ lastSubBlock ][ 1 ]
     xC = ( xS << log2SbW ) +
DiagScanOrder[ log2SbW ][ log2SbH ][ lastScanPos ][ 0 ]
     yC = ( yS << log2SbH ) +
DiagScanOrder[ log2SbW ][ log2SbH ][ lastScanPos ][ 1 ]
   } while( ( xC != LastSignificantCoeffX ) | | ( yC !=
LastSignificantCoeffY ) )
   if( lastSubBlock = = 0 && log2TbWidth >= 2 && log2TbHeight >= 2
&&
        !transform_skip_flag[ x0 ][ y0 ][ cIdx ] && lastScanPos > 0 )
     LfnstDcOnly = 0
   if( ( lastSubBlock > 0 && log2TbWidth >= 2 && log2TbHeight >= 2 )
| |
        ( lastScanPos > 7 && ( log2TbWidth = = 2 | | log2TbWidth = = 3 )
&&
        log2TbWidth = = log2TbHeight ) )
     LfnstZeroOutSigCoeffFlag = 0
   if( ( lastSubBlock > 0 | | lastScanPos > 0 ) && cIdx = = 0 )
     MtsDcOnly = 0
   QState = 0
   for( i = lastSubBlock; i >= 0; i- - ) {
     startQStateSb = QState
     xS =
DiagScanOrder[ log2TbWidth - log2SbW ][ log2TbHeight - log2SbH ]
                 [ i ][ 0 ]
     yS =
DiagScanOrder[ log2TbWidth - log2SbW ][ log2TbHeight - log2SbH ]
                 [ i ][ 1 ]
     inferSbDcSigCoeffFlag = 0
     if( i < lastSubBlock && i > 0 ) {
        sb_coded_flag[ xS ][ yS ]                                    ae(v)
        inferSbDcSigCoeffFlag = 1
     }
     if( sb_coded_flag[ xS ][ yS ] && ( xS > 3 | | yS > 3 ) && cIdx = = 0 )
        MtsZeroOutSigCoeffFlag = 0
     firstSigScanPosSb = numSbCoeff
     lastSigScanPosSb = -1
     firstPosMode0 = ( i = = lastSubBlock ? lastScanPos : numSbCoeff - 1 )
     firstPosMode1 = firstPosMode0
     for( n = firstPosMode0; n >= 0 && remBinsPass1 >= 4; n- - ) {
        xC = ( xS << log2SbW ) +
DiagScanOrder[ log2SbW ][ log2SbH ][ n ][ 0 ]
        yC = ( yS << log2SbH ) +
DiagScanOrder[ log2SbW ][ log2SbH ][ n ][ 1 ]
        if( sb_coded_flag[ xS ][ yS ] && ( n > 0 | | !inferSbDcSigCoeffFlag )
&&
            ( xC != LastSignificantCoeffX | | yC != Last SignificantCoeffY
) ) {
           sig_coeff_flag[ xC ][ yC ]                                 ae(v)
           remBinsPass1- -
           if( sig_coeff_flag[ xC ][ yC ] )
              inferSbDcSigCoeffFlag = 0
```

TABLE 1-continued

Syntax of residual coding

| | Descriptor |
|---|---|
| ```
        }
        if( sig_coeff_flag[ xC ][ yC ] ) {
          abs_level_gtx_flag[ n ][ 0 ]
          remBinsPass1- -
          if( abs_level_gtx_flag[ n ][ 0 ] ) {
            par_level_flag[ n ]
            remBinsPass1- -
            abs_level_gtx_flag[ n ][ 1 ]
            remBinsPass1- -
          }
          if( lastSigScanPosSb = = -1 )
            lastSigScanPosSb = n
          firstSigScanPosSb = n
        }
        AbsLevelPass1[ xC ][ yC ] = sig_coeff_flag[ xC ][ yC ] +
par_level_flag[ n ] +
          abs_level_gtx_flag[ n ][ 0 ] + 2 * abs_level_gtx_flag[ n ][ 1 ]
        if( sh_dep_quant_used_flag )
          QState = QStateTransTable[ QState ][ AbsLevelPass1[ xC ][ yC ] &
1 ]
        firstPosMode1 = n - 1
      }
      for( n = firstPosMode0; n > firstPosMode1; n- - ) {
        xC = ( xS << log2SbW ) +
DiagScanOrder[ log2SbW ][ log2SbH ][ n ][ 0 ]
        yC = ( yS << log2SbH ) +
DiagScanOrder[ log2SbW ][ log2SbH ][ n ][ 1 ]
        if( abs_level_gtx_flag[ n ][ 1 ] )
          abs_remainder[ n ]
        AbsLevel[ xC ][ yC ] = AbsLevelPass1[ xC ][ yC ]
+2 * abs_remainder[ n ]
      }
      for( n = firstPosMode1; n >= 0; n- - ) {
        xC = ( xS << log2SbW ) +
DiagScanOrder[ log2SbW ][ log2SbH ][ n ][ 0 ]
        yC = ( yS << log2SbH ) +
DiagScanOrder[ log2SbW ][ log2SbH ][ n ][ 1 ]
        if( sb_coded_flag[ xS ][ yS ] )
          dec_abs_level[ n ]
        if( AbsLevel[ xC ][ yC ] > 0 ) {
          if( lastSigScanPosSb = = -1 )
            lastSigScanPosSb = n
          firstSigScanPosSb = n
        }
        if( sh_dep_quant_used_flag )
          QState = QStateTransTable[ QState ][ AbsLevel[ xC ][ yC ] & 1 ]
      }
      signHiddenFlag = sh_sign_data_hiding_used_flag &&
        ( lastSigScanPosSb - firstSigScanPosSb > 3 ? 1 : 0 )
      for( n = numSbCoeff - 1; n >= 0; n- - ) {
        xC = ( xS << log2SbW ) +
DiagScanOrder[ log2SbW ][ log2SbH ][ n ][ 0 ]
        yC = ( yS << log2SbH ) +
DiagScanOrder[ log2SbW ][ log2SbH ][ n ][ 1 ]
        if( ( AbsLevel[ xC ][ yC ] > 0 ) &&
          ( !signHiddenFlag | | ( n != firstSigScanPosSb ) ) )
          coeff_sign_flag[ n ]
      }
      if( sh_dep_quant_used_flag ) {
        QState = startQStateSb
        for( n = numSbCoeff - 1; n >= 0; n- - ) {
          xC = ( xS << log2SbW ) +
DiagScanOrder[ log2SbW ][ log2SbH ][ n ][ 0 ]
          yC = ( yS << log2SbH ) +
DiagScanOrder[ log2SbW ][ log2SbH ][ n ][ 1 ]
          if( AbsLevel[ xC ][ yC ] > 0 )
            TransCoeffLevel[ x0 ][ y0 ][ cIdx ][ xC ][ yC ] =
              ( 2 * AbsLevel[ xC ][ yC ] - ( QState > 1 ? 1 : 0 ) ) *
              ( 1 - 2 * coeff_sign_flag[ n ] )
          QState = QStateTransTable[ QState ][ AbsLevel[ xC ][ yC ] & 1 ]
      } else {
        sumAbsLevel = 0
        for( n = numSbCoeff - 1; n >= 0; n- - ) {
          xC = ( xS << log2SbW ) +
DiagScanOrder[ log2SbW ][ log2SbH ][ n ][ 0 ]
          yC = ( yS << log2SbH ) +
``` | ae(v)<br><br><br>ae(v)<br><br>ae(v)<br><br><br><br><br><br><br><br><br><br><br><br><br><br><br><br><br><br><br><br>ae(v)<br><br><br><br><br><br><br><br>ae(v)<br><br><br><br><br><br><br><br><br><br><br><br><br><br>ae(v) |

TABLE 1-continued

Syntax of residual coding

| | Descriptor |
|---|---|

```
DiagScanOrder[ log2SbW ][ log2SbH ][ n ][ 1 ]
        if( AbsLevel[ xC ][ yC ] > 0 ) {
           TransCoeffLevel[ x0 ][ y0 ][ cIdx ][ xC ][ yC ] =
               AbsLevel[ xC ][ yC ] * ( 1 − 2 * coeff_sign_flag[ n ] )
           if( signHiddenFlag ) {
              sumAbsLevel += AbsLevel[ xC ][ yC ]
              if( ( n = = firstSigScanPosSb ) && ( sumAbsLevel % 2 ) = =
1 ) )
                 TransCoeffLevel[ x0 ][ y0 ][ cIdx ][ xC ][ yC ] =
                    −TransCoeffLevel[ x0 ][ y0 ][ cIdx ][ xC ][ yC ]
              }
           }
        }
     }
  }
}
```

TABLE 2

Semantic of residual coding

The array AbsLevel[ xC ][ yC ] represents an array of absolute values of transform coefficient levels for the current transform block and the array AbsLevelPass1[ xC ][ yC ] represents an array of partially reconstructed absolute values of transform coefficient levels for the current transform block. The array indices xC and yC specify the transform coefficient location ( xC, yC ) within the current transform block. When the value of AbsLevel[ xC ][ yC ] is not specified in subclause 7.3.11.11, it is inferred to be equal to 0. When the value of AbsLevelPass1[ xC ][ yC ] is not specified in subclause 7.3.11.11, it is inferred to be equal to 0.
The variables CoeffMin and CoeffMax specifying the minimum and maximum transform coefficient values are derived as follows:
   CoeffMin = −( 1 << 15 )  (189)
   CoeffMax = ( 1 << 15 ) − 1  (190)
The array QStateTransTable[ ][ ] is specified as follows:
   QStateTransTable[ ][ ] = { { 0, 2 }, { 2, 0 }, { 1, 3 }, { 3, 1 } }  (191)
last_sig_coeff_x_prefix specifies the prefix of the column position of the last significant coefficient in scanning order within a transform block. The values of
last_sig_coeff_x_prefix shall be in the range of 0 to ( log2ZoTbWidth << 1 ) − 1, inclusive.
When last_sig_coeff_x_prefix is not present, it is inferred to be 0.
last_sig_coeff_y_prefix specifies the prefix of the row position of the last significant coefficient in scanning order within a transform block. The values of
last_sig_coeff_y_prefix shall be in the range of 0 to ( log2ZoTbHeight << 1 ) − 1, inclusive.
When last_sig_coeff_y_prefix is not present, it is inferred to be 0.
last_sig_coeff_x_suffix specifies the suffix of the column position of the last significant coefficient in scanning order within a transform block. The values of
last_sig_coeff_x_suffix shall be in the range of 0 to
( 1 << ( ( last_sig_coeff_x_prefix >> 1 ) − 1 ) ) − 1, inclusive.
The column position of the last significant coefficient in scanning order within a transform block LastSignificantCoeffX is derived as follows:
-  If last_sig_coeff_x_suffix is not present, the following applies:
   LastSignificantCoeffX = last_sig_coeff_x_prefix
    (192)
-  Otherwise (last_sig_coeff_x_suffix is present), the following applies:
   LastSignificantCoeffX = ( 1 << ( (last_sig_coeff_x_prefix >> 1 ) − 1 ) ) * (193)
    ( 2 + (last_sig_coeff_x_prefix & 1 ) ) + last_sig_coeff_x_suffix
last_sig_coeff_y_suffix specifies the suffix of the row position of the last significant coefficient in scanning order within a transform block. The values of
last_sig_coeff_y_suffix shall be in the range of 0 to
( 1 << ( ( last_sig_coeff_y_prefix >> 1 ) − 1 ) ) − 1, inclusive.
The row position of the last significant coefficient in scanning order within a transform block LastSignificantCoeffY is derived as follows:
-  If last_sig_coeff_y_suffix is not present, the following applies:
   LastSignificantCoeffY = last_sig_coeff_y_prefix
    (194)
-  Otherwise (last_sig_coeff_y_suffix is present), the following applies:
   LastSignificantCoeffY = ( 1 << ( ( last_sig_coeff_y_prefix >> 1 ) − 1 ) ) * (195)
    ( 2 + (last_sig_coeff_y_prefix & 1 ) ) + last_sig_coeff_y_suffix
sb_coded_flag[ xS ][ yS ] specifies the following for the subblock at location ( xS, yS ) within the current transform block, where a subblock is an array of transform coefficient levels:
When sb_coded_flag[ xS ][ yS ] is equal to 0, all transform coefficient levels of the

TABLE 2-continued

Semantic of residual coding subblock at location ( xS, yS ) are inferred to be equal to 0.
When sb_coded_flag[ xS ][ yS ] is not present, it is inferred to be equal to 1.
sig_coeff_flag[ xC ][ yC ] specifies for the transform coefficient location ( xC, yC ) within
the current transform block whether the corresponding transform coefficient level at the
location ( xC, yC ) is non-zero as follows:
- If sig_coeff_flag[ xC ][ yC ] is equal to 0, the transform coefficient level at the location
  ( xC, yC ) is set equal to 0.
- Otherwise (sig_coeff_flag[ xC ][ yC ] is equal to 1), the transform coefficient level at
  the location ( xC, yC ) has a non-zero value.
When sig_coeff_flag[ xC ][ yC ] is not present, it is inferred as follows:
- If transform_skip_flag[ x0 ][ y0 ][ cIdx ] is equal to 0 or
  sh_ts_residual_coding_disabled_flag is equal to 1, the following applies:
    - If ( xC, yC ) is the last significant location
      ( LastSignificantCoeffX, LastSignificantCoeffY ) in scan order or all of the
      following conditions are true, sig_coeff_flag[ xC ][ yC ] is inferred to be equal to
      1:
        - ( xC & ( (1 << log2SbW ) − 1 ), yC & ( (1 << log2SbH ) − 1 ) ) is equal to
          ( 0, 0 ).
        - inferSbDcSigCoeffFlag is equal to 1.
        - sb_coded_flag[ xS ][ yS ] is equal to 1.
    - Otherwise, sig_coeff_flag[ xC ][ yC ] is inferred to be equal to 0.
- Otherwise (transform_skip_flag[ x0 ][ y0 ][ cIdx ] is equal to 1 and
  sh_ts_residual_coding_disabled_flag is equal to 0), the following applies:
    - If all of the following conditions are true, sig_coeff_flag[ xC ][ yC ] is inferred to
      be equal to 1:
        - ( xC & ( (1 << log2SbW ) − 1 ), yC & ( (1 << log2SbH ) − 1 ) ) is equal to
          ( (1 << log2SbW ) − 1, (1 << log2SbH ) − 1 ).
        - inferSbSigCoeffFlag is equal to 1.
        - sb_coded_flag[ xS ][ yS ] is equal to 1.
    - Otherwise, sig_coeff_flag[ xC ][ yC ] is inferred to be equal to 0.
abs_level_gtx_flag[ n ][ j ] specifies whether the absolute value of the transform
coefficient level (at scanning position n) is greater than ( j << 1 ) + 1. When
abs_level_gtx_flag[ n ][ j ] is not present, it is inferred to be equal to 0.
par_level_flag[ n ] specifies the parity of the transform coefficient level at scanning
position n. When par_level_flag[ n ] is not present, it is inferred to be equal to 0.
abs_remainder[ n ] is the remaining absolute value of a transform coefficient level that is
coded with Golomb-Rice code at the scanning position n. When abs_remainder[ n ] is not
present, it is inferred to be equal to 0.
It is a requirement of bitstream conformance that the value of abs_remainder[ n ] shall be
constrained such that the corresponding value of
TransCoeffLevel[ x0 ][ y0 ][ cIdx ][ xC ][ yC ] is in the range of CoeffMin to CoeffMax,
inclusive.
dec_abs_level[ n ] is an intermediate value that is coded with Golomb-Rice code at the
scanning position n. Given ZeroPos[ n ] that is derived in Table 3 during the parsing of
dec_abs_level[ n ], the absolute value of a transform coefficient level at location ( xC, yC )
AbsLevel[ xC ][ yC ] is derived as follows:
- If dec_abs_level[ n ] is not present or equal to ZeroPos[ n ], AbsLevel[ xC ][ yC ] is
  set
  equal to 0.
- Otherwise, if dec_abs_level[ n ] is less than ZeroPos[ n ], AbsLevel[ xC ][ yC ] is set
  equal to dec_abs_level[ n ] + 1;
- Otherwise (dec_abs_level[ n ] is greater than ZeroPos[ n ]), AbsLevel[ xC ][ yC ] is set
  equal to dec_abs_level[ n ].
It is a requirement of bitstream conformance that the value of dec_abs_level[ n ] shall be
constrained such that the corresponding value of
TransCoeffLevel[ x0 ][ y0 ][ cIdx ][ xC ][ yC ] is in the range of CoeffMin to CoeffMax,
inclusive.
coeff_sign_flag[ n ] specifies the sign of a transform coefficient level for the scanning
position n as follows:
- If coeff_sign_flag[ n ] is equal to 0, the corresponding transform coefficient level has a
  positive value.
- Otherwise (coeff_sign_flag[ n ] is equal to 1), the corresponding transform coefficient
  level has a negative value.
When coeff_sign_flag[ n ] is not present, it is inferred to be equal to 0.
The value of CoeffSignLevel[ xC ][ yC ] specifies the sign of a transform coefficient level
at the location ( xC, yC ) as follows:
- If CoeffSignLevel[ xC ][ yC ] is equal to 0, the corresponding transform coefficient
  level is equal to zero
- Otherwise, if CoeffSignLevel[ xC ][ yC ] is equal to 1, the corresponding transform
  coefficient level has a positive value.
- Otherwise (CoeffSignLevel[ xC ][ yC ] is equal to −1), the corresponding transform
  coefficient level has a negative value.

TABLE 3

Rice parameter derivation process for abs_remainder[ ] and dec_abs_level[ ]

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
  locSumAbs = 0
  if( xC < (1 << log2TbWidth) − 1 ) {
    locSumAbs += AbsLevel[ xC + 1 ][ yC ]
    if( xC < (1 << log2TbWidth) − 2 )
      locSumAbs += AbsLevel[ xC + 2 ][ yC ]
    if( yC < (1 << log2TbHeight) − 1 )
      locSumAbs += AbsLevel[ xC + 1 ][ yC + 1 ]  (1494)
  }
  if( yC < (1 << log2TbHeight) − 1 ) {
    locSumAbs += AbsLevel[ xC ][ yC + 1 ]
    if( yC < (1 << log2TbHeight) − 2 )
      locSumAbs += AbsLevel[ xC ][ yC + 2 ]
  }
  locSumAbs = Clip3( 0, 31, locSumAbs − baseLevel * 5 )
Given the variable locSumAbs, the Rice parameter cRiceParam is derived as specified in Table 4 below.
When baseLevel is equal to 0, the variable ZeroPos[ n ] is derived as follows:
ZeroPos[ n ] = ( QState < 2 ? 1 : 2 ) << cRiceParam

TABLE 4

Specification of cRiceParam based on locSumAbs

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

Residual Coding for Transform Skip Mode in VVC

Unlike HEVC where a single residual coding scheme is designed for coding both transform coefficients and transform skip coefficients, in VVC two separate residual coding schemes are employed for transform coefficients and transform skip coefficients (i.e., residual), respectively.

In transform skip mode, the statistical characteristics of residual signal are different from those of transform coefficients, and no energy compaction around low-frequency components is observed. The residual coding is modified to account for the different signal characteristics of the (spatial) transform skip residual which includes:
- no signaling of the last x/y position;
- coded_sub_block_flag coded for every subblock except for the DC subblock when all previous flags are equal to 0;
- sig_coeff_flag context modelling with two neighboring coefficients;
- par_level_flag using only one context model;
- additional greater than 5, 7, 9 flags;
- modified rice parameter derivation for the remainder binarization;
- context modeling for the sign flag is determined based on left and above neighboring coefficient values and sign flag is parsed after sig_coeff_flag to keep all context coded bins together.

Figure 8:
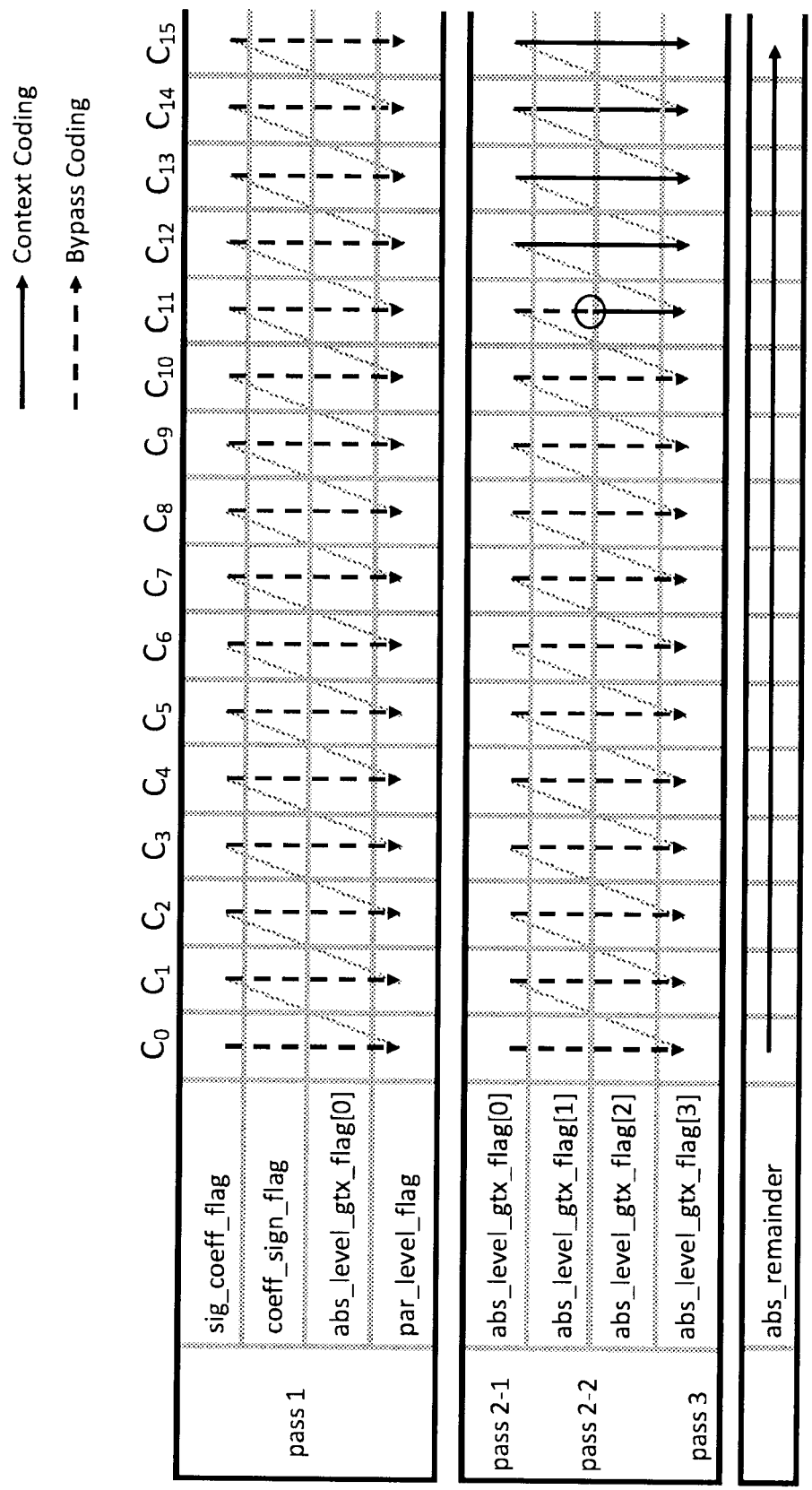
FIG. 8 is an illustration of a residual coding structure for transform skip blocks, according to an example of the present disclosure.

As shown in FIG. 8, syntax elements *sig_coeff_flag*, *coeff_sign_flag*, *abs_level_gt1_flag*, *par_level_flag*, are coded in an interleaved manner residual sample by residual sample in the first pass, followed by *abs_level_gtX_flag* bitplanes in the second pass, and abs_remainder coding in the third pass.

Pass 1:  sig_coeff_flag,  coeff_sign_flag, abs_level_gt1_flag, par_level_flag

Pass 2:  abs_level_gt3_flag,  abs_level_gt5_flag, abs_level_gt7_flag, abs_level_gt9_flag Pass 3: abs_remainder FIG. 8 shows an illustration of residual coding structure for transform skip blocks.

The syntax and the associated semantic of the residual coding for transform skip mode in current VVC draft specification is illustrated in Table 5 and Table 2, respectively. How to read the Table 5 is illustrated in the appendix section of this present disclosure which could also be found in the VVC specification.

TABLE 5

| Syntax of residual coding for transform skip mode | |
|---|---|
| | Descriptor |
| residual_ts_coding( x0, y0, log2TbWidth, log2TbHeight, cIdx ) { | |
|   log2SbW = ( Min( log2TbWidth, log2TbHeight ) < 2 ? 1 : 2 ) | |

TABLE 5-continued

| Syntax of residual coding for transform skip mode | |
|---|---|
| | Descriptor |
|   log2SbH = log2SbW | |
|   if( log2TbWidth + log2TbHeight > 3 ) | |
|     if( log2TbWidth < 2 ) { | |
|       log2SbW = log2TbWidth | |
|       log2SbH = 4 − log2SbW | |
|     } else if( log2TbHeight < 2 ) { | |
|       log2SbH = log2TbHeight | |
|       log2SbW = 4 − log2SbH | |
|     } | |
|   numSbCoeff = 1 << ( log2SbW + log2SbH ) | |
|   lastSubBlock = ( | |
| 1 << ( log2TbWidth + log2TbHeight − ( log2SbW+log2SbH ) ) ) − 1 | |
|   inferSbCbf = 1 | |
|   RemCcbs = ( ( 1 << ( log2TbWidth + log2TbHeight ) ) * 7 ) >> 2 | |
|   for( i =0; i <= lastSubBlock; i++ ) { | |
|     xS = DiagScanOrder[ log2TbWidth − log2SbW ][ log2TbHeight − log2SbH ][ i ][ 0 ] | |
|     yS = DiagScanOrder[ log2TbWidth − log2SbW ][ log2TbHeight − log2SbH ][ i ][ 1 ] | |
|     if( i != lastSubBlock | | !inferSbCbf ) | |

TABLE 5-continued

Syntax of residual coding for transform skip mode

| | Descriptor |
|---|---|
| sb_coded_flag[ xS ][ yS ] | ae(v) |
| if( sb_coded_flag[ xS ][ yS ] && i < lastSubBlock ) | |
|   inferSbCbf = 0 | |
| /* First scan pass */ | |
| inferSbSigCoeffFlag = 1 | |
| lastScanPosPass1 = −1 | |
| for( n = 0; n <= numSbCoeff − 1 && RemCcbs >= 4; n++ ) { | |
|   xC = ( xS << log2SbW ) + DiagScanOrder[ log2SbW ][ log2SbH ][ n ][ 0 ] | |
|   yC = ( yS << log2SbH ) + DiagScanOrder[ log2SbW ][ log2SbH ][ n ][ 1 ] | |
|   lastScanPosPass1 = n | |
|   if( sb_coded_flag[ xS ][ yS ] && | |
|     ( n != numSbCoeff − 1 | | !inferSbSigCoeffFlag | |
|     ) ) { | |
|     sig_coeff_flag[ xC ][ yC ] | ae(v) |
|     RemCcbs− − | |
|     if( sig_coeff_flag[ xC ][ yC ] ) | |
|       inferSbSigCoeffFlag = 0 | |
|   } | |
|   CoeffSignLevel[ xC ][ yC ] = 0 | |
|   if( sig_coeff_flag[ xC ][ yC ] ) { | |
|     coeff_sign_flag[ n ] | ae(v) |
|     RemCcbs− − | |
|     CoeffSignLevel[ xC ][ yC ] = ( coeff_sign_flag[ n ] > 0 ? −1 : 1 ) | |
|     abs_level_gtx_flag[ n ][ 0 ] | ae(v) |
|     RemCcbs− − | |
|     if( abs_level_gtx_flag[ n ][ 0 ] ) { | |
|       par_level_flag[ n ] | ae(v) |
|       RemCcbs− − | |
|     } | |
|   } | |
|   AbsLevelPass1[ xC ][ yC ] = sig_coeff_flag[ xC ][ yC ] + par_level_flag[ n ] + abs_level_gtx_flag[ n ][ 0 ] | |
| } | |
| /* Greater than X scan pass (numGtXFlags=5) */ | |
| lastScanPosPass2 = −1 | |
| for( n = 0; n <= numSbCoeff − 1 && RemCcbs >= 4; n++ ) { | |
|   xC = ( xS << log2SbW ) + DiagScanOrder[ log2SbW ][ log2SbH ][ n ][ 0 ] | |
|   yC = ( yS << log2SbH ) + DiagScanOrder[ log2SbW ][ log2SbH ][ n ][ 1 ] | |
|   AbsLevelPass2[ xC ][ yC ] = AbsLevelPass1[ xC ][ yC ] | |
|   for( j = 1; j < 5; j++ ) { | |
|     if( abs_level_gtx_flag[ n ][ j − 1 ] ) { | |
|       abs_level_gtx_flag[ n ][ j ] | ae(v) |
|       RemCcbs− − | |
|     } | |
|     AbsLevelPass2[ xC ][ yC ] += 2 * abs_level_gtx_flag[ n ][ j ] } | |
|   lastScanPosPass2 = n | |
| } | |
| /* remainder scan pass */ | |
| for( n = 0; n <= numSbCoeff − 1; n++ ) { | |
|   xC = (xS << log2SbW ) + DiagScanOrder[ log2SbW ][ log2SbH ][ n ][ 0 ] | |
|   yC = ( yS << log2SbH ) + DiagScanOrder[ log2SbW ][ log2SbH ][ n ][ 1 ] | |
|   if( ( n <= lastScanPosPass2 && AbsLevelPass2[ xC ][ yC ] >= 10 ) | | | |
|     ( n > lastScanPosPass2 && n <= lastScanPosPass1 && AbsLevelPass1[ xC ][ yC ] >= 2 ) | | | |
|     ( n > lastScanPosPass1 && sb_coded_flag[ xS ][ yS ] ) ) | |
|     abs_remainder[ n ] | ae(v) |
|   if( n <= lastScanPosPass2 ) | |
|     AbsLevel[ xC ][ yC ] = AbsLevelPass2[ xC ][ yC ] + 2 * abs_remainder[ n ] | |
|   else if(n <= lastScanPosPass1) | |
|     AbsLevel[ xC ][ yC ] = AbsLevelPass1[ xC ][ yC ] + 2 * abs_remainder[ n ] | |
|   else { /* bypass */ | |
|     AbsLevel[ xC ][ yC ] = abs_remainder[ n ] | |
|     if( abs_remainder[ n ] ) | |
|       coeff_sign_flag[ n ] | ae(v) |
|   } | |
|   if( BdpcmFlag[ x0 ][ y0 ][ cIdx ] = = 0 && n <= lastScanPosPass1 ) { | |
|     absLeftCoeff = xC > 0 ? AbsLevel[ xC − 1 ][ yC ] ) : 0 | |
|     absAboveCoeff = yC > 0 ? AbsLevel[ xC ][ yC − 1 ] ) : 0 | |
|     predCoeff = Max( absLeftCoeff, absAboveCoeff ) | |
|     if( AbsLevel[ xC ][ yC ] = = 1 && predCoeff > 0 ) | |
|       AbsLevel[ xC ][ yC ] = predCoeff | |
|     else if( AbsLevel[ xC ][ yC ] > 0 && AbsLevel[ xC ][ yC ] <= predCoeff ) | |
|       AbsLevel[ xC ][ yC ]− − | |
|   } | |
|   TransCoeffLevel[ x0 ][ y0 ][ cIdx ][ xC ][ yC ] = ( 1 − 2 * coeff_sign_flag[ n ] ) * AbsLevel[ xC ][ yC ] | |
|   } | |
| } | |
| } | |

Quantization

In current VVC, Maximum QP value was extended from 51 to 63, and the signaling of initial QP was changed accordingly. The initial value of SliceQpY can be modified at the slice segment layer when a non-zero value of slice_qp_delta is coded. For transform skip block, minimum allowed Quantization Parameter (QP) is defined as 4 because quantization step size becomes 1 when QP is equal to 4.

In addition, the same HEVC scalar quantization is used with a new concept called dependent scalar quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization as used in HEVC, the admissible reconstruction vectors are packed denser in the N-dimensional vector space (N represents the number of transform coefficients in a transform block). That means, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

Figure 9:
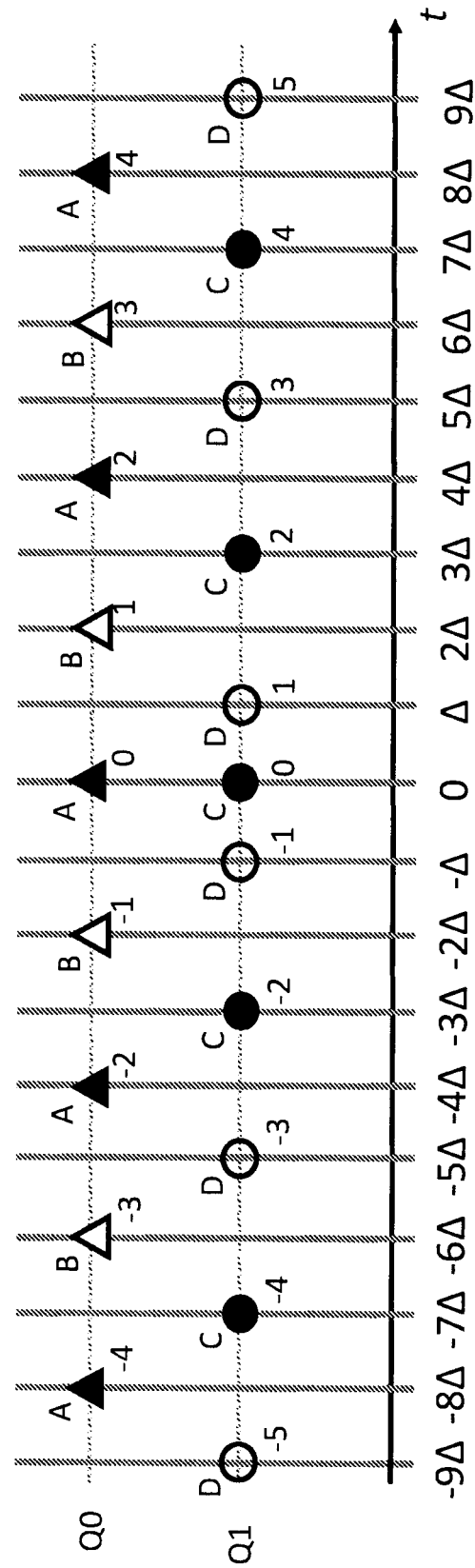
FIG. 9 is an illustration of two scalar quantizers, according to an example of the present disclosure.

The two scalar quantizers used, denoted by Q0 and Q1, are illustrated in FIG. 9. The location of the available reconstruction levels is uniquely specified by a quantization step size Δ. The scalar quantizer used (Q0 or Q1) is not explicitly signalled in the bitstream. Instead, the quantizer used for a current transform coefficient is determined by the parities of the transform coefficient levels that precede the current transform coefficient in coding/reconstruction order.

FIG. 9 shows an illustration of the two scalar quantizers used in the proposed approach of dependent quantization.

As illustrated in FIGS. 10A and 10B, the switching between the two scalar quantizers (Q0 and Q1) is realized via a state machine with four quantizer states (QState). The QState can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 10, where k denotes the value of the transform coefficient level.

FIG. 10A shows a transition diagram illustrating a state transition for the proposed dependent quantization.

FIG. 10B shows a table illustrating a quantizer selection for the proposed dependent quantization.

It is also supported to signal the default and user-defined scaling matrices. The DEFAULT mode scaling matrices are all flat, with elements equal to 16 for all TB sizes. IBC and intra coding modes currently share the same scaling matrices. Thus, for the case of USER_DEFINED matrices, the number of MatrixType and MatrixType_DC are updated as follows:

MatrixType: 30=2 (2 for intra&IBC/inter)×3 (Y/Cb/Cr components)×5 (square TB size: from 4×4 to 64×64 for luma, from 2×2 to 32×32 for chroma).

MatrixType_DC: 14=2 (2 for intra&IBC/inter×1 for Y component)×3 (TB size: 16×16, 32×32, 64×64)+4 (2 for intra&IBC/inter×2 for Cb/Cr components)×2 (TB size: 16×16, 32×32).

The DC values are separately coded for following scaling matrices: 16×16, 32×32, and 64×64. For TBs of size smaller than 8×8, all elements in one scaling matrix are signalled. If the TBs have size greater than or equal to 8×8, only 64 elements in one 8×8 scaling matrix are signalled as a base scaling matrix. For obtaining square matrices of size greater than 8×8, the 8×8 base scaling matrix is up-sampled (by duplication of elements) to the corresponding square size (i.e., 16×16, 32×32, 64×64). When the zeroing-out of the high frequency coefficients for 64-point transform is applied, corresponding high frequencies of the scaling matrices are also zeroed out. That is, if the width or height of the TB is greater than or equal to 32, only left or top half of the coefficients is kept, and the remaining coefficients are assigned to zero. Moreover, the number of elements signalled for the 64×64 scaling matrix is also reduced from 8×8 to three 4×4 submatrices, since the bottom-right 4×4 elements are never used.

Context Modeling for Transform Coefficient Coding

The selection of probability models for the syntax elements related to absolute values of transform coefficient levels depends on the values of the absolute levels or partially reconstructed absolute levels in a local neighbourhood. The template used is illustrated in FIG. 11.

FIG. 11 shows an illustration of the template used for selecting probability models. The black square specifies the current scan position and the squares with an "x" represent the local neighbourhood used.

The selected probability models depend on the sum of the absolute levels (or partially reconstructed absolute levels) in a local neighbourhood and the number of absolute levels greater than 0 (given by the number of sig_coeff_flags equal to 1) in the local neighbourhood. The context modelling and binarization depends on the following measures for the local neighbourhood:

numSig: the number of non-zero levels in the local neighbourhood;

sumAbs1: the sum of partially reconstructed absolute levels (absLevel1) after the first pass in the local neighbourhood;

sumAbs: the sum of reconstructed absolute levels in the local neighbourhood;

diagonal position (d): the sum of the horizontal and vertical coordinates of a current scan position inside the transform block.

Based on the values of numSig, sumAbs1, and d, the probability models for coding sig_coeff_flag, abs_level_gt1_flag, par_level_flag, and abs_level_gt3_flag are selected. The Rice parameter for binarizing abs_remainder and dec_abs_level is selected based on the values of sumAbs and numSig.

In current VVC, reduced 32-point MTS (also called RMTS32) is based on skipping high frequency coefficients and used to reduce computational complexity of 32-point DST-7/DCT-8. And, it accompanies coefficient coding changes including all types of zero-out (i.e., RMTS32 and the existing zero out for high frequency components in DCT2). Specifically, binarization of last non-zero coefficient position coding is coded based on reduced TU size, and the context model selection for the last non-zero coefficient position coding is determined by the original TU size. In addition, 60 context models are used to code the sig_coeff_flag of transform coefficients. The selection of context model index is based on a sum of a maximum of five previously partially reconstructed absolute level called locSumAbsPass1 and the state of dependent quantization QState as follows:

If cIdx is equal to 0, ctxInc is derived as follows:

ctxInc=12*Max(0,$Q$State−1)+Min((locSumAbsPass1+1)>>1,3)+($d$<2?8:($d$<5?4:0))

Otherwise (cIdx is greater than 0), ctxInc is derived as follows:

ctxInc=36+8*Max(0,$Q$State−1)+Min((locSumAbsPass1+1)>>1,3)+($d$<2?4:0)

Palette Mode

The basic idea behind a palette mode is that the samples in the CU are represented by a small set of representative color values. This set is referred to as the palette. It is also possible to indicate a color value that is excluded from the palette by signaling it as an escape color for which the values of three color components are directly signaled in bitstream. This is illustrated in FIG. 12.

Figure 12:
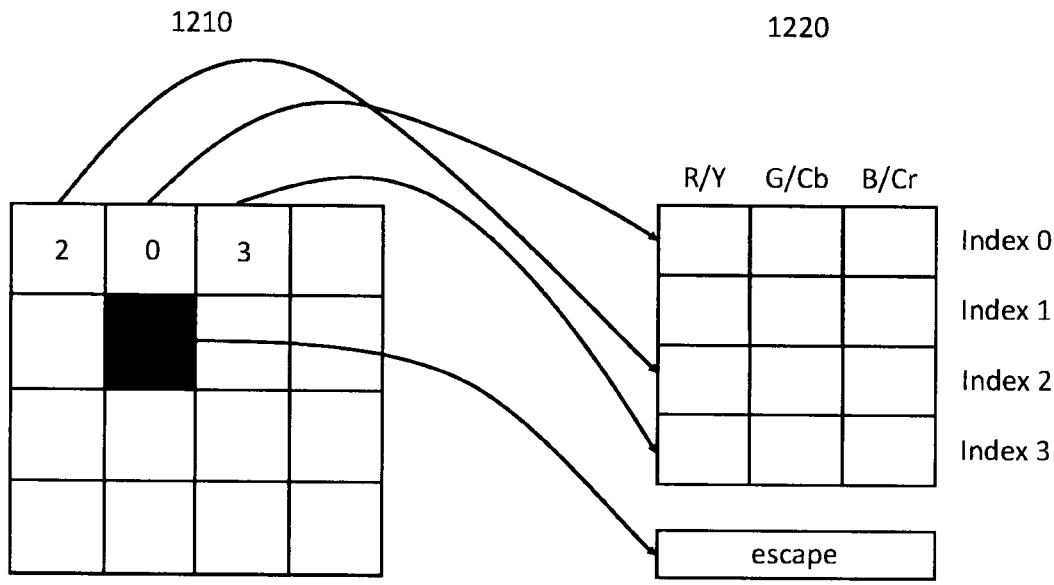
FIG. 12 is an illustration of an example of a block coded in palette mode, according to the present disclosure.

FIG. 12 shows an example of a block coded in palette mode. FIG. 12 includes 1210 block coded in palette mode and 1220 palette.

In FIG. 12, the palette size is 4. The first 3 samples use palette entries 2, 0, and 3, respectively, for reconstruction. The black sample represents an escape symbol. A CU level flag, palette_escape_val_present flag, indicates whether any escape symbols are present in the CU. If escape symbols are present, the palette size is augmented by one and the last index is used to indicate the escape symbol. Thus, in FIG. 12, index 4 is assigned to the escape symbol.

For decoding a palette-coded block, the decoder needs to have the following information:

Palette table;

Palette indices.

If a palette index corresponds to the escape symbol, additional overhead is signaled to indicate the corresponding color values of the sample.

In addition, on the encoder side, it is necessary to derive the appropriate palette to be used with that CU.

For the derivation of the palette for lossy coding, a modified k-means clustering algorithm is used. The first sample of the block is added to the palette. Then, for each subsequent sample from the block, the sum of absolute difference (SAD) between the sample and each of the current palette color is calculated. If the distortion for each of the components is less than a threshold value for the palette entry corresponding to the minimum SAD, the sample is added to the cluster belonging to the palette entry. Otherwise, the sample is added as a new palette entry. When the number of samples mapped to a cluster exceeds a threshold, a centroid for that cluster is updated and becomes the palette entry of that cluster.

In the next step, the clusters are sorted in a descending order of usage. Then, the palette entry corresponding to each entry is updated. Normally, the cluster centroid is used as the palette entry. But a rate-distortion analysis is performed to analyze whether any entry from the palette predictor may be more suitable to be used as the updated palette entry instead of the centroid when the cost of coding the palette entries is taken into account. This process is continued till all the clusters are processed or the maximum palette size is reached. Finally, if a cluster has only a single sample and the corresponding palette entry is not in the palette predictor, the sample is converted to an escape symbol. Additionally, duplicate palette entries are removed and their clusters are merged.

After palette derivation, each sample in the block is assigned the index of the nearest (in SAD) palette entry. Then, the samples are assigned to 'INDEX' or 'COPY_ABOVE' mode. For each sample for which either 'INDEX' or 'COPY_ABOVE' mode is possible. Then, the cost of coding the mode is calculated. The mode for which the cost is lower is selected.

For coding of the palette entries, a palette predictor is maintained. The maximum size of the palette as well as the palette predictor is signaled in the SPS. The palette predictor is initialized at the beginning of each CTU row, each slice and each tile.

For each entry in the palette predictor, a reuse flag is signaled to indicate whether it is part of the current palette. This is illustrated in FIG. 13.

Figure 13:
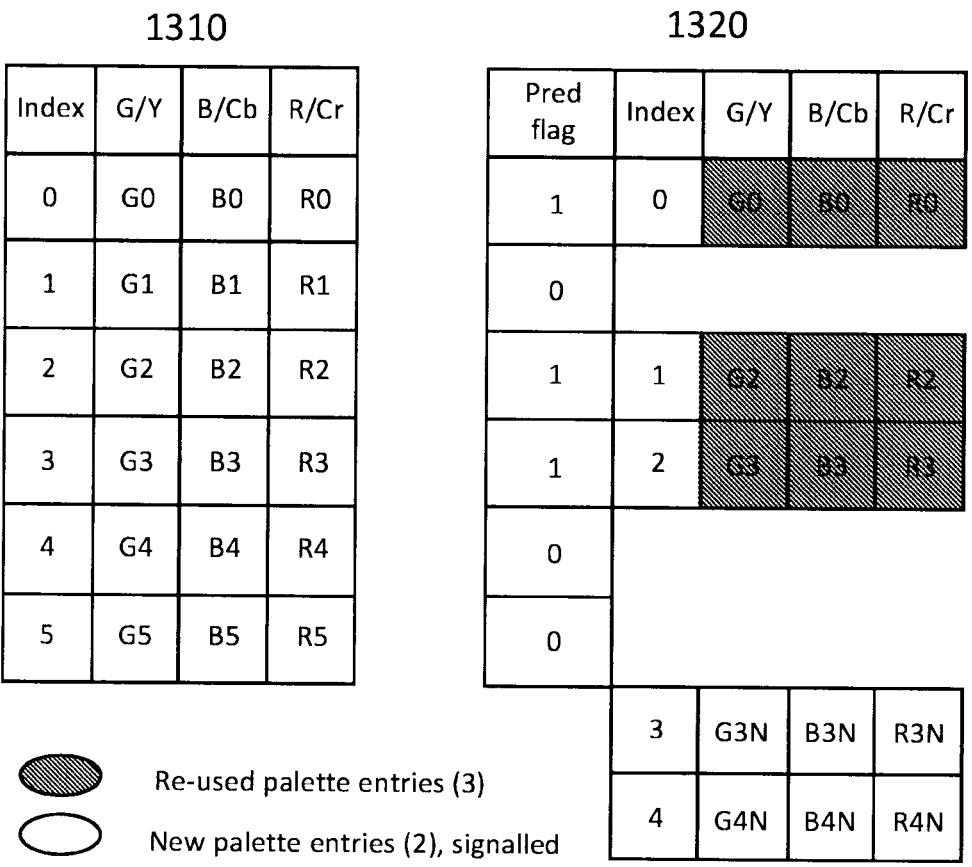
FIG. 13 is an illustration of a use of palette predictor to signal palette entries, according to the present disclosure.

FIG. 13 shows use of palette predictor to signal palette entries. FIG. 13 includes previous palette 1310 and current palette 1320.

The reuse flags are sent using run-length coding of zeros. After this, the number of new palette entries are signaled using exponential Golomb code of order 0. Finally, the component values for the new palette entries are signaled.

The palette indices are coded using horizontal and vertical traverse scans as shown in FIGS. 14A and 14B. The scan order is explicitly signaled in the bitstream using the palette_transpose_flag.

FIG. 14A shows a horizontal traverse scan.

FIG. 14B shows a vertical traverse scan.

For coding palette indices, a line coefficient group (CG) based palette mode is used, which divided a CU into multiple segments with 16 samples based on the traverse scan mode, as shown in FIGS. 15A and 15B, where index runs, palette index values, and quantized colors for escape mode are encoded/parsed sequentially for each CG.

FIG. 15A shows a sub-block-based index map scanning for palette.

FIG. 15B shows a sub-block-based index map scanning for palette.

The palette indices are coded using two main palette sample modes: 'INDEX' and 'COPY_ABOVE'. As explained previously, the escape symbol is assigned an index equal to the maximum palette size. In the 'COPY_ABOVE' mode, the palette index of the sample in the row above is copied. In the 'INDEX' mode, the palette index is explicitly signaled. The encoding order for palette run coding in each segment is as follows:

For each pixel, 1 context coded bin run_copy_flag=0 is signalled indicating if the pixel is of the same mode as the previous pixel, i.e., if the previous scanned pixel and the current pixel are both of run type COPY_ABOVE or if the previous scanned pixel and the current pixel are both of run type INDEX and the same index value. Otherwise, run_copy_flag=1 is signaled.

If the pixel and the previous pixel are of different mode, one context coded bin copy_above_palette_indices_flag is signaled indicating the run type, i.e., INDEX or COPY_ABOVE, of the pixel. Decoder doesn't have to parse run type if the sample is in the first row (horizontal traverse scan) or in the first column (vertical traverse scan) since the INDEX mode is used by default. Also, decoder doesn't have to parse run type if the previously parsed run type is COPY_ABOVE.

After palette run coding of pixels in one segment, the index values for INDEX mode (palette_idx_idc) and quantized escape colors (palette_escape_val) are bypass coded.

Improvements to Residual and Coefficients Coding

In VVC, when coding the transform coefficients, a unified (same) rice parameter (RicePara) derivation is used for signaling the syntax of abs_remainder and dec_abs_level. The only difference is that the base level, baseLevel, is set to 4 and 0 for coding abs_remainder and dec_abs_level, respectively. Rice parameter is determined based on not only the sum of absolute levels of neighboring five transform coefficients in local template, but also the corresponding base level, as follows:

$$RicePara=RiceParTable[max(min(31,sumAbs-5*baseLevel),0)]$$

In other words, the binary codewords for the syntax elements abs_remainder and dec_abs_level are determined adaptively according to the level information of neighboring coefficients. Since this codeword determination is performed for each sample, it requires additional logics to handle this codeword adaptation for coefficients coding.

Similarly, when coding the residual block under transform skip mode, the binary codewords for the syntax elements abs remainder are determined adaptively according to the level information of neighboring residual samples.

Moreover, when coding the syntax elements related to the residual coding or transform coefficients coding, the selection of probability models depends on the level information of the neighbouring levels, which requires additional logics and additional context models.

In current design, the binarization of escape samples is derived by invoking the third order Exp-Golomb binarization process. There is room to further improve its performance.

In current VVC, two different level mapping schemes are available and applied to regular transform and transform skip respectively. Each level mapping scheme is associated with different conditions, mapping function and mapping position. For blocks where the regular transform is applied, a level mapping scheme is used after the number of context-coded bins (CCB) exceeds limit. The mapping position, denoted as ZeroPos[n], and the mapping result, denoted as AbsLevel[xC][yC], are derived as specified in Table 2. For blocks where transform skip is applied, another level mapping scheme is used before the number of context-coded bins (CCB) exceeds limit. The mapping position, denoted as predCoeff, and the mapping result, denoted as AbsLevel[xC][yC], are derived as specified in Table 5. Such non-unified design may not be optimal from standardization point of view.

For profiles beyond 10-bits in HEVC, extended_precision_processing_flag equal to 1 specifies that an extended dynamic range is used for coefficient parsing and inverse transform processing. In current VVC, the residual coding for transform coefficients or transform skip coding above 10-bit is reported as the cause of a significant reduction in performance. There is room to further improve its performance.

Proposed Methods

In this disclosure, several methods are proposed to address the issues mentioned in the section of improvements to residual and coefficients coding. In some embodiments, the following methods may be applied independently or jointly.

According to the first aspect of the disclosure, it is proposed to use a fixed set of binary codewords for coding certain syntax elements, e.g., abs_remainder, in residual coding. The binary codewords can be formed using different methods. Some exemplar methods are listed as follows.

First, the same procedure for determining the codeword for abs_remainder as used in the current VVC is used, but always with a fixed rice parameter (e.g., 1, 2 or 3) selected.

Second, fixed length binarization.

Third, truncated Rice binarization.

Fourth, truncated Binary (TB) binarization process.

Fifth, k-th order Exp-Golomb binarization process (EGk).

Sixth, limited k-th order Exp-Golomb binarization.

According to the second aspect of the disclosure, it is proposed to use a fixed set of codewords for coding certain syntax elements, e.g., abs_remainder and dec_abs_level, in transform coefficient coding. The binary codewords can be formed using different methods. Some exemplar methods are listed as follows.

First, the same procedure for determining the codewords for abs_remainder and dec_abs_level as used in the current VVC is used, but with a fixed rice parameter, e.g., 1, 2 or 3. The value of baseLevel can still be different for abs_remainder and dec_abs_level as used in current VVC. (e.g., baseLevel is set to 4 and 0 for coding abs_remainder and dec_abs_level, respectively).

Second, the same procedure for determining the codewords for abs_remainder and dec_abs_level as used in the current VVC is used, but with a fixed rice parameter, e.g., 1, 2 or 3. The value of baseLevels for abs_remainder and dec_abs_level is chosen to be the same. e.g., both use 0 or both use 4.

Third, fixed length binarization.

Fourth, truncated Rice binarization.

Fifth, truncated Binary (TB) binarization process.

Sixth, k-th order Exp-Golomb binarization process (EGk).

Seventh, limited k-th order Exp-Golomb binarization

According to the third aspect of the disclosure, it is proposed to use single context for the coding of the syntax elements related to the residual coding or coefficient coding (e.g., abs_level_gtx_flag) and the context selection based on the neighboring decoded level information can be removed.

According to the fourth aspect of the disclosure, it is proposed to use variable sets of binary codewords for coding certain syntax elements, e.g. abs_remainder, in residual coding, and the selection of the set of binary codewords is determined according to certain coded information of the current block, e.g. quantization parameter(QP) associated with the TB/CB and/or the slice, the prediction modes of the CU (e.g. IBC mode or intra or inter) and/or the slice type (e.g. I slice, P slice or B slice). Different methods may be used to derive the variable sets of binary codewords, with some exemplar methods listed as follows.

First, the same procedure for determining the codeword for abs_remainder as used in the current VVC is used, but with different rice parameters.

Second, k-th order Exp-Golomb binarization process (EGk)

Third, limited k-th order Exp-Golomb binarization

TABLE 6

Rice parameter determination based on QP value if($QP_{CU}$ <TH1)
{
  rice parameter = K0
}
else if($QP_{CU}$ <TH2)
{
  rice parameter = K1
}
else if($QP_{CU}$ <TH3)
{
  rice parameter = K2
}
else if($QP_{CU}$ <TH4)
{
  rice parameter = K3
}
else
{
  rice parameter = K4
}

The same methods explained in the fourth aspect are also applicable to the transform coefficient coding. According to the fifth aspect of the disclosure, it is proposed to use variable sets of binary codewords for coding certain syntax elements, e.g. abs_remainder and dec_abs_level, in transform coefficient coding, and the selection of the set of binary codewords is determined according to certain coded information of the current block, e.g. quantization parameter(QP) associated with the TB/CB and/or the slice, the prediction modes of the CU (e.g. IBC mode or intra or inter) and/or the slice type (e.g. I slice, P slice or B slice). Again, different methods may be used to derive the variable sets of binary codewords, with some exemplar methods listed as follows.

First, the same procedure for determining the codeword for abs_remainder as used in the current VVC is used, but with different rice parameters.

Second, k-th order Exp-Golomb binarization process (EGk).

Third, limited k-th order Exp-Golomb binarization.

In these methods above, different rice parameters may be used to derive different set of binary codewords. For a given block of residual samples, the rice parameters used are determined according to the CU QP, denoted as $QP_{CU}$, instead of the neighboring level information. One specific example is illustrated as shown in Table 6, where TH1 to TH4 are predefined thresholds satisfying (TH1<TH2<TH3<TH4), and K0 to K4 are predefined rice parameters. In some embodiments, the same logics can be implemented differently in practice. For example, certain equations, or a look-up table, may also be used to derive the same rice parameters, as shown in Table 6, from a QP value of a current CU.

According to the fifth aspect of the disclosure, a set of the parameters and/or thresholds associated with the codewords determination for the syntax elements of transform coefficients coding and/or transform skip residual coding are signaled into the bitstream. The determined codewords are used as binarization codewords when coding the syntax elements through an entropy coder, e.g., arithmetic coding.

In some embodiments, the set of parameters and/or thresholds can be a full set, or a subset of all the parameters and thresholds associated with the codewords determination for the syntax elements. The set of the parameters and/or thresholds can be signaled at different levels in the video bitstream. For example, they can be signaled at sequence level (e.g., the sequence parameter set), picture level (e.g., picture parameter set, and/or picture header), slice level (e.g., slice header), in coding tree unit (CTU) level or at coding unit (CU) level.

In one example, the rice parameter used to determine the codewords for coding abs_remainder syntax in transform skip residual coding is signaled in slice header, picture header, PPS, and/or SPS. The signaled rice parameter is used to determine the codeword for coding the syntax abs_remainder when a CU is coded as transform skip mode and the CU is associated with the above-mentioned slice header, picture header, PPS and/or SPS, etc.

According to the sixth aspect of the disclosure, a set of the parameters and/or thresholds associated with the codewords determination as illustrated in the first and the second aspects are used for the syntax elements of transform coefficients coding and/or transform skip residual coding. And different sets can be used according to whether current block contains luma residual/coefficients or chroma residual/coefficients. The determined codewords are used as binarization codewords when coding the syntax elements through an entropy coder, e.g., arithmetic coding.

In one example, the codeword for abs_remainder associated with transform residual coding as used in the current VVC is used for both luma and chroma blocks, but different fixed rice parameters are used by the luma block and chroma block, respectively. (e.g., K1 for luma block, K2 for chroma block, where K1 and K2 are integer numbers)

According to the seventh aspect of the disclosure, a set of the parameters and/or thresholds associated with the codewords determination for the syntax elements of transform coefficients coding and/or transform skip residual coding are signaled into the bitstream. And different sets can be signaled for luma and chroma blocks. The determined codewords are used as binarization codewords when coding the syntax elements through an entropy coder, e.g., arithmetic coding.

The same methods explained in above aspects are also applicable to the escape value coding in palette mode, e.g., palette_escape_val.

According to the eighth aspect of the disclosure, different k-th orders of Exp-Golomb binarization may be used to derive different set of binary codewords for coding escape values in palette mode. In one example, for a given block of escape samples, the Exp-Golomb parameter used, i.e., the value of k, is determined according to the QP value of the block, denoted as $QP_{CU}$. The same example as illustrated in Table 6 can be used in deriving the value of parameter k based on a given QP value of the block. Although in that example four different threshold values (from TH1 to TH4) are listed, and five different k values (from K0 to K4) may be derived based on these threshold values and $QP_{CU}$, it is worth mentioning that the number of threshold values is for illustration purpose only. In practice, different number of threshold values may be used to partition the whole QP value range into different number of QP value segments, and for each QP value segment, a different k value may be used to derive corresponding binary codewords for coding escape values of a block which is coded in palette mode. It is also worth noting that the same logics can be implemented differently in practice. For example, certain equations, or a look-up table, may be used to derive the same rice parameters.

According to the ninth aspect of the disclosure, a set of the parameters and/or thresholds associated with the codewords determination for the syntax elements of escape sample is signaled into the bitstream. The determined codewords are used as binarization codewords when coding the syntax elements of escape samples through an entropy coder, e.g., arithmetic coding.

In some embodiments, the set of parameters and/or thresholds can be a full set, or a subset of all the parameters and thresholds associated with the codewords determination for the syntax elements. The set of the parameters and/or thresholds can be signaled at different levels in the video bitstream. For example, they can be signaled at sequence level (e.g., the sequence parameter set), picture level (e.g., picture parameter set, and/or picture header), slice level (e.g., slice header), in coding tree unit (CTU) level or at coding unit (CU) level.

In one example according to the aspect, the k-th orders of Exp-Golomb binarization is used to determine the codewords for coding palette_escape_val syntax in palette mode, and the value of k is signaled in bitstream to decoder. The value of k may be signaled at different levels, e.g., it may be signaled in slice header, picture header, PPS, and/or SPS, etc. The signaled Exp-Golomb parameter is used to determine the codeword for coding the syntax palette_escape_val when a CU is coded as palette mode and the CU is associated with the above-mentioned slice header, picture header, PPS and/or SPS, etc.

Harmonization of the Level Mapping for Transform Skip Mode and Regular Transform Mode According to the tenth aspect of the disclosure, a same condition for applying level mapping is used for both transform skip mode and regular transform mode. In one example, it is proposed to apply the level mapping after the number of context-coded bins (CCB) exceeds limit for both transform skip mode and regular transform mode. In another example, it is proposed to apply the level mapping before the number of context-coded bins (CCB) exceeds limit for both transform skip mode and regular transform mode.

According to the eleventh aspect of the disclosure, a same method for the derivation of mapping position in level mapping is used for both transform skip mode and regular transform mode. In one example, it is proposed to apply the derivation method of mapping position in level mapping that is used under transform skip mode to the regular transform mode as well. In another example, it is proposed to apply the derivation method of mapping position in level mapping that is used under regular transform mode to the transform skip mode as well.

According to the twelfth aspect of the disclosure, a same level mapping method is applied to both transform skip mode and regular transform mode. In one example, it is proposed to apply the level mapping function that is used under transform skip mode to the regular transform mode as well. In another example, it is proposed to apply the level mapping function that is used under regular transform mode to the transform skip mode as well.

Simplification of Rice Parameter Derivation in Residual Coding

According to the thirteenth aspect of the disclosure, it is proposed to use simple logic, such as the shift or division operation, instead of lookup table for the derivation of rice parameter in coding the syntax element of abs_remainder/dec_abs_level using Golomb-Rice code. According to the current disclosure, the lookup table, as specified in Table 4, may be removed. In one example, the Rice parameter cRiceParam is derived as: cRiceParam=(locSumAbs>>n), where n is a positive number, e.g., 3. In some embodiments, other different logics may be used to achieve the same results, e.g., a division operation by a value equal to 2 to the power of n. An example of the corresponding decoding process based on VVC Draft is illustrated as below with changes in bold and italic font and deleted content shown in italic font.

TABLE 7

Rice parameter derivation process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
  locSumAbs = 0
  if( xC < (1 << 1og2TbWidth) - 1 ) {
    locSumAbs += AbsLevel[ xC + 1 ][ yC ]
    if( xC < (1 << log2TbWidth) - 2 )
      locSumAbs += AbsLevel[ xC + 2 ][ yC ]
    if( yC < (1 << log2TbHeight) - 1 )
      locSumAbs += AbsLevel[ xC + 1 ][ yC + 1 ]   (1494)
  }
  if( yC < (1 << log2TbHeight) - 1 ) {
    locSumAbs += AbsLevel[ xC ][ yC + 1 ]
    if( yC < (1 << log2TbHeight) - 2 )
      locSumAbs += AbsLevel[ xC ][ yC + 2 ]
  }
  locSumAbs = Clip3( 0, 31, locSumAbs - baseLevel * 5 )
Given the variable locSumAbs, the Rice parameter cRiceParam is derived
as follows:_specified in_
_Table 4._
cRiceParam = (locSumAbs >> 3)
When baseLevel is equal to 0, the variable ZeroPos[ n ] is derived as follows:
ZeroPos[ n ] = ( QState < 2 ? 1 : 2 ) << cRiceParam According to the fourteenth aspect of the disclosure, it is proposed to use less neighbor positions for the derivation of rice parameter in coding the syntax element of abs_remainder/dec_abs_level using Golomb-Rice code. In one example, it is proposed to only use 2 neighbor positions for the derivation of rice parameter in coding the syntax element of abs_remainder/dec_abs_level. The corresponding decoding process based on VVC Draft is illustrated as below, with changes in bold and italic font and deleted content shown in italic font.

TABLE 8

Rice parameter derivation process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary TABLE 8-continued Rice parameter derivation process logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
  locSumAbs = 0
  if( xC < (1 << log2TbWidth) - 1 ) {
    locSumAbs += AbsLevel[ xC + 1 ][ yC ]
  }
  if( yC < (1 << log2TbHeight) - 1 ) {
    locSumAbs += AbsLevel[ xC ][ yC + 1 ]
  }
  locSumAbs = Clip3(0, 31, locSumAbs - baseLevel *52* )
Given the variable locSumAbs, the Rice parameter cRiceParam is derived as specified in Table 4.
When baseLevel is equal to 0, the variable ZeroPos[ n ] is derived as follows:
ZeroPos[ n ] = ( QState < 2 ? 1 : 2 ) << cRiceParam In another example, it is propose to only use one neighbor position or the derivation of rice parameter in coding the syntax element of abs_remainder/dec_abs_level. The corresponding decoding process based on VVC Draft is illustrated as below, with changes in bold and italic font and deleted content shown in italic font.

TABLE 9

Rice parameter derivation process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
  locSumAbs = 0
  if( xC < (1 << log2TbWidth) - 1 ) {
    locSumAbs += AbsLevel[ xC + 1 ][ yC ]
    *if( xC < (1 << log2TbWidth) - 2 )*
  }
  locSumAbs = Clip3( 0, 31, locSumAbs - baseLevel )
Given the variable locSumAbs, the Rice parameter cRiceParam is derived as specified in Table 4.
When baseLevel is equal to 0, the variable ZeroPos[ n ] is derived as follows:
ZeroPos[ n ] = ( QState < 2 ? 1 : 2 ) << cRiceParam According to the fifteenth aspect of the disclosure, it is proposed to use different logics to adjust the value of locSumAbs based on the value of baseLevel for the derivation of rice parameter in coding the syntax element of abs_remainder/dec_abs_level using Golomb-Rice code. In one example, additional scale and offset operations are applied in the form of "(locSumAbs−baseLevel*5)*alpha+beta". When alpha takes a value of 1.5 and beta takes a value of 1, the corresponding decoding process based on VVC Draft is illustrated as below, with changes in bold and italic font and deleted content shown in italic font.

TABLE 10

Rice parameter derivation process

Inputs to this process are the base level baseLevel, the colour component index cIdx, the luma location ( x0, y0 ) specifying the top-left sample of the current transform block relative to the top-left sample of the current

TABLE 10-continued

Rice parameter derivation process picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
```
   locSumAbs = 0
   if( xC < (1 << log2TbWidth) - 1 ) {
      locSumAbs += AbsLevel[ xC + 1 ][ yC ]
      if( xC < (1 << log2TbWidth) - 2 )
         locSumAbs += AbsLevel[ xC + 2 ][ yC ]
      if( yC < (1 << log2TbHeight) - 1 )
         locSumAbs += AbsLevel[ xC + 1 ][ yC + 1 ]   (1494)
   }
   if( yC < (1 << log2TbHeight) - 1 ) {
      locSumAbs += AbsLevel[ xC ][ yC + 1 ]
      if( yC < (1 << log2TbHeight) - 2 )
         locSumAbs += AbsLevel[ xC ][ yC + 2 ]
   }
   locSumAbs = Clip3( 0, 31, (locSumAbs - baseLevel * 5) *1.5 +1 )
```
Given the variable locSumAbs, the Rice parameter cRiceParam is derived as specified in Table 4.
When baseLevel is equal to 0, the variable ZeroPos[ n ] is derived as follows:
ZeroPos[ n ] = ( QState < 2 ? 1 : 2 ) << cRiceParam According to the sixteenth aspect of the disclosure, it is proposed to remove clip operations for the derivation of rice parameter in the syntax element of abs_remainder/dec_abs_level using Golomb-Rice code. According to the current disclosure, an example of the decoding process on VVC Draft is illustrated as below, with changes in bold and italic font and deleted content shown in italic font.

TABLE 11

Rice parameter derivation process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
```
   locSumAbs = 0
   if( xC < (1 << log2TbWidth) - 1 ) {
      locSumAbs += AbsLevel[ xC + 1 ][ yC ]
      if( xC < (1 << log2TbWidth) - 2 )
         locSumAbs += AbsLevel[ xC + 2 ][ yC ]
      if( yC < (1 << log2TbHeight) - 1 )
         locSumAbs += AbsLevel[ xC + 1 ][ yC + 1 ]   (1494)
   }
   if( yC < (1 << log2TbHeight) - 1 ) {
      locSumAbs += AbsLevel[ xC ][ yC + 1 ]
      if( yC < (1 << log2TbHeight) - 2 )
         locSumAbs += AbsLevel[ xC ][ yC + 2 ]
   }
   locSumAbs = locSumAbs - baseLevel * 5
```
Given the variable locSumAbs, the Rice parameter cRiceParam is derived
as follows:*specified in*
*Table 4.*
*cRiceParam = (locSumAbs >> 3)*
When baseLevel is equal to 0, the variable ZeroPos[ n ] is derived as follows:
ZeroPos[ n ] = ( QState < 2 ? 1 : 2 ) << cRiceParam According to the current disclosure, an example of the decoding process on VVC Draft is illustrated as below, with changes in bold and italic font and deleted content shown in italic font.

TABLE 12

Rice parameter derivation process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
```
   locSumAbs = 0
   if( xC < (1 << log2TbWidth) - 1 ) {
      locSumAbs += AbsLevel[ xC + 1 ][ yC ]
      if( xC < (1 << log2TbWidth) - 2 )
         locSumAbs += AbsLevel[ xC + 2 ][ yC ]
      if( yC < (1 << log2TbHeight) - 1 )
         locSumAbs += AbsLevel[ xC + 1 ][ yC + 1 ]   (1494)
   }
   if( yC < (1 << log2TbHeight) - 1 ) {
      locSumAbs += AbsLevel[ xC ][ yC + 1 ]
      if( yC < (1 << log2TbHeight) - 2 )
         locSumAbs += AbsLevel[ xC ][ yC + 2 ]
   }
   locSumAbs = Min(31, locSumAbs - baseLevel * 5)
```
Given the variable locSumAbs, the Rice parameter cRiceParam is derived as specified in Table 4.
When baseLevel is equal to 0, the variable ZeroPos[ n ] is derived as follows:
ZeroPos[ n ] = ( QState < 2 ? 1 : 2 ) << cRiceParam According to the seventeenth aspect of the disclosure, it is proposed to change the initial value of locSumAbs from 0 to a non-zero integer for the derivation of rice parameter in coding the syntax element of abs_remainder/dec_abs_level using Golomb-Rice code. In one example, an initial value of 1 is assigned to locSumAbs, and the corresponding decoding process based on VVC Draft is illustrated as below, with changes in bold and italic font and deleted content shown in italic font.

TABLE 13

Rice parameter derivation process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
```
   locSumAbs = 1
   if( xC < (1 << log2TbWidth) - 1 ) {
      locSumAbs += AbsLevel[ xC + 1 ][ yC ]
      if( xC < (1 << log2TbWidth) - 2 )
         locSumAbs += AbsLevel[ xC + 2 ][ yC ]
      if( yC < (1 << log2TbHeight) - 1 )
         locSumAbs += AbsLevel[ xC + 1 ][ yC + 1 ]   (1494)
   }
   if( yC < (1 << log2TbHeight) - 1 ) {
      locSumAbs += AbsLevel[ xC ][ yC + 1 ]
      if( yC < (1 << log2TbHeight) - 2 )
         locSumAbs += AbsLevel[ xC ][ yC + 2 ]
   }
   locSumAbs = Clip3( 0, 31, locSumAbs - baseLevel * 5 )
```
Given the variable locSumAbs, the Rice parameter cRiceParam is derived as specified in Table 4.
When baseLevel is equal to 0, the variable ZeroPos[ n ] is derived as follows:
ZeroPos[ n ] = ( QState < 2 ? 1 : 2 ) << cRiceParam According to the eighteenth aspect of the disclosure, it is proposed to use the max value of neighbor position level values instead of their sum value for the derivation of rice parameter in coding the syntax element of abs_remainder/dec_abs_level using Golomb-Rice code. An example of the corresponding decoding process based on VVC Draft is illustrated as below, with changes in bold and italic font and deleted content shown in italic font.

TABLE 14

Rice parameter derivation process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
  locSumAbs = 0
  if( xC < (1 << log2TbWidth) − 1 ) {
    locSumAbs *+*= *Max*( AbsLevel[ xC + 1 ][ yC ]*, locSumAbs* )
    if( xC < (1 << log2TbWidth) − 2 )
      locSumAbs *+*= *Max*( AbsLevel[ xC + 2 ][ yC ]*, locSumAbs* )
    if( yC < (1 << log2TbHeight) − 1 )
      locSumAbs *+*= *Max*( AbsLevel[ xC + 1 ][ yC + 1 ]*, locSumAbs* )
    (1494)
  }
  if( yC < (1 << log2TbHeight) − 1 ) {
    locSumAbs *+*= *Max*( AbsLevel[ xC ][ yC + 1 ]*, locSumAbs* )
    if( yC < (1 << log2TbHeight) − 2 )
      locSumAbs *+*= *Max*( AbsLevel[ xC ][ yC + 2 ]*, locSumAbs* )
  }
  locSumAbs = Clip3( 0, 31, locSumAbs − baseLevel * *5* )
Given the variable locSumAbs, the Rice parameter cRiceParam is derived as specified in Table 4.
When baseLevel is equal to 0, the variable ZeroPos[ n ] is derived as follows:
ZeroPos[ n ] = ( QState < 2 ? 1 : 2 ) << cRiceParam According to the nineteenth aspect of the disclosure, it is propose to derive the rice parameter based on the relative amplitude of each AbsLevel value at neighboring positions and the base level value, in coding the syntax element of abs_remainder/dec_abs_level using Golomb-Rice code. In one example, the rice parameter is derived based on how many of the AbsLevel values at neighboring positions are greater than the base level. An example of the corresponding decoding process based on VVC Draft is illustrated as below, with changes in bold and italic font and deleted content shown in italic font.

TABLE 15

Rice parameter derivation process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
  locSumAbs = 0
  if( xC < (1 << log2TbWidth ) − 1 ) {
    locSumAbs += ( AbsLevel[ xC + 1 ][ yC ] *>baseLevel? 1:0*)
    if( xC < (1 << log2TbWidth) − 2 )
      locSumAbs += ( AbsLevel[ xC + 2 ][ yC ] *> baseLevel? 1:0*)
    if( yC < (1 << log2TbHeight) − 1 )

TABLE 15-continued

Rice parameter derivation process locSumAbs += ( AbsLevel[ xC + 1 ][ yC + 1 ] > *baseLevel? 1:0*)
    (1494)
  }
  if( yC < (1 << log2TbHeight) − 1 ) {
    locSumAbs += ( AbsLevel[ xC ][ yC + 1 ] > *baseLevel? 1:0*)
    if( yC < (1 << log2TbHeight) − 2 )
      locSumAbs += ( AbsLevel[ xC ][ yC + 2 ] > *baseLevel? 1:0*)
  }
Given the variable locSumAbs, the Rice parameter cRiceParam is derived *as follows:*specified in
Table 4.
*cRiceParam = locSumAbs*
When baseLevel is equal to 0, the variable ZeroPos[ n ] is derived as follows:
ZeroPos[ n ] = ( QState < 2 ? 1 : 2 ) << cRiceParam In another example, the rice parameter is derived based on the sum of the (AbsLevel−baseLevel) values for those neighbor positions whose AbsLevel values are greater than the base level. An example of the corresponding decoding process based on VVC Draft is illustrated as below, with changes in bold and italic font and deleted content shown in italic font.

TABLE 16

Rice parameter derivation process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
  locSumAbs = 0
  if( xC < (1 << log2TbWidth) − 1 ) {
    locSumAbs += *Max*( *0 ,* AbsLevel[ xC + 1 ][ yC ] − *baseLevel*)
    if( xC < (1 << log2TbWidth ) − 2 )
      locSumAbs += *Max*( *0 ,* AbsLevel[ xC + 2 ][ yC ] − *baseLevel*)
    if( yC < (1 << log2TbHeight) − 1 )
      locSumAbs += *Max*( *0 ,* AbsLevel[ xC + 1 ][ yC + 1 ] − *baseLevel*)  (1494)
  }
  if( yC < (1 << log2TbHeight) − 1 ) {
    locSumAbs += *Max*( *0 ,* AbsLevel[ xC ][ yC + 1 ] − *baseLevel*)
    if( yC < (1 << log2TbHeight) − 2 )
      locSumAbs += *Max*( *0 ,* AbsLevel[ xC ][ yC + 2 ] − *baseLevel*)
  }
  locSumAbs = *Min*( 31, locSumAbs )
Given the variable locSumAbs, the Rice parameter cRiceParam is derived as specified in Table 4.
When baseLevel is equal to 0, the variable ZeroPos[ n ] is derived as follows:
ZeroPos[ n ] = ( QState < 2 ? 1 : 2 ) << cRiceParam According to the current disclosure, one example of the decoding process on VVC Draft is illustrated as below, with changes in bold and italic font and deleted content shown in italic font.

TABLE 17

Rice parameter derivation process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary

TABLE 17-continued

Rice parameter derivation process logarithm of the transform block height log2TbHeight.
Output of this process is the Rice parameter cRiceParam.
Given the array AbsLevel[ x ][ y ] for the transform block with
component index cIdx and the top-left luma location ( x0, y0 ), the
variable locSumAbs is derived as specified by the following pseudo code:
   locSumAbs = 0
   if( xC < (1 << log2TbWidth) − 1 ) {
     locSumAbs += AbsLevel[ xC + 1 ][ yC ] − baseLevel
     if( xC < (1 << log2TbWidth) − 2 )
       locSumAbs += AbsLevel[ xC + 2 ][ yC ] − baseLevel
     if( yC < (1 << log2TbHeight) − 1 )
       locSumAbs += AbsLevel[ xC + 1 ][ yC + 1 ] − baseLevel  (1494)
   }
   if( yC < (1 << log2TbHeight) − 1 ) {
     locSumAbs += AbsLevel[ xC ][ yC + 1 ] − baseLevel
     if( yC < (1 << log2TbHeight) − 2 )
       locSumAbs += AbsLevel[ xC ][ yC + 2 ] − baseLevel
   }
   locSumAbs = Clip3( 0, 31, locSumAbs )
Given the variable locSumAbs, the Rice parameter cRiceParam is derived
as specified in Table 4.
When baseLevel is equal to 0, the variable ZeroPos[ n ] is derived as
follows:
ZeroPos[ n ] = ( QState < 2 ? 1 : 2 ) << cRiceParam Simplification of Level Mapping Position Derivation in Residual Coding According to the twentieth aspect of the disclosure, it is proposed to remove QState from the derivation of ZeroPos[n] so that ZeroPos[n] is solely derived from cRiceParam. An example of the corresponding decoding process based on VVC Draft is illustrated as below, with changes in bold and italic font and deleted content shown in italic font.

TABLE 18

Rice parameter derivation process

Inputs to this process are the base level baseLevel, the colour component
index cIdx, the luma location ( x0, y0 ) specifying the top-left sample of
the current transform block relative to the top-left sample of the current
picture, the current coefficient scan location ( xC, yC ), the binary
logarithm of the transform block width log2TbWidth, and the binary
logarithm of the transform block height log2TbHeight.
Output of this process is the Rice parameter cRiceParam.
Given the array AbsLevel[ x ][ y ] for the transform block with
component index cIdx and the top-left luma location ( x0, y0 ), the
variable locSumAbs is derived as specified by the following pseudo code:
   locSumAbs = 0
   if( xC < (1 << log2TbWidth) − 1 ) {
     locSumAbs += AbsLevel[ xC + 1 ][ yC ]
     if( xC < (1 << log2TbWidth) − 2 )
       locSumAbs += AbsLevel[ xC + 2 ][ yC ]
     if( yC < (1 << log2TbHeight ) − 1 )
       locSumAbs += AbsLevel[ xC + 1 ][ yC + 1 ]  (1494)
   }
   if( yC < (1 << log2TbHeight) − 1 ) {
     locSumAbs += AbsLevel[ xC ][ yC + 1 ]
     if( yC < (1 << log2TbHeight) − 2 )
       locSumAbs += AbsLevel[ xC ][ yC + 2 ]
   }
   locSumAbs = Clip3( 0, 31, locSumAbs − baseLevel * 5 )
Given the variable locSumAbs, the Rice parameter cRiceParam is derived
as specified in Table 4.
When baseLevel is equal to 0, the variable ZeroPos[ n ] is derived as
follows:
ZeroPos[ n ] =2 << cRiceParam According to the twenty-first aspect of the disclosure, it is proposed to derive ZeroPos[n] based on the value of locSumAbs. An example of the corresponding decoding process based on VVC Draft is illustrated as below, with changes in bold and italic font and deleted content shown in italic font.

TABLE 19

Rice parameter derivation process

Inputs to this process are the base level baseLevel, the colour component
index cIdx, the luma location ( x0, y0 ) specifying the top-left sample of
the current transform block relative to the top-left sample of the current
picture, the current coefficient scan location ( xC, yC ), the binary
logarithm of the transform block width log2TbWidth, and the binary
logarithm of the transform block height log2TbHeight.
Output of this process is the Rice parameter cRiceParam.
Given the array AbsLevel[ x ][ y ] for the transform block with
component index cIdx and the top-left luma location ( x0, y0 ), the
variable locSumAbs is derived as specified by the following pseudo code:
   locSumAbs = 0
   if( xC < (1 << log2TbWidth) − 1 ) {
     locSumAbs += AbsLevel[ xC + 1 ][ yC ]
     if( xC < (1 << log2TbWidth) − 2 )
       locSumAbs += AbsLevel[ xC + 2 ][ yC ]
     if( yC < (1 << log2TbHeight) − 1 )
       locSumAbs += AbsLevel[ xC + 1 ][ yC + 1 ]  (1494)
   }
   if( yC < (1 << log2TbHeight) − 1 ) {
     locSumAbs += AbsLevel[ xC ][ yC + 1 ]
     if( yC < (1 << log2TbHeight) − 2 )
       locSumAbs += AbsLevel[ xC ][ yC + 2 ]
   }
   locSumAbs = Clip3( 0, 31, locSumAbs − baseLevel * 5 )
Given the variable locSumAbs, the Rice parameter cRiceParam is derived
as specified in Table 4.
When baseLevel is equal to 0, the variable ZeroPos[ n ] is derived as
follows:
ZeroPos[ n ] = locSumAbs

According to the twenty-second aspect of the disclosure, it is proposes to derive ZeroPos[n] based on the value of AbsLevel of neighboring positions. In one example, ZeroPos[n] is derived based on the maximum value among of AbsLevel[xC+1][yC] and AbsLevel[xC][yC+1]. An example of the corresponding decoding process based on VVC Draft is illustrated as below, with changes in bold and italic font and deleted content shown in italic font.

TABLE 20

Rice parameter derivation process

Inputs to this process are the base level baseLevel, the colour component
index cIdx, the luma location ( x0, y0 ) specifying the top-left sample of
the current transform block relative to the top-left sample of the current
picture, the current coefficient scan location ( xC, yC ), the binary
logarithm of the transform block width log2TbWidth, and the binary
logarithm of the transform block height log2TbHeight.
Output of this process is the Rice parameter cRiceParam.
Given the array AbsLevel[ x ][ y ] for the transform block with
component index cIdx and the top-left luma location ( x0, y0 ), the
variable locSumAbs is derived as specified by the following pseudo code:
   locSumAbs = 0
   *ZeroPos[ n ] = 1*
   if( xC < (1 << log2TbWidth) − 1 ) {
     locSumAbs += AbsLevel[ xC + 1 ][ yC ]
     *ZeroPos[ n ] = Max(AbsLevel[ xC + 1 ][ yC ], ZeroPos[ n ])*
     if( xC < (1 << log2TbWidth) − 2 )
       locSumAbs += AbsLevel[ xC + 2 ][ yC ]
     if( yC < (1 << log2TbHeight) − 1 )
       locSumAbs += AbsLevel[ xC + 1 ][ yC + 1 ]  (1494)
   }
   if( yC < (1 << log2TbHeight) − 1 ) {
     locSumAbs += AbsLevel[ xC ][ yC + 1 ]
     *ZeroPos[ n ] = Max( AbsLevel[ xC ][ yC + 1 ], ZeroPos[ n ])*
     if( yC < (1 << log2TbHeight) − 2 )
       locSumAbs += AbsLevel[ xC ][ yC + 2 ]
   }
   locSumAbs = Clip3( 0, 31, locSumAbs − baseLevel * 5 )
Given the variable locSumAbs, the Rice parameter cRiceParam is derived
as specified in Table 4.

TABLE 20-continued

Rice parameter derivation process

When baseLevel is equal to 0, the variable ZeroPos[ n ] is derived as follows:
*ZeroPos[ n ] = ZeroPos[ n ]\*1.25 + 1*

According to the twenty-third aspect of the disclosure, it is proposed to derive both cRiceParam and ZeroPos[n] based on the maximum value of all the AbsLevel values of neighboring positions. An example of the corresponding decoding process based on VVC Draft is illustrated as below, with changes in bold and italic font and deleted content shown in italic font.

TABLE 21

Rice parameter derivation process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
  locSumAbs = 0
  if( xC < (1 << log2TbWidth) − 1 ) {
    locSumAbs = *Max*( AbsLevel[ xC + 1 ][ yC ], *locSumAbs* )
    if( xC < (1 << log2TbWidth) − 2 )
      locSumAbs = *Max*( AbsLevel[ xC + 2 ][ yC ], *locSumAbs* )
    if( yC < (1 << log2TbHeight) − 1 )
      locSumAbs = *Max*( AbsLevel[ xC + 1 ][ yC + 1 ], *locSumAbs* )
    (1494)
  }
  if( yC < (1 << log2TbHeight) − 1 ) {
    locSumAbs = *Max*( AbsLevel[ xC ][ yC + 1 ], *locSumAbs* )
    if( yC < (1 << log2TbHeight) − 2 )
      locSumAbs = *Max*( AbsLevel[ xC ][ yC + 2 ], *locSumAbs* )
  }
  locSumAbs = Max ( 0, locSumAbs − baseLevel )
Given the variable locSumAbs, the Rice parameter cRiceParam is derived *as follows:*
*cRiceParam = Min( (locSumAbs >> 2) , 3 )*
When baseLevel is equal to 0, the variable ZeroPos[ n ] is derived as follows:
ZeroPos[ n ] = *locSumAbs*

The same methods explained in above aspects are also applicable to the derivation of predCoeff in residual coding for transform skip mode. In one example, the variable predCoeff is derived as follows:

predCoeff=Max(absLeftCoeff,absAboveCoeff)+1

Residual Coding for Transform Coefficients

In this disclosure, to address the issues as pointed out in the "improvements to residual and coefficients coding" section, methods are provided to simplify and/or further improve the existing design of the residual coding. In general, the main features of the proposed technologies in this disclosure are summarized as follows.

First, adjust the rice parameter derivation used under regular residual coding based on current design.

Second, change the binary methods used under regular residual coding.

Third, change the rice parameter derivation used under regular residual coding.

Rice Parameter Derivation in Residual Coding Based on Current Design

According to the twenty-fourth aspect of the disclosure, it is proposed to use variable methods of rice parameter derivations for coding certain syntax elements, e.g. abs_remainder/dec_abs_level, in residual coding, and the selection is determined according to certain coded information of the current block, e.g. quantization parameter or coding bit-depth associated with the TB/CB and/or the slice/profile, and/or according to a new flag associated with the TB/CB/slice/picture/sequence level, e.g. extended_precision_processing_flag. Different methods may be used to derive the rice parameter, with some exemplar methods listed as follows.

First, cRiceParam=(cRiceParam<<a)+(cRiceParam>>b)+c, where a, b and c are positive number, e.g. {a,b,c}={1,1,0}. In some embodiments, other different logics may be used to achieve the same results, e.g., a multiplication operation by a value equal to 2 to the power of n.

Second, cRiceParam=(cRiceParam<<a)+b, where a and b are positive number, e.g. {a,b}={1,1}. In some embodiments, other different logics may be used to achieve the same results, e.g., a multiplication operation by a value equal to 2 to the power of n.

Third, cRiceParam=(cRiceParam*a)+b, where a and b are positive number, e.g. {a,b}={1.5,0}. In some embodiments, other different logics may be used to achieve the same results, e.g., a multiplication operation by a value equal to 2 to the power of n.

An example of the corresponding decoding process based on VVC Draft is illustrated as below, with changes in bold and italic font and deleted content shown in italic font. The changes to the VVC Draft are shown in Table 22 in in bold and italic font. In some embodiments, the same logics can be implemented differently in practice. For example, certain equations, or a look-up table, may also be used to derive the same rice parameters, from a BitDepth value of a current CU/Sequence.

TABLE 22

Rice parameter derivation process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight, .
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
  locSumAbs = 0
  if( xC < (1 << log2TbWidth) − 1 ) {
    locSumAbs += AbsLevel[ xC + 1 ][ yC ]
    if( xC < (1 << log2TbWidth) − 2 )
      locSumAbs += AbsLevel[ xC + 2 ][ yC ]
    if( yC < (1 << log2TbHeight) − 1 )
      locSumAbs += AbsLevel[ xC + 1 ][ yC + 1 ]  (1494)
  }
  if( yC < (1 << log2TbHeight) − 1 ) {
    locSumAbs += AbsLevel[ xC ][ yC + 1 ]
    if( yC < (1 << log2TbHeight) − 2 )
      locSumAbs += AbsLevel[ xC ][ yC + 2 ]
  }
  locSumAbs = Clip3( 0, 31, locSumAbs − baseLevel * 5 )
Given the variable locSumAbs, the Rice parameter cRiceParam is derived specified in Table 4.
*If extended_precision_processing_flag is equal to 1, the Rice parameter cRiceParam is specified as below.*
  *if(BitDepth <11)*
    *{*
      *cRiceParam = cRiceParam*
    *}*

TABLE 22-continued

Rice parameter derivation process

```
    else if(BitDepth <13)
    {
        cRiceParam = cRiceParam + (cRiceParam >> 1)
    }
    else if(BitDepth <15)
    {
        cRiceParam = cRiceParam << 1
    }
    else
    {
  cRiceParam = cRiceParam << 1+ (cRiceParam >> 1)
    }
```
When baseLevel is equal to 0, the variable ZeroPos[ n ] is derived as follows:
ZeroPos[ n ] = ( QState < 2 ? 1 : 2 ) << cRiceParam In another example, when BitDepth is greater than or equal to the predefined threshold (e.g., 10, 11, 12, 13, 14, 15 or 16), the Rice parameter cRiceParam is derived as: cRiceParam=(cRiceParam<<a)+(cRiceParam>>b)+c, where a, b and c are positive number, e.g., 1. The corresponding decoding process based on VVC Draft is illustrated as below, with changes in bold and italic font and deleted content shown in italic font. The changes to the VVC Draft are shown in Table 23 in bold and italic font. In some embodiments, the same logics can be implemented differently in practice. For example, certain equations, or a look-up table, may also be used to derive the same rice parameters, from a BitDepth value of a current CU/Sequence.

TABLE 23

Rice parameter derivation process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight, .
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
```
    locSumAbs = 0
    if( xC < (1 << log2TbWidth) - 1 ) {
        locSumAbs += AbsLevel[ xC + 1 ][ yC ]
        if( xC < (1 << log2TbWidth) - 2 )
            locSumAbs += AbsLevel[ xC + 2 ][ yC ]
        if( yC < (1 << log2TbHeight) - 1 )
            locSumAbs += AbsLevel[ xC + 1 ][ yC + 1 ]    (1494)
    }
    if( yC < (1 << log2TbHeight) - 1 ) {
        locSumAbs += AbsLevel[ xC ][ yC + 1 ]
        if( yC < (1 << log2TbHeight) - 2 )
            locSumAbs += AbsLevel[ xC ][ yC + 2 ]
    }
    locSumAbs = Clip3( 0, 31, locSumAbs - baseLevel * 5 )
```
Given the variable locSumAbs, the Rice parameter cRiceParam is derived specified in Table 4.
*The Rice parameter cRiceParam is specified as below.*
*if(BitDepth <11)*
*{*
   *cRiceParam = cRiceParam*
*}*
*else if(BitDepth <13)*
*{*
   *cRiceParam = cRiceParam + (cRiceParam >> 1)*
*}*
*else if(BitDepth <15)*
*{*
   *cRiceParam = cRiceParam << 1*

TABLE 23-continued

Rice parameter derivation process

```
    }
    else
    {
        cRiceParam = cRiceParam << 1+ (cRiceParam >> 1)
    }
```
When baseLevel is equal to 0, the variable ZeroPos[ n ] is derived as follows:
ZeroPos[ n ] = ( QState < 2 ? 1 : 2 ) << cRiceParam Binary Methods in Residual Coding for Profiles Beyond 10-Bits According to the twenty-fifth aspect of the disclosure, it is proposed to use variable sets of binary codewords for coding certain syntax elements, e.g. abs_remainder/dec_abs_level, in residual coding, and the selection is determined according to certain coded information of the current block, e.g. quantization parameter or coding bit-depth associated with the TB/CB and/or the slice/profile, and/or according to a new flag associated with the TB/CB/slice/picture/sequence level, e.g. extended_precision_processing_flag. Different methods may be used to derive the variable sets of binary codewords, with some exemplar methods listed as follows.

First, the same procedure for determining the codeword for abs_remainder as used in the current VVC is used, but always with a fixed rice parameter (e.g., 2, 3, 4, 5, 6, 7 or 8) selected. The fixed value may be different in different condition according to certain coded information of the current block, e.g., quantization parameter or coding bit-depth associated with the TB/CB and/or the slice/profile, and/or according to a syntax element associated with the TB/CB/slice/picture/sequence level, e.g., rice_parameter_value. One specific example is illustrated as shown in Table 24, where TH1 to TH4 are predefined thresholds satisfying (TH1<TH2<TH3<TH4), and K0 to K4 are predefined rice parameters. In some embodiments, the same logics can be implemented differently in practice. For example, certain equations, or a look-up table, may also be used to derive the same rice parameters, as shown in Table 24, from a BitDepth value of a current CU/Sequence.

Second, fixed length binarization.
Third, truncated Rice binarization.
Fourth, truncated Binary (TB) binarization process.
Fifth, k-th order Exp-Golomb binarization process (EGk).
Sixth, limited k-th order Exp-Golomb binarization

TABLE 24

Rice parameter determination based on bit-depth

```
    if(BitDepth <TH1)
    {
        rice parameter = K0
    }
    else if(BitDepth <TH2)
    {
        rice parameter = K1
    }
    else if(BitDepth <TH3)
    {
        rice parameter = K2
    }
    else if(BitDepth <TH4)
    {
        rice parameter = K3
    }
    else
```

TABLE 24-continued

Rice parameter determination based on bit-depth

```
    {
        rice parameter = K4
    }
```

In one example, when the new flag, e.g., extended_precision_processing_flag, is equal to 1, the Rice parameter cRiceParam is fixed as n, where n is a positive number (e.g., 2, 3, 4, 5, 6, 7 or 8). The fixed value may be different in different condition. An example of the corresponding decoding process based on VVC Draft is illustrated as below, with changes in bold and italic font and deleted content shown in italic font. The changes to the VVC Draft are shown in Table 25 in bold and italic font.

TABLE 25

Rice parameter derivation process

The rice parameter cRiceParam is derived as follows:
- If transform_skip_flag[ x0 ][ y0 ][ cIdx ] is equal to 1 and sh_ts_residual_coding_disabled_flag is equal to 0, the Rice parameter cRiceParam is set equal to 1.
- If extended_precision_processing_flag is equal to 1, the rice parameter cRiceParam is set equal to 6.
- Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In another example, it is proposed to only use one fixed value for rice parameter in coding the syntax element of abs_remainder/dec_abs_level when the new flag, e.g., extended_precision_processing_flag, is equal to 1. The corresponding decoding process based on VVC Draft is illustrated as below, with changes in bold and italic font and deleted content shown in italic font. The changes to the VVC Draft are shown in Table 26 in bold and italic font.

TABLE 26

Rice parameter derivation process
The rice parameter cRiceParam is derived as follows:

*If extended_precision_processing_flag is equal to 1, the Rice parameter cRiceParam is set equal to 7.*
If transform_skip_flag[ x0 ][ y0 ][ cIdx ] is equal to 1 and sh_ts_residual_coding_disabled_flag is equal to 0, the Rice parameter cRiceParam is set equal to 1.
Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, when BitDepth is greater than or equal to the predefined threshold (e.g., 10, 11, 12, 13, 14, 15 or 16), the Rice parameter cRiceParam is fixed as n, where n is a positive number, e.g., 4, 5, 6, 7 or 8. The fixed value may be different in different condition. An example of the corresponding decoding process based on VVC Draft is illustrated as below, where TH is a predefined threshold (e.g., 10, 11, 12, 13, 14, 15 or 16). The changes to the VVC Draft are shown in Table 27 in bold and italic font, and with changes in bold and italic font and deleted content shown in italic font.

TABLE 27

Rice parameter derivation process
The rice parameter cRiceParam is derived as follows:

If transform_skip_flag[ x0 ][ y0 ][ cIdx ] is equal to 1 and sh_ts_residual_coding_disabled_flag is equal to 0, the Rice parameter cRiceParam is set equal to 1.
*If BitDepth is greater than TH, the rice parameter cRiceParam is set equal to 6.*
Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, it is proposed to only use one fixed value for rice parameter in coding the syntax element of abs_remainder/dec_abs_level when BitDepth is greater than a predefined threshold (e.g., 10, 11, 12, 13, 14, 15 or 16). The corresponding decoding process based on VVC Draft is illustrated as below, where TH is a predefined threshold (e.g., 10, 11, 12, 13, 14, 15 or 16), and with changes in bold and italic font and deleted content shown in italic font. The changes to the VVC Draft are shown in Table 28 in bold and italic font.

TABLE 28

Rice parameter derivation process
The rice parameter cRiceParam is derived as follows:

*If BitDepth is greater than TH, the Rice parameter cRiceParam is set equal to 7.*
If transform_skip_flag[ x0 ][ y0 ][ cIdx ] is equal to 1 and
sh_ts_residual_coding_disabled_flag is equal to 0, the Rice parameter cRiceParam is set equal to 1.
Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

Rice Parameter Derivation in Residual Coding

According to the twenty-sixth aspect of the disclosure, it is proposed to use variable methods of rice parameter derivations for coding certain syntax elements, e.g. abs_remainder/dec_abs_level, in residual coding, and the selection is determined according to certain coded information of the current block, e.g. quantization parameter or coding bit-depth associated with the TB/CB and/or the slice/profile, and/or according to a new flag associated with the TB/CB/slice/picture/sequence level, e.g. extended_precision_processing_flag. Different methods may be used to derive the rice parameter, with some exemplar methods listed as follows:

First, it is proposed to use counters to derive the rice parameter. The counters are determined according to the value of coded coefficient and certain coded information of the current block, e.g., compent ID. One specific example, riceParameter=counter/a, where a is positive number, e.g., 4, and it maintains 2 counters (split by luma/chroma). These counters are reset to 0 at the start of each slice. Once coded, the counter is updated if this is the first coefficient coded in the sub-TU as follows:

if(coeffValue>=(3<<rice))counter++ if(((coeffValue<<1)<(1<<riceParameter))&&(counter>0))counter--;

Second, it is proposed to add a shift operation in derivation of the rice parameter in VVC. The shift is determined according to the value of coded coefficient. An example of the corresponding decoding process based on VVC Draft is illustrated as below, the shift is determined according to the counters of method 1, and with changes in bold and italic font and deleted content shown in italic font. The changes to the VVC Draft are shown in Table 29 in bold and italic font.

TABLE 29

Rice parameter derivation process

Inputs to this process are the base level baseLevel, the colour component index cIdx, the luma location ( x0, y0 ) specifying the top-left sample of TABLE 29-continued Rice parameter derivation process the current transform block relative to the top-left sample of the current picture, the current coefficient scan location ( xC, yC ), the binary logarithm of the transform block width log2TbWidth, and the binary logarithm of the transform block height log2TbHeight, .
Output of this process is the Rice parameter cRiceParam.
Given the array AbsLevel[ x ][ y ] for the transform block with TABLE 29-continued Rice parameter derivation process component index cIdx and the top-left luma location ( x0, y0 ), the variable locSumAbs is derived as specified by the following pseudo code:
  *Shift= max(0, counter/4 − 2)*
  locSumAbs = 0
  if( xC < (1 << log2TbWidth) − 1 ) {
    locSumAbs += AbsLevel[ xC + 1 ][ yC ]
    if( xC < (1 << log2TbWidth) − 2 )
      locSumAbs += AbsLevel[ xC + 2 ][ yC ]
    if( yC < (1 << log2TbHeight) − 1 )
      locSumAbs += AbsLevel[ xC + 1 ][ yC + 1 ]   (1494)
  }
  if( yC < (1 << log2TbHeight) − 1 ) {
    locSumAbs += AbsLevel[ xC ][ yC + 1 ]
    if( yC < (1 << log2TbHeight) − 2 )
      locSumAbs += AbsLevel[ xC ][ yC + 2 ]
  }
  locSumAbs = Clip3( 0, 31, (locSumAbs − baseLevel * 5)>>*Shift* )
Given the variable locSumAbs, the Rice parameter cRiceParam is derived specified in Table 4.
*cRiceParam = cRiceParam+Shift*
When baseLevel is equal to 0, the variable ZeroPos[ n ] is derived as follows:
ZeroPos[ n ] = ( QState < 2 ? 1 : 2 ) << cRiceParam First, it is proposed to add a shift operation in derivation of the rice parameter in VVC. The shift is determined according to certain coded information of the current block, e.g., coding bit-depth associated with the TB/CB and/or the slice profile (e.g., 14 bits profile or 16 bits profile). An example of the corresponding decoding process based on VVC Draft is illustrated as below, the shift is determined according to the counters of method 1, and with changes in bold and italic font and deleted content shown in italic font. The changes to the VVC Draft are shown in Table 30 in bold and italic font.

TABLE 30

Rice parameter derivation process

Inputs to this process are the base level baseLevel, the colour component index cIdx, the luma location ( x0, y0 ) specifying the top-left sample of the current transform block relative to the top-left sample of the current TABLE 30-continued Rice parameter derivation process picture, the current coefficient scan location ( xC, yC ), the binary
logarithm of the transform block width log2TbWidth, and the binary
logarithm of the transform block height log2TbHeight, .
Output of this process is the Rice parameter cRiceParam.
Given the array AbsLevel[ x ][ y ] for the transform block with
component index cIdx and the top-left luma location ( x0, y0 ), the
variable locSumAbs is derived as specified by the following pseudo code:
   *Shift= max(0, (BitDepth − 8)/2)*
   locSumAbs = 0
   if( xC < (1 << log2TbWidth) − 1 ) {
     locSumAbs += AbsLevel[ xC + 1 ][ yC ]
     if( xC < (1 << log2TbWidth) − 2 )
       locSumAbs += AbsLevel[ xC + 2 ][ yC ]
     if( yC < (1 << log2TbHeight) − 1 )
       locSumAbs += AbsLevel[ xC + 1 ][ yC + 1 ]   (1494)
   }
   if( yC < (1 << log2TbHeight) − 1 ) {
     locSumAbs += AbsLevel[ xC ][ yC + 1 ]
     if( yC < (1 << log2TbHeight) − 2 )
       locSumAbs += AbsLevel[ xC ][ yC + 2 ]
   }
   locSumAbs = Clip3( 0, 31, (locSumAbs − baseLevel * 5)>>*Shift* )
Given the variable locSumAbs, the Rice parameter cRiceParam is derived
specified in Table 4.
*cRiceParam = cRiceParam+Shift*
When baseLevel is equal to 0, the variable ZeroPos[ n ] is derived as
follows:
ZeroPos[ n ] = ( QState < 2 ? 1 : 2 ) << cRiceParam Residual Coding or Transform Skip According to the twenty-seventh aspect of the disclosure, it is proposed to use variable sets of binary codewords for coding certain syntax elements, e.g. abs_remainder, in transform skip residual coding, and the selection is determined according to certain coded information of the current block, e.g. quantization parameter or coding bit-depth associated with the TB/CB and/or the slice/profile, and/or according to a new flag associated with the TB/CB/slice/picture/sequence level, e.g. extended_precision_processing_flag. Different methods may be used to derive the variable sets of binary codewords, with some exemplar methods listed as follows.

First, the same procedure for determining the codeword for abs_remainder as used in the current VVC is used, but always with a fixed rice parameter (e.g., 2, 3, 4, 5, 6, 7 or 8) selected. The fixed value may be different in different condition according to certain coded information of the current block, e.g., quantization parameter, frame type (e.g., I, P or B), component ID (e.g., luma or chroma), color format (e.g., 420, 422 or 444) or coding bit-depth associated with the TB/CB and/or the slice/profile, and/or according to a syntax element associated with the TB/CB/slice/picture/sequence level, e.g., rice_parameter_value. One specific example is illustrated as shown in Table 7, where TH1 to TH4 are predefined thresholds satisfying (TH1<TH2<TH3<TH4), and K0 to K4 are predefined rice parameters. In some embodiments, the same logics can be implemented differently in practice. For example, certain equations, or a look-up table, may also be used to derive the same rice parameters, as shown in Table 7, from a BitDepth value of a current CU/Sequence.

Second, fixed length binarization.
   Third, truncated Rice binarization.
   Fourth, truncated Binary (TB) binarization process.
   Fifth, k-th order Exp-Golomb binarization process (EGk).
   Sixth, limited k-th order Exp-Golomb binarization An example of the corresponding decoding process based on VVC Draft is illustrated as below, with changes to the VVC Draft are shown in Table 31 in bold and italic font, and deleted content shown in italic font. In some embodiments, the same logics can be implemented differently in practice. For example, certain equations, or a look-up table, may also be used to derive the same rice parameters.

TABLE 31

Rice parameter derivation process

The rice parameter cRiceParam is derived as follows:
-   *If transform_skip_flag[ x0 ][ y0 ][ cIdx ] is equal to 1 and sh_ts_residual_coding_disabled_flag is equal to 0, the derivation process for Rice parameter cRiceParam is specified as below.*
    *if(BitDepth <11)*
    *{*
      *rice parameter = 1*
    *}*
    *else if(BitDepth <13)*
    *{*
      *rice parameter = 4*
    *}*
    *else if(BitDepth <15)*
    *{*
      *rice parameter = 6*
    *}*
    *else*
    *{*
      *rice parameter = 8*
    *}*
-   Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In another example, it is proposed to only use one fixed value for rice parameter in coding the syntax element of abs_remainder when the new flag, e.g., extended_precision_processing_flag, is equal to 1. The corresponding decoding process based on VVC Draft is illustrated as below, with changes in bold and italic font and deleted content shown in italic font. The changes to the VVC Draft are shown in Table 32 in bold and italic font.

TABLE 32

Rice parameter derivation process

The rice parameter cRiceParam is derived as follows:
-   *If extended_precision_processing_flag is equal to 1, transform_skip_flag[ x0 ][ y0 ][ cIdx ] is equal to 1 and sh_ts_residual_coding_disabled_flag is equal to 0, the derivation process for Rice parameter cRiceParam is specified as below.*
    *if(BitDepth <11)*
    *{*
      *rice parameter = 1*
    *}*
    *else if(BitDepth <13)*
    *{*
      *rice parameter = 4*
    *}*
    *else if(BitDepth <15)*
    *{*
      *rice parameter = 6*
    *}*
    *else*
    *{*
      *rice parameter = 8*
    *}*
-   If transform_skip_flag[ x0 ][ y0 ][ cIdx ] is equal to 1 and sh_ts_residual_coding_disabled_flag is equal to 0, the Rice parameter cRiceParam is set equal to 1.
-   Otherwise, the rice parameter cRiceParam is derived by invoking TABLE 32-continued Rice parameter derivation process the rice parameter derivation process for abs_remainder[ ] as
specified in Table 3 with the variable baseLevel set equal to 4,
the colour component index cIdx, the luma location ( x0, y0 ),
the current coefficient scan location ( xC, yC ), the binary
logarithm of the transform block width log2TbWidth, and the
binary logarithm of the transform block height log2TbHeight
as inputs.

In yet another example, when the new flag, e.g., extended_precision_processing_flag, is equal to 1, the Rice parameter cRiceParam is fixed as n, where n is a positive number (e.g., 2, 3, 4, 5, 6, 7 or 8). The fixed value may be different in different condition. An example of the corresponding decoding process based on VVC Draft is illustrated as below, with changes in bold and italic font and deleted content shown in italic font. The changes to the VVC Draft are shown in Table 33 in bold and italic font.

TABLE 33

Rice parameter derivation process
The rice parameter cRiceParam is derived as follows:

*If extended_precision_processing_flag is equal to 1,
transform_skip_flag[ x0 ][ y0 ][ cIdx ] is equal to 1 and
sh_ts_residual_coding_disabled_flag is equal to 0, the Rice parameter cRiceParam
is
set equal to 7.*
If transform_skip_flag[ x0 ][ y0 ][ cIdx ] is equal to 1 and
sh_ts_residual_coding_disabled_flag is equal to 0, the Rice parameter cRiceParam is
set equal to 1.
Otherwise, the rice parameter cRiceParam is derived by invoking the rice parameter
derivation process for abs_remainder[ ] as specified in Table 3 with the variable
baseLevel set equal to 4, the colour component index cIdx, the luma location ( x0, y0 ),
the current coefficient scan location ( xC, yC ), the binary logarithm of the transform
block width log2TbWidth, and the binary logarithm of the transform block height
log2TbHeight as inputs.

In yet another example, when BitDepth is greater than or equal to the predefined threshold (e.g., 10, 11, 12, 13, 14, 15 or 16), the Rice parameter cRiceParam is fixed as n, where n is a positive number, e.g., 4, 5, 6, 7 or 8. The fixed value may be different in different condition. An example of the corresponding decoding process based on VVC Draft is illustrated as below, where TH is a predefined threshold (e.g., 10, 11, 12, 13, 14, 15 or 16), and with changes in bold and italic font and deleted content shown in italic font. The changes to the VVC Draft are shown in Table 34 in bold and italic font.

TABLE 34

Rice parameter derivation process
The rice parameter cRiceParam is derived as follows:

*If BitDepth is greater than TH, transform_skip_flag[ x0 ][ y0 ][ cIdx ] is equal to 1
and sh_ts_residual_coding_disabled_flag is equal to 0, the Rice parameter
cRiceParam is set equal to 7.*
If transform_skip_flag[ x0 ][ y0 ][ cIdx ] is equal to 1 and
sh_ts_residual_coding_disabled_flag is equal to 0, the Rice parameter cRiceParam is
set equal to 1.
Otherwise, the rice parameter cRiceParam is derived by invoking the rice parameter
derivation process for abs_remainder[ ] as specified in Table 3 with the variable
baseLevel set equal to 4, the colour component index cIdx, the luma location ( x0, y0 ),
the current coefficient scan location ( xC, yC ), the binary logarithm of the transform
block width log2TbWidth, and the binary logarithm of the transform block height
log2TbHeight as inputs.

In yet another example, one control flag is signaled in slice header to indicate whether the signaling of Rice parameter for the transform skip blocks is enabled or disabled. When the control flag is signaled as enabled, one syntax element is further signaled for each transform skip slice to indicate the Rice parameter of that slice. When the control flag is signaled as disabled (e.g. set equal to "0"), no further syntax element is signaled at lower level to indicate the Rice parameter for the transform skip slice and a default Rice parameter (e.g. 1) is used for all the transform skip slice. An example of the corresponding decoding process based on VVC Draft is illustrated as below, where TH is a predefined value (e.g. 0, 1, 2), and with changes in bold and italic font and deleted content shown in italic font. The changes to the VVC Draft are shown in Table 35 in bold and italic font. In some embodiments, the sh_ts_residual_coding_rice_index can be coded in different ways and/or may have the maximum value. For example, u(n), unsigned integer using n bits, or f(n), fixed-pattern bit string using n bits written (from left to right) with the left bit first, may also be used to encode/decode the same syntax element.

Slice Header Syntax

TABLE 35

| Syntax of residual coding | |
|---|---|
| | Descriptor |
| slice_header( ) { | |
| ... | |
|   if( sps_transform_skip_enabled_flag && | |

TABLE 35-continued

Syntax of residual coding

| | Descriptor |
|---|---|
| !sh_dep_quant_used_flag && | |
| !sh_sign_data_hiding_used_flag ) | |
|     sh_ts_residual_coding_disabled_flag | u(1) |
| if(!sh_ts_residual_coding_disabled_flag ) { | |
|     sh_ts_residual_coding_rice_flag | *u(1)* |
|     if(sh_ts_residual_coding_rice_flag ) | |
|         sh_ts_residual_coding_rice_index | ue(v) |
| } | |
| ... | | sh_ts_residual_coding_rice_flag equal to 1 specifies that sh_ts_residual_coding_rice_index could be present in the current slice. sh_ts_residual_coding_rice_flag equal to 0 specifies that sh_ts_residual_coding_rice_index is not present in the current slice. When sh_ts_residual_coding_rice_flag is not present, the value of sh_ts_residual_coding_rice_flag is inferred to be equal to 0.

sh_ts_residual_coding_rice_index specifies the rice parameter used for the residual_ts_coding( ) syntax structure.

TABLE 36

Rice parameter derivation process
The rice parameter cRiceParam is derived as follows:

*If sh_ts_residual_coding_rice_flag is equal to 1,*
*transform_skip_flag[ x0 ][ y0 ][ cIdx ] is equal to 1 and*
*sh_ts_residual_coding_disabled_flag is equal to 0, the Rice parameter cRiceParam is*
*set equal to (sh_ts_residual_coding_rice_ index+TH).*
If transform_skip_flag[ x0 ][ y0 ][ cIdx ] is equal to 1 and
sh_ts_residual_coding_disabled_flag is equal to 0, the Rice parameter cRiceParam is
set equal to 1.
Otherwise, the rice parameter cRiceParam is derived by invoking the rice parameter
derivation process for abs_remainder[ ] as specified in Table 3 with the variable
baseLevel set equal to 4, the colour component index cIdx, the luma location ( x0, y0 ),
the current coefficient scan location ( xC, yC ), the binary logarithm of the transform
block width log2TbWidth, and the binary logarithm of the transform block height
log2TbHeight as inputs.

In yet another example, one control flag is signaled in sequence parameter set (or in sequence parameter set range extensions syntax) to indicate whether the signaling of Rice parameter for the transform skip blocks is enabled or disabled. When the control flag is signaled as enabled, one syntax element is further signaled for each transform skip slice to indicate the Rice parameter of that slice. When the control flag is signaled as disabled (e.g. set equal to "0"), no further syntax element is signaled at lower level to indicate the Rice parameter for the transform skip slice and a default Rice parameter (e.g. 1) is used for all the transform skip slice. An example of the corresponding decoding process based on VVC Draft is illustrated as below, where TH is a predefined value (e.g. 0, 1, 2). The changes to the VVC Draft are shown in Table 37 in bold and italic font, and deleted content shown in italic font. In some embodiments, the sh_ts_residual_coding_rice_idx can be coded in different ways and/or may have the maximum value. For example, u(n), unsigned integer using n bits, or f(n), fixed-pattern bit string using n bits written (from left to right) with the left bit first, may also be used to encode/decode the same syntax element.

Sequence Parameter Set RBSP Syntax

TABLE 37

Syntax of residual coding

| | Descriptor |
|---|---|
| seq_parameter_set_rbsp( ) { | |
| ... | |
|     sps_sign_data_hiding_enabled_flag | u(1) |
|     *sps_ts_residual_coding_rice_present_in_sh_flag* | *u(1)* |
|     sps_virtual_boundaries_enabled_flag | u(1) |
|     ... | |
| } | | sps_ts_residual_coding_rice_present_in_sh_flag equal to 1 specifies that sh_ts_residual_coding_rice_idx could be present in SH syntax structures referring to the SPS. sps_ts_residual_coding_rice_present_in_sh_flag equal to 0 specifies that sh_ts_residual_coding_rice_idx is not present in SH syntax structures referring to the SPS. When sps_ts_residual_coding_rice_present_in_sh_flag is not present, the value of sps_ts_residual_coding_rice_present_in_sh_flag is inferred to be equal to 0.

Slice Header Syntax

TABLE 38

Syntax of residual coding

| | Descriptor |
|---|---|
| slice_header( ) { | |
| ... | |
|   if( sps_transform_skip_enabled_flag && | |
|     !sh_dep_quant_used_flag && | |
|     !sh_sign_data_hiding_used_flag ) | |
|     sh_ts_residual_coding_disabled_flag | u(1) |
|     *if((!sh_ts_residual_coding_disabled_flag) &&* | |
|     *sps_ts_residual_coding_rice_enabled _flag )* | |
|       *sh_ts_residual_coding_rice_idx* | ue(v) |
|   ... | |
| } | | sh_ts_residual_coding_rice_idx specifies the rice parameter used for the residual_ts_coding( ) syntax structure.

TABLE 39

Rice parameter derivation process
The rice parameter cRiceParam is derived as follows:

*If sps_ts_residual_coding_rice_flag is equal to 1,
transform_skip_flag[ x0 ][ y0 ][ cIdx ] is equal to 1 and
sh_ts_residual_coding_disabled_flag is equal to 0, the Rice parameter cRiceParam is
set equal to (sh_ts_residual_coding_rice_idx+TH).*
If transform_skip_flag[ x0 ][ y0 ][ cIdx ] is equal to 1 and
sh_ts_residual_coding_disabled_flag is equal to 0, the Rice parameter cRiceParam is
set equal to 1.
Otherwise, the rice parameter cRiceParam is derived by invoking the rice parameter
derivation process for abs_remainder[ ] as specified in Table 3 with the variable
baseLevel set equal to 4, the colour component index cIdx, the luma location ( x0, y0 ),
the current coefficient scan location ( xC, yC ), the binary logarithm of the transform
block width log2TbWidth, and the binary logarithm of the transform block height
log2TbHeight as inputs.

Figure 27:
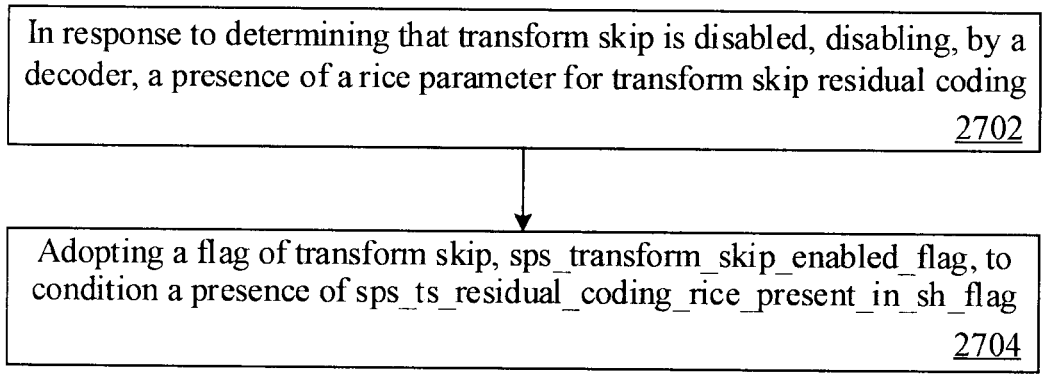
FIG. 27 illustrates a method for video coding, according to an example of the present disclosure.

In one or more examples of the disclosure, as illustrated in FIG. 27, it is proposed to disable the presence of Rice parameter for transform skip residual coding if transform skip is disabled, in Step 2702. In one specific example, to fulfill such design purpose, it is proposed to use sps_transform_skip_enabled_flag to condition the presence of sps_ts_residual_coding_rice_present_in_sh_flag, as shown in Step 2704. For example, when the flag sps_transform_skip_enabled_flag is equal to zero (i.e., the transform skip is disabled at current picture), sps_ts_residual_coding_rice_present_in_sh_flag is not signaled but inferred to be 0. When the flag sps_transform_skip_enabled_flag is equal to one, the sps_ts_residual_coding_rice_present_in_sh_flag is further signaled. The change to current VVC working draft is shown in italic font below.

*if( sps_transform_skip_enabled_flag )*
   *sps_ts_residual_coding_rice_present_in_sh_*    u(1)
*flag*

In yet another example, when the flag of transform skip(sps_transform_skip_enabled_flag) is signaled as enabled, one control flag is further signaled in sequence parameter set (or in sequence parameter set range extensions syntax) to indicate whether the signaling of Rice parameter for the transform skip blocks is enabled or disabled. When the control flag is signaled as enabled, one syntax element is further signaled for each transform skip slice to indicate the Rice parameter of that slice. When the control flag is signaled as disabled (e.g. set equal to "0"), no further syntax element is signaled at lower level to indicate the Rice parameter for the transform skip slice and a default Rice parameter (e.g. 1) is used for all the transform skip slice. An example of the corresponding decoding process based on VVC Draft is illustrated as below. The changes to the VVC Draft are shown in italic font.

Sequence Parameter Set RBSP Syntax

| | Descriptor |
|---|---|
| seq_parameter_set_rbsp( ) { | |
| ... | |
|   sps_sign_data_hiding_enabled_flag | u(1) |
|   *if( sps_transform_skip_enabled_flag )* | |
|     *sps_ts_residual_coding_rice_present_in_sh_flag* | *u(1)* |

-continued

| | Descriptor |
|---|---|
|   sps_virtual_boundaries_enabled_flag | u(1) |
| ... | |
| } | | sps_ts_residual_coding_rice_present_in_sh_flag equal to 1 specifies that sh_ts_residual_coding_rice_idx could be present in SH syntax structures referring to the SPS. sps_ts_residual_coding_rice_present_in_sh_flag equal to 0 specifies that sh_ts_residual_coding_rice_idx_minus1 is not present in SH syntax structures referring to the SPS. When sps_ts_residual_coding_rice_present_in_sh_flag is not present, the value of sps_ts_residual_coding_rice_present_in_sh_flag is inferred to be equal to 0.

Slice Header Syntax

| | Descriptor |
|---|---|
| slice_header( ) { | |
| ... | |
|   if( sps_transform_skip_enabled_flag && | |
|    !sh_dep_quant_used_flag && | |
|     !sh_sign_data_hiding_used_flag ) | |
|     sh_ts_residual_coding_disabled_flag | u(1) |
|   *if(!sh_ts_residual_coding_disabled_flag) &&* | |
|   *sps_ts_residual_coding_rice_present_in_sh_flag )* | |
|     *sh_ts_residual_coding_rice_idx_minus1* | *u(3)* |
| ... | |
| } | | sh_ts_residual_coding_rice_idx_minus1 plus 1, specifies the rice parameter used for the residual_ts_coding( ) syntax structure. When sh_ts_residual_coding_rice_idx_minus1 is not present, the value of sh_ts_residual_coding_rice_idx_minus1 is inferred to be equal to 0.

9.3.3.11 Binarization Process for Abs_Remainder[ ]

Input to this process is a request for a binarization for the syntax element abs_remainder[n], the colour component cIdx, the current sub-block index i, and the luma location (x0, y0) specifying the top-left sample of the current luma transform block relative to the top-left luma sample of the picture, the current coefficient scan location (xC, yC), the binary logarithm of the transform block width log2TbWidth, and the binary logarithm of the transform block height log2TbHeight.

Output of this process is the binarization of the syntax element.

The variables lastAbsRemainder and lastRiceParam are derived as follows:

If this process is invoked for the first time for the current sub-block index i, lastAbsRemainder and lastRiceParam are both set equal to 0.

Otherwise (this process is not invoked for the first time for the current sub-block index i), lastAbsRemainder and lastRiceParam are set equal to the values of abs_remainder[n] and cRiceParam, respectively, that have been derived during the last invocation of the binarization process for the syntax element abs_remainder[n] as specified in this clause.

The rice parameter cRiceParam is derived as follows:

If transform_skip_flag[x0][y0][cIdx] is equal to 1 and sh_ts_residual_coding_disabled_flag is equal to 0, the Rice parameter cRiceParam is set equal to sh_ts_residual_coding_rice_idx_minus1+1.

Otherwise, the rice parameter cRiceParam is derived by invoking the rice parameter derivation process for abs_remainder[ ] as specified in clause 9.3.3.2 with the variable baseLevel set equal to 4, the colour component index cIdx, the luma location (x0, y0), the current coefficient scan location (xC, yC), the binary logarithm of the transform block width log2TbWidth, and the binary logarithm of the transform block height log2TbHeight as inputs.

In yet another example, one syntax element is signaled for each transform skip slice to indicate the Rice parameter of that slice. An example of the corresponding decoding process based on VVC Draft is illustrated as below. The changes to the VVC Draft are shown in Table 40 in bold and italic font. In some embodiments, the sh_ts_residual_coding_rice_idx can be coded in different ways and/or may have the maximum value. For example, u(n), unsigned integer using n bits, or f(n), fixed-pattern bit string using n bits written (from left to right) with the left bit first, may also be used to encode/decode the same syntax element.

Slice Header Syntax

TABLE 40

| Syntax of residual coding | Descriptor |
|---|---|
| slice_header( ) { | |
| ... | |
| if( sps_transform_skip_enabled_flag && | |
| !sh_dep_quant_used_flag && | |
| !sh_sign_data_hiding_used_flag ) | |
| sh_ts_residual_coding_disabled_flag | u(1) |
| *if(!sh_ts_residual_coding_disabled_flag)* | |
| *sh_ts_residual_coding_rice_idx* | *ue(v)* |
| ... | |
| } | | sh_ts_residual_coding_rice_idx specifies the rice parameter used for the residual_ts_coding( ) syntax structure. When sh_ts_residual_coding_rice_idx is not present, the value of sh_ts_residual_coding_rice_idx is inferred to be equal to 0.

TABLE 41

Rice parameter derivation process
The rice parameter cRiceParam is derived as follows:

If transform_skip_flag[ x0 ][ y0 ][ cIdx ] is equal to 1 and sh_ts_residual_coding_disabled_flag is equal to 0, the Rice parameter cRiceParam is set equal to *sh_ts_residual_coding_rice_idx*+1.
Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, one control flag is signaled in picture parameter se range extensions syntax to indicate whether the signaling of Rice parameter for the transform skip blocks is enabled or disabled. When the control flag is signaled as enabled, one syntax element is further signaled to indicate the Rice parameter of that picture. When the control flag is signaled as disabled (e.g. set equal to "0"), no further syntax element is signaled at lower level to indicate the Rice parameter for the transform skip slice and a default Rice parameter (e.g. 1) is used for all the transform skip slice. An example of the corresponding decoding process based on VVC Draft is illustrated as below, where TH is a predefined value (e.g. 0, 1, 2). The changes to the VVC Draft are shown in Table 42 in bold and italic font. In some embodiments, the pps_ts_residual_coding_rice_idx can be coded in different ways and/or may have the maximum value. For example, u(n), unsigned integer using n bits, or f(n), fixed-pattern bit string using n bits written (from left to right) with the left bit first, may also be used to encode/decode the same syntax element.

Picture Parameter Set Range Extensions Syntax

TABLE 42

| Syntax of residual coding | Descriptor |
|---|---|
| pps_range_extensions( ) { | |
| ... | |
| *pps_ts_residual_coding_rice_flag* | *u(1)* |
| *if(pps_ts_residual_coding_rice_flag )* | |
| *pps_ts_residual_coding_rice_idx* | *ue(v)* |
| } | |
| ... | | pps_ts_residual_coding_rice_flag equal to 1 specifies that pps_ts_residual_coding_rice_idx could be present in the current picture. pps_ts_residual_coding_rice_flag equal to 0 specifies that pps_ts_residual_coding_rice_idx is not present in the current picture. When pps_ts_residual_coding_rice_flag is not present, the value of pps_ts_residual_coding_rice_flag is inferred to be equal to 0.

pps_ts_residual_coding_rice_idx specifies the rice parameter used for the residual_ts_coding( ) syntax structure.

TABLE 43

Rice parameter derivation process
The rice parameter cRiceParam is derived as follows:

*If pps_ts_residual_coding_rice_flag is equal to 1,*
*transform_skip_flag[ x0 ][ y0 ][ cIdx ] is equal to 1 and*
*sh_ts_residual_coding_disabled_flag is equal to 0, the Rice parameter cRiceParam is*
*set equal to (pps_ts_residual_coding_rice_idx+TH).*
If transform_skip_flag[ x0 ][ y0 ][ cIdx ] is equal to 1 and
sh_ts_residual_coding_disabled_flag is equal to 0, the Rice parameter cRiceParam is
set equal to 1.
Otherwise, the rice parameter cRiceParam is derived by invoking the rice parameter
derivation process for abs_remainder[ ] as specified in Table 3 with the variable
baseLevel set equal to 4, the colour component index cIdx, the luma location ( x0, y0 ),
the current coefficient scan location ( xC, yC ), the binary logarithm of the transform
block width log2TbWidth, and the binary logarithm of the transform block height
log2TbHeight as inputs.

In yet another example, it is propose to only use a varying rice parameter or the coding of the syntax element abs_remainder. The value of the applied rice parameter may be determined according to certain coded information of the current block, e.g., block size, quantization parameter, bit depth, the transform types and so forth. In one specific embodiment, it is proposed to adjust the rice parameter based on the coding bit-depth and the quantization parameter that is applied to one CU. The corresponding decoding process based on VVC Draft is illustrated as below, the changes to the VVC Draft are shown in Table 44 in bold and italic font, and deleted content shown in italic font. In some embodiments, the same logics can be implemented differently in practice. For example, certain equations, or a look-up table, may also be used to derive the same rice parameters.

TABLE 44

Rice parameter derivation process

The rice parameter cRiceParam is derived as follows:
- *If transform_skip_flag[ x0 ][ y0 ][ cIdx ] is equal to 1 and*
  *sh_ts_residual_coding_disabled_flag is equal to 0, the derivation*
  *process for Rice parameter cRiceParam is specified as below.*
  *if(BitDepth <11)*
  *{*
  *  rice parameter = 1*
  *}*
  *else if(BitDepth <13)*
  *{*
  *if($QP_{CU}$ <-15)*
  *{*
  *  rice parameter = 6*
  *}*
  *else if($QP_{CU}$ <-10)*
  *{*
  *  rice parameter = 5*
  *}*
  *else if($QP_{CU}$ <0)*
  *{*
  *  rice parameter = 4*
  *}*
  *else if($QP_{CU}$ <10)*
  *{*
  *  rice parameter = 3*
  *}*
  *else*
  *{*
  *  rice parameter = 2*
  *}*
  *}*
  *else if(BitDepth <15)*
  *{*
  *if($QP_{CU}$ <-25)*

TABLE 44-continued

Rice parameter derivation process

*{*
*  rice parameter = 7*
*}*
*else if($QP_{CU}$ <-15)*
*{*
*  rice parameter = 6*
*}*
*else if($QP_{CU}$ <-10)*
*{*
*  rice parameter = 5*
*}*
*else*
*{*
*  rice parameter = 4*
*}*
*}*
*else*
*{*
*if($QP_{CU}$ <-30)*
*{*
*  rice parameter = 8*
*}*
*else if($QP_{CU}$ <-25)*
*{*
*  rice parameter = 7*
*}*
*else if($QP_{CU}$ <-15)*
*{*
*  rice parameter = 6*
*}*
*else if($QP_{CU}$ <-10)*
*{*
*  rice parameter = 5*
*}*
*else*
*{*
*  rice parameter = 4*
*}*
*}*
- Otherwise, the rice parameter cRiceParam is derived by invoking
  the rice parameter derivation process for abs_remainder[ ] as
  specified in Table 3 with the variable baseLevel set equal to 4,
  the colour component index cIdx, the luma location ( x0, y0 ),
  the current coefficient scan location ( xC, yC ), the binary
  logarithm of the transform block width log2TbWidth, and the
  binary logarithm of the transform block height log2TbHeight as
  inputs.

In yet another example, the corresponding decoding process based on VVC Draft is illustrated as below, where TH is a predefined threshold (e.g. 33 or 34). The changes to the VVC Draft are shown in Table 45 in bold and italic font, and deleted content shown in italic font. In some embodiments, the same logics can be implemented differently in practice.

For example, certain equations, or a look-up table, may also be used to derive the same rice parameters.

TABLE 45

Rice parameter derivation process
The rice parameter cRiceParam is derived as follows:

*If transform_skip_flag[ x0 ][ y0 ][ cIdx ] is equal to 1 and sh_ts_residual_coding_disabled_flag is equal to 0, the derivation process for Rice parameter cRiceParam is specified as below.*
   *rice parameter = Clip3( 1, 8, Floor( (TH − BitDepth −$QP_{CU}$)/6 ) )*
Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, the corresponding decoding process based on VVC Draft is illustrated as below, where $TH_A$ and $TH_B$ are predefined thresholds (e.g. $TH_A$=8, $TH_B$=33 or 34). The changes to the VVC Draft are shown in Table 46 in bold and italic font, and deleted content shown in italic font. In some embodiments, the same logics can be implemented differently in practice. For example, certain equations, or a look-up table, may also be used to derive the same rice parameters.

TABLE 46

Rice parameter derivation process
The rice parameter cRiceParam is derived as follows:

*If transform_skip_flag[ x0 ][ y0 ][ cIdx ] is equal to 1 and sh_ts_residual_coding_disabled_flag is equal to 0, the derivation process for Rice parameter cRiceParam is specified as below.*
   *rice parameter = Clip3( 1, BitDepth − $TH_A$, Floor( ($TH_B$ − BitDepth − $QP_{CU}$)/6 ) )*
Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, it is proposed to only use a varying rice parameter for the coding of the syntax element of abs_remainder when the new flag, e.g., extended_precision_processing_flag, is equal to 1. The varying value may be determined according to certain coded information of the current block, e.g., block size, quantization parameter, bit depth, the transform types and so forth. In one specific embodiment, it is proposed to adjust the rice parameter based on the coding bit-depth and the quantization parameter that is applied to one CU. The corresponding decoding process based on VVC Draft is illustrated as below. The changes to the VVC Draft are shown in Table 47 in bold and italic font. In some embodiments, the same logics can be implemented differently in practice. For example, certain equations, or a look-up table, may also be used to derive the same rice parameters.

TABLE 47

Rice parameter derivation process

The rice parameter cRiceParam is derived as follows:
- *If extended_precision_processing_flag is equal to 1, transform_skip_flag[ x0 ][ y0 ][ cIdx ] is equal to 1 and sh_ts_residual_coding_disabled_flag is equal to 0, the*

TABLE 47-continued

Rice parameter derivation process

*derivation process for Rice parameter cRiceParam is specified as below.*
   *if($QP_{CU}$ <−30)*
   *{*
      *rice parameter = 8*

TABLE 47-continued

Rice parameter derivation process

*}*
   *else if($QP_{CU}$ <−25)*
   *{*
      *rice parameter = 7*
   *}*
   *else if($QP_{CU}$ <−15)*
   *{*
      *rice parameter = 6*
   *}*
   *else if($QP_{CU}$ <−10)*
   *{*
      *rice parameter = 5*
   *}*
   *else if($QP_{CU}$ <0)*
   *{*
      *rice parameter = 4*
   *}*
   *else if($QP_{CU}$ <10)*
   *{*
      *rice parameter = 3*
   *}*
   *else if($QP_{CU}$ <15)*
   *{*
      *rice parameter = 2*
   *}*

TABLE 47-continued

Rice parameter derivation process

*else*
*{*
  *rice parameter = 1*
*}*
- If transform_skip_flag[ x0 ][ y0 ][ cIdx ] is equal to 1 and sh_ts_residual_coding_disabled_flag is equal to 0, the Rice parameter cRiceParam is set equal to 1.
- Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, the corresponding decoding process based on VVC Draft is illustrated as below, where TH is a predefined threshold (e.g., 18, 19). The changes to the VVC Draft are shown in Table 48 in bold and italic font. In some embodiments, the same logics can be implemented differently in practice. For example, certain equations, or a look-up table, may also be used to derive the same rice parameters.

TABLE 48

Rice parameter derivation process
The rice parameter cRiceParam is derived as follows:

*If extended_precision_processing_flag is equal to 1, transform_skip_flag[ x0 ][ y0 ][ cIdx ] is equal to 1 and sh_ts_residual_coding_disabled_flag is equal to 0, the derivation process for Rice parameter cRiceParam is specified as below.*
  *rice parameter = Clip3( 1, 8, (TH − QP)/6 )*
If transform_skip_flag[ x0 ][ y0 ][ cIdx ] is equal to 1 and sh_ts_residual_coding_disabled_flag is equal to 0, the Rice parameter cRiceParam is set equal to 1.
Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, the corresponding decoding process based on VVC Draft is illustrated as below, where $TH_A$ and $TH_B$ are predefined thresholds (e.g., $TH_A=8$, $TH_B=18$ or 19). The changes to the VVC Draft are shown in Table 49 in bold and italic font. In some embodiments, the same logics can be implemented differently in practice. For example, certain equations, or a look-up table, may also be used to derive the same rice parameters.

TABLE 49

Rice parameter derivation process
The rice parameter cRiceParam is derived as follows:

*If extended_precision_processing_flag is equal to 1, transform_skip_flag[ x0 ][ y0 ][ cIdx ] is equal to 1 and sh_ts_residual_coding_disabled_flag is equal to 0, the derivation process for Rice parameter cRiceParam is specified as below.*
  *rice parameter = Clip3( 1, BitDepth − $TH_A$, ($TH_B$ − QP)/6 )*
If transform_skip_flag[ x0 ][ y0 ][ cIdx ] is equal to 1 and sh_ts_residual_coding_disabled_flag is equal to 0, the Rice parameter cRiceParam is set equal to 1.
Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

Figure 16:
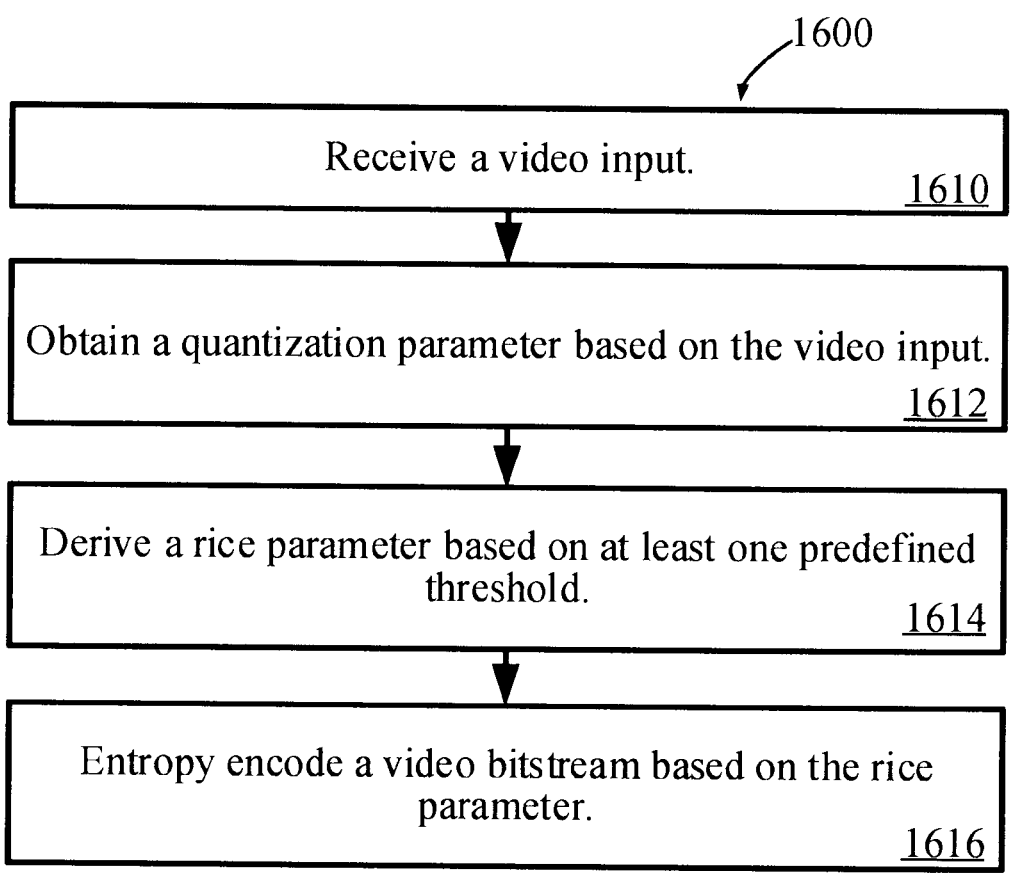
FIG. 16 is a method for encoding a video signal, according to an example of the present disclosure.

FIG. 16 shows a method for video encoding. The method may be, for example, applied to an encoder. In step 1610, the encoder may receive a video input. The video input, for example, may be a live stream. In step 1612, the encoder may obtain a quantization parameter based on the video input. The quantization parameter, for example, may be calculated by the quantization unit in the encoder. In step 1614, the encoder may derive a rice parameter based on at least one predefined threshold, a coding bit-depth, and the quantization parameter. The rice parameter, for example, is used for signaling the syntax of abs_remainder and dec_abs_level. In step 1616 the encoder may entropy encode a video bitstream based on the rice parameter. The video bitstream, for example, may be entropy encode to generate a compressed video bitstream.

In yet another example, it is proposed to only use a fixed value (e.g., 2, 3, 4, 5, 6, 7 or 8) for rice parameter in coding the syntax element of abs_remainder when BitDepth is greater than 10. The fixed value may be different in different condition according to certain coded information of the current block, e.g., quantization parameter. The corresponding decoding process based on VVC Draft is illustrated as below, where TH is a predefined threshold (e.g., 18, 19). The changes to the VVC Draft are shown in Table 50 in bold and italic font. In some embodiments, the same logics can be implemented differently in practice. For example, certain equations, or a look-up table, may also be used to derive the same rice parameters.

TABLE 50

Rice parameter derivation process
The rice parameter cRiceParam is derived as follows:

*If BitDepth is greater than 10, transform_skip_flag[ x0 ][ y0 ][ cIdx ] is equal to 1 and sh_ts_residual_coding_disabled_flag is equal to 0, the derivation process for Rice parameter cRiceParam is specified as below.*
  *rice parameter = Clip3( 1, 8, (TH − QP)/6 )*
If transform_skip_flag[ x0 ][ y0 ][ cIdx ] is equal to 1 and
sh_ts_residual_coding_disabled_flag is equal to 0, the Rice parameter cRiceParam is
set equal to 1.
Otherwise, the rice parameter cRiceParam is derived by invoking the rice parameter
derivation process for abs_remainder[ ] as specified in Table 3 with the variable
baseLevel set equal to 4, the colour component index cIdx, the luma location ( x0, y0 ),
the current coefficient scan location ( xC, yC ), the binary logarithm of the transform
block width log2TbWidth, and the binary logarithm of the transform block height
log2TbHeight as inputs.

In yet another example, the corresponding decoding process based on VVC Draft is illustrated as below, where $TH_A$ and $TH_B$ are predefined thresholds (e.g., $TH_A=8$, $TH_B=18$ or 19). The changes to the VVC Draft are shown in Table 51 in bold and italic font. In some embodiments, the same logics can be implemented differently in practice. For example, certain equations, or a look-up table, may also be used to derive the same rice parameters.

TABLE 51

Rice parameter derivation process
The rice parameter cRiceParam is derived as follows:

*If BitDepth is greater than 10, transform_skip_flag[ x0 ][ y0 ][ cIdx ] is equal to 1 and sh_ts_residual_coding_disabled_flag is equal to 0, the derivation process for Rice parameter cRiceParam is specified as below.*
  *rice parameter = Clip3( 1, BitDepth − $TH_A$, ($TH_B$ − QP)/6 )*
If transform_skip_flag[ x0 ][ y0 ][ cIdx ] is equal to 1 and
sh_ts_residual_coding_disabled_flag is equal to 0, the Rice parameter cRiceParam is
set equal to 1.
Otherwise, the rice parameter cRiceParam is derived by invoking the rice parameter
derivation process for abs_remainder[ ] as specified in Table 3 with the variable
baseLevel set equal to 4, the colour component index cIdx, the luma location ( x0, y0 ),
the current coefficient scan location ( xC, yC ), the binary logarithm of the transform
block width log2TbWidth, and the binary logarithm of the transform block height
log2TbHeight as inputs.

In yet another example, the corresponding decoding process based on VVC Draft is illustrated as below, where TH is a predefined threshold (e.g., 33 or 34). the changes to the VVC Draft are shown in Table 52 in bold and italic font. In some embodiments, the same logics can be implemented differently in practice. For example, certain equations, or a look-up table, may also be used to derive the same rice parameters.

TABLE 52

Rice parameter derivation process

The rice parameter cRiceParam is derived as follows:
- *If BitDepth is greater than 10, transform_skip_flag[ x0 ][ y0 ][ cIdx ] is equal to 1 and sh_ts_residual_coding_disabled_flag is equal to 0, the derivation process for Rice parameter cRiceParam is specified as below.*
  *rice parameter = Clip3( 1, 8, (TH − BitDepth −$QP_{CU}$)/6 )*
- If transform_skip_flag[ x0 ][ y0 ][ cIdx ] is equal to 1 and sh_ts_residual_coding_disabled_flag is equal to 0, the Rice parameter cRiceParam is set equal to 1.
- Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, the corresponding decoding process based on VVC Draft is illustrated as below, where $TH_A$ and $TH_B$ are predefined thresholds (e.g., $TH_A$=8, $TH_B$=33 or 34). The changes to the VVC Draft are shown in Table 53 in bold and italic font. In some embodiments, the same logics can be implemented differently in practice. For example, certain equations, or a look-up table, may also be used to derive the same rice parameters.

TABLE 53

Rice parameter derivation process

The rice parameter cRiceParam is derived as follows:
- *If BitDepth is greater than 10, transform_skip_flag[ x0 ][ y0 ][ cIdx ] is equal to 1 and sh_ts_residual_coding_disabled_flag is equal to 0, the derivation process for Rice parameter cRiceParam is specified as below.*
  *rice parameter = Clip3( 1, BitDepth − $TH_A$, ($TH_B$ − BitDepth −$QP_{CU}$)/6 )*
- If transform_skip_flag[ x0 ][ y0 ][ cIdx ] is equal to 1 and sh_ts_residual_coding_disabled_flag is equal to 0, the Rice parameter cRiceParam is set equal to 1.
- Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In the above the illustrations, the equations used for calculating the specific rice parameters are only used as examples to illustrate the proposed ideas. In some other embodiments, other mapping functions (or equivalently mapping equations) may be applicable to the proposed idea (i.e., determining the rice parameter of the transform skip mode based on coding bit and applied quantization parameter). Meanwhile, in the current VVC design, the value of the applied quantization parameter is allowed to change at coding block group level. Therefore, the proposed rice parameter adjustment scheme can provide flexible adaptation of the rice parameters of the transform skip mode at coding block group level.

Signaling Information for Regular Residual Coding and Transform Skip Residual Coding According to the twenty-eighth aspect of the disclosure, it is proposed to signal a rice parameter of binary codewords for coding certain syntax elements, e.g. abs_remainder in transform skip residual coding, shift and offset parameters for derivation of the rice parameter used for abs_remainder/dec_abs_level in regular residual coding, and determine whether to signal according to certain coded information of the current block, e.g. quantization parameter or coding bit-depth associated with the TB/CB and/or the slice/profile, and/or according to a new flag associated with the TB/CB/slice/picture/sequence level, e.g. sps_residual_coding_info_present_in_sh_flag.

In one example, one control flag is signaled in slice header to indicate whether the signaling of Rice parameter for the transform skip blocks and the signaling of shift and/or offset parameters for derivation of the rice parameter in the transform blocks are enabled or disabled. When the control flag is signaled as enabled, one syntax element is further signaled for each transform skip slice to indicate the Rice parameter of that slice and two syntax elements are further signaled for each transform slice to indicate the shift and/or offset parameters for derivation of Rice parameter of that slice. When the control flag is signaled as disabled (e.g. set equal to "0"), no further syntax element is signaled at lower level to indicate the Rice parameter for the transform skip slice and a default Rice parameter (e.g. 1) is used for all the transform skip slice and no further syntax element is signaled at lower level to indicate the shift and offset parameters for derivation of Rice parameter for the transform slice and default shift and/or offset parameters (e.g. 0) is used for all the transform slice. An example of the corresponding decoding process based on VVC Draft is illustrated as below, where TH is a predefined value (e.g., 0, 1, 2). The changes to the VVC Draft are shown in Table 54 in bold and italic font. In some embodiments, the sh_residual_coding_rice_shift, sh_residual_coding_rice_offset and sh_ts_residual_coding_rice_index can be coded in different ways and/or may have the maximum value. For example, u(n), unsigned integer using n bits, or f(n), fixed-pattern bit string using n bits written (from left to right) with the left bit first, may also be used to encode/decode the same syntax element.

Figure 17:
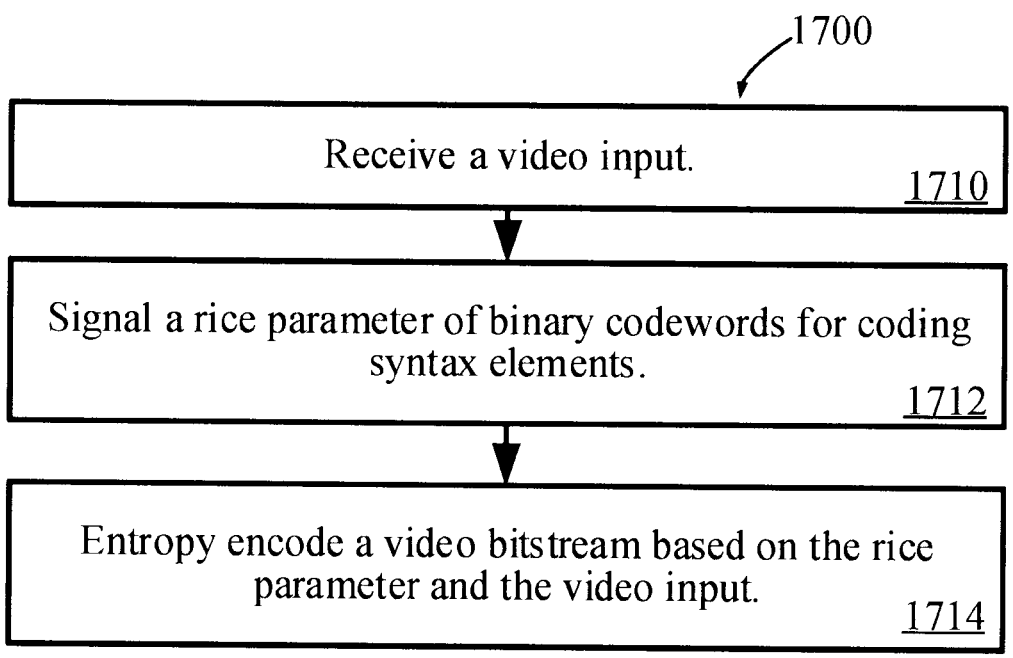
FIG. 17 is a method for encoding a video signal, according to an example of the present disclosure.

FIG. 17 shows a method for video decoding. The method may be, for example, applied to an encoder. In step 1710, the encoder may receive a video input. In step 1712, the encoder may signal a rice parameter of binary codewords for coding syntax elements. The coding syntax elements may include abs_remainder in transform skip residual coding. In step 1714, the encoder may entropy encode a video bitstream based on the rice parameter and the video input.

Slice Header Syntax

TABLE 54

Syntax of residual coding

| | Descriptor |
|---|---|
| slice_header( ) { | |
| ... | |
| if( sps_transform_skip_enabled_flag && | |
| !sh_dep_quant_used_flag && | |
| !sh_sign_data_hiding_used_flag ) | |
| sh_ts_residual_coding_disabled_flag | u(1) |
| *sh_residual_coding_rice_flag* | *u(1)* |
| *if(sh_ts_residual_coding_rice_flag) {* | |
| *sh_residual_coding_rice_shift* | *ue(v)* |
| *sh_residual_coding_rice_offset* | *ue(v)* |
| *if(!sh_ts_residual_coding_disabled_flag)* | |
| *sh_ts_residual_coding_rice_index* | *ue(v)* |
| *}* | |
| ... | | sh_residual_coding_rice_flag equal to 1 specifies that sh_residual_coding_rice_shift, sh_residual_coding_rice_offset, and sh_residual_coding_rice_index could be present in the current slice. sh_residual_coding_rice_flag equal to 0 specifies that sh_residual_coding_rice_shift sh_residual_coding_rice_offset and sh_residual_coding_rice_index are not present in the current slice.

sh_residual_coding_rice_shift specifies the shift parameter used for the Rice parameter derivation process for abs_remainder[ ] and dec_abs_level[ ]. When sh_residual_coding_rice_shift is not present, the value of sh_residual_coding_rice_shift is inferred to be equal to 0.

sh_residual_coding_rice_offset specifies the offset parameter used for the Rice parameter derivation process for abs_remainder[ ] and dec_abs_level[ ]. When sh_residual_coding_rice_offset is not present, the value of sh_residual_coding_rice_offset is inferred to be equal to 0.

sh_ts_residual_coding_rice_index specifies the rice parameter used for the residual_ts_coding( ) syntax structure. When sh_ts_residual_coding_rice_index is not present, the value of sh_ts_residual_coding_rice_index is inferred to be equal to 0.

TABLE 55

Rice parameter derivation process

Binarization process for abs_remainder[ ]
...
The rice parameter cRiceParam is derived as follows:
- *If sh_residual_coding_rice_flag is equal to 1, transform_skip_flag[ x0 ][ y0 ][ cIdx ] is equal to 1 and sh_ts_residual_coding_disabled_flag is equal to 0, the Rice parameter cRiceParam is set equal to (sh_ts_residual_coding_rice_index+TH).*
- If transform_skip_flag[ x0 ][ y0 ][ cIdx ] is equal to 1 and sh_ts_residual_coding disabled flag is equal to 0, the Rice parameter cRiceParam is set equal to 1.
- Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.
...

TABLE 56

Rice parameter derivation process

Rice parameter derivation process for abs_remainder[ ] and dec_abs_level[ ]
Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, the binary logarithm of the transform block height log2TbHeight, *sh_residual_coding_rice_shift, and sh_residual_coding_rice_offset.*
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
  locSumAbs = 0
  if( xC < (1 << log2TbWidth) − 1 ) {
    locSumAbs += AbsLevel[ xC + 1 ][ yC ]
    if( xC < (1 << log2TbWidth) − 2 )
      locSumAbs += AbsLevel[ xC + 2 ][ yC ]
    if( yC < (1 << log2TbHeight) − 1 )
      locSumAbs += AbsLevel[ xC + 1 ][ yC + 1 ]   (1494)
  }
  if( yC < (1 << log2TbHeight) − 1 ) {
    locSumAbs += AbsLevel[ xC ][ yC + 1 ]
    if( yC < (1 << log2TbHeight) − 2 )
      locSumAbs += AbsLevel[ xC ][ yC + 2 ]
  }
  locSumAbs = Clip3( 0, 31, ( (locSumAbs+
  *sh_residual_coding_rice_offset)*>>

TABLE 56-continued

Rice parameter derivation process

*sh_residual_coding_rice_shift*) − baseLevel * 5 )
Given the variable locSumAbs, the Rice parameter cRiceParam is derived specified in Table 4.
*cRiceParam = cRiceParam+ sh_residual_coding_rice_shift*
When baseLevel is equal to 0, the variable ZeroPos[ n ] is derived as follows:
ZeroPos[ n ] = ( QState < 2 ? 1 : 2 ) << cRiceParam In another example, one control flag is signaled in sequence parameter set (or in sequence parameter set range extensions syntax) to indicate whether the signaling of Rice parameter for the transform skip blocks and the signaling of shift and/or offset parameters for derivation of the rice parameter in the transform blocks are enabled or disabled. When the control flag is signaled as enabled, one syntax element is further signaled for each transform skip slice to indicate the Rice parameter of that slice and two syntax elements are further signaled for each transform slice to indicate the shift and/or offset parameters for derivation of Rice parameter of that slice. When the control flag is signaled as disabled (e.g. set equal to "0"), no further syntax element is signaled at lower level to indicate the Rice parameter for the transform skip slice and a default Rice parameter (e.g. 1) is used for all the transform skip slice and no further syntax element is signaled at lower level to indicate the shift and/or offset parameters for derivation of Rice parameter for the transform slice and default shift and/or offset parameters (e.g. 0) is used for all the transform slice. An example of the corresponding decoding process based on VVC Draft is illustrated as below, where TH is a predefined value (e.g., 0, 1, 2). The changes to the VVC Draft are shown in Table 57 in bold and italic font. In some embodiments, the sh_residual_coding_rice_shift, sh_residual_coding_rice_offset, and sh_ts_residual_coding_rice_idx can be coded in different ways and/or may have the maximum value. For example, u(n), unsigned integer using n bits, or f(n), fixed-pattern bit string using n bits written (from left to right) with the left bit first, may also be used to encode/decode the same syntax element.

Sequence Parameter Set RBSP Syntax

TABLE 57

Syntax of residual coding

| | Descriptor |
|---|---|
| seq_parameter_set_rbsp( ) { | |
| ... | |
| sps_sign_data_hiding_enabled_flag | u(1) |
| *sps_residual_coding_info_present_in_sh_flag* | *u(1)* |
| sps_virtual_boundaries_enabled_flag | u(1) |
| ... | |
| } | | sps_residual_coding_info_present_in_sh_flag equal to 1 specifies that sh_residual_coding_rice_shift, sh_residual_coding_rice_offset, and sh_ts_residual_coding_rice_idx could be present in SH syntax structures referring to the SPS. sps_residual_coding_info_present_in_sh_flag equal to 0 specifies that sh_residual_coding_rice_shift sh_residual_coding_rice_offset, and sh_ts_residual_coding_rice_idx are not present in SH syntax structures referring to the SPS. When sps_residual_coding_info_present_in_sh_flag is not present, the value of sps_residual_coding_info_present_in_sh_flag is inferred to be equal to 0.

Slice Header Syntax

TABLE 58

Syntax of residual coding

| | Descriptor |
|---|---|
| slice_header( ) { | |
| ... | |
| if( sps_transform_skip_enabled_flag && | |
| !sh_dep_quant_used_flag && | |
| !sh_sign_data_hiding_used_flag ) | |
| sh_ts_residual_coding_disabled_flag | u(1) |
| *if(sps_ts_residual_coding_rice_enabled_flag)* | |
| { | |
| *sh_residual_coding_rice_shift* | *ue(v)* |
| *sh_residual_coding_rice_offset* | *ue(v)* |
| *if(!sh_ts_residual_coding_disabled_flag)* | |
| *sh_ts_residual_coding_rice_index* | *ue(v)* |
| } | |
| ... | |
| } | | sh_residual_coding_rice_shift specifies the shift parameter used for the Rice parameter derivation process for abs_remainder[ ] and dec_abs_level[ ]. When sh_residual_coding_rice_shift is not present, the value of sh_residual_coding_rice_shift is inferred to be equal to 0.

sh_residual_coding_rice_offset specifies the offset parameter used for the Rice parameter derivation process for abs_remainder[ ] and dec_abs_level[ ]. When sh_residual_coding_rice_offset is not present, the value of sh_residual_coding_rice_offset is inferred to be equal to 0.

sh_ts_residual_coding_rice_idx specifies the rice parameter used for the residual_ts_coding( ) syntax structure. When sh_ts_residual_coding_rice_index is not present, the value of sh_ts_residual_coding_rice_index is inferred to be equal to 0.

TABLE 59

Rice parameter derivation process

Binarization process for abs_remainder[ ]
...
The rice parameter cRiceParam is derived as follows:
- *If sps_ts_residual_coding_info_flag is equal to 1,*
*transform_skip_flag[ x0 ][ y0 ][ cIdx ] is equal to 1 and*
*sh_ts_residual_coding_disabled flag is equal to 0, the Rice parameter cRiceParam is*

TABLE 59-continued

Rice parameter derivation process set equal to (*sh_ts_residual_coding_rice_idx+TH*).
- If transform_skip_flag[ x0 ][ y0 ][ cIdx ] is equal to 1 and
  sh_ts_residual_coding_disabled_flag is equal to 0, the Rice parameter cRiceParam is
  set equal to 1.
- Otherwise, the rice parameter cRiceParam is derived by invoking the rice parameter
  derivation process for abs_remainder[ ] as specified in Table 3 with the variable
  baseLevel set equal to 4, the colour component index cIdx, the luma location ( x0, y0 ),
  the current coefficient scan location ( xC, yC ), the binary logarithm of the transform
  block width log2TbWidth, and the binary logarithm of the transform block height
  log2TbHeight as inputs.
...

TABLE 60

Rice parameter derivation process

Rice parameter derivation process for abs_remainder[ ] and dec_abs_level[ ]
Inputs to this process are the base level baseLevel, the colour
component index cIdx, the luma location ( x0, y0 ) specifying the top-
left sample of the current transform block relative to the top-left
sample of the current picture, the current coefficient scan location
( xC, yC ), the binary logarithm of the transform block width
log2TbWidth, the binary logarithm of the transform block height
log2TbHeight, *sh_residual_coding_rice_shift, and
sh_residual_coding_rice_offset.*
Output of this process is the Rice parameter cRiceParam.
Given the array AbsLevel[ x ][ y ] for the transform block with
component index cIdx and the top-left luma location ( x0, y0 ),
the variable locSumAbs is derived as specified by the following
pseudo code:
   locSumAbs = 0
   if( xC < (1 << log2TbWidth) − 1 ) {
     locSumAbs += AbsLevel[ xC + 1 ][ yC ]
     if( xC < (1 << log2TbWidth) − 2 )
       locSumAbs += AbsLevel[ xC + 2 ][ yC ]
     if( yC < (1 << log2TbHeight) − 1 )
       locSumAbs += AbsLevel[ xC + 1 ][ yC + 1 ]   (1494)
   }
   if( yC < (1 << log2TbHeight) − 1 ) {
     locSumAbs += AbsLevel[ xC ][ yC + 1 ]
     if( yC < (1 << log2TbHeight) − 2 )
       locSumAbs += AbsLevel[ xC ][ yC + 2 ]
   }
   locSumAbs = Clip3( 0, 31, ( (locSumAbs+
   *sh_residual_coding_rice_offset*)>>
   *sh_residual_coding_rice_shift*) − baseLevel * 5 )
Given the variable locSumAbs, the Rice parameter cRiceParam is
derived specified in Table 4.
*cRiceParam = cRiceParam+ sh_residual_coding_rice_shift*
When baseLevel is equal to 0, the variable ZeroPos[ n ] is
derived as follows:
ZeroPos[ n ] = ( QState < 2 ? 1 : 2 ) << cRiceParam In yet another example, one syntax element is signaled for each transform skip slice to indicate the Rice parameter of that slice and two syntax elements are signaled for each transform slice to indicate the shift and/or offset parameters for derivation of Rice parameter of that slice. An example of the corresponding decoding process based on VVC Draft is illustrated as below. The changes to the VVC Draft are shown in Table 61 in bold and italic font. In some embodiments, the sh_residual_coding_rice_shift, sh_residual_coding_rice_offset, and sh_ts_residual_coding_rice_idx can be coded in different ways and/or may have the maximum value. For example, u(n), unsigned integer using n bits, or f(n), fixed-pattern bit string using n bits written (from left to right) with the left bit first, may also be used to encode/decode the same syntax element.

Slice Header Syntax

TABLE 61

Syntax of residual coding

| | Descriptor |
|---|---|
| slice_header( ) { | |
| ... | |
|   if( sps_transform_skip_enabled_flag && | |
|   !sh_dep_quant_used_flag && | |
|     !sh_sign_data_hiding_used_flag ) | |
|     sh_ts_residual_coding_disabled_flag | u(1) |
|   *if(!sh_ts_residual_coding_disabled_flag)* | |
|     *sh_ts_residual_coding_rice_idx* | *ue(v)* |
|   *sh_residual_coding_rice_shift* | *ue(v)* |
|   *sh_residual_coding_rice_offset* | *ue(v)* |
| ... | |
| } | | sh_ts_residual_coding_rice_idx specifies the rice parameter used for the residual_ts_coding( ) syntax structure. When sh_ts_residual_coding_rice_idx is not present, the value of sh_ts_residual_coding_rice_idx is inferred to be equal to 0.

sh_residual_coding_rice_offset specifies the offset parameter used for the Rice parameter derivation process for abs_remainder[ ] and dec_abs_level[ ]. When sh_residual_coding_rice_offset is not present, the value of sh_residual_coding_rice_offset is inferred to be equal to 0.

sh_residual_coding_rice_shift specifies the shift parameter used for the Rice parameter derivation process for abs_remainder[ ] and dec_abs_level[ ]. When sh_residual_coding_rice_shift is not present, the value of sh_residual_coding_rice_shift is inferred to be equal to 0.

TABLE 62

Rice parameter derivation process

Binarization process for abs_remainder[ ]
...
The rice parameter cRiceParam is derived as follows:
- If transform_skip_flag[ x0 ][ y0 ][ cIdx ] is equal to 1 and
  sh_ts_residual_coding_disabled_flag is equal to 0, the Rice parameter cRiceParam is
  set equal to *sh_ts_residual_coding_rice_idx*+1.

TABLE 62-continued

Rice parameter derivation process

- Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.
...

TABLE 63

Rice parameter derivation process

Rice parameter derivation process for abs_remainder[ ] and dec_abs_level[ ]
Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, the binary logarithm of the transform block height log2TbHeight, *sh_residual_coding_rice_shift, and sh_residual_coding_rice_offset.*
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
  locSumAbs = 0
  if( xC < (1 << log2TbWidth) − 1 ) {
    locSumAbs += AbsLevel[ xC + 1 ][ yC ]
    if( xC < (1 << log2TbWidth) − 2 )
      locSumAbs += AbsLevel[ xC + 2 ][ yC ]
    if( yC < (1 << log2TbHeight) − 1 )
      locSumAbs += AbsLevel[ xC + 1 ][ yC + 1 ]   (1494)
  }
  if( yC < (1 << log2TbHeight) − 1 ) {
    locSumAbs += AbsLevel[ xC ][ yC + 1 ]
    if( yC < (1 << log2TbHeight) − 2 )
      locSumAbs += AbsLevel[ xC ][ yC + 2 ]
  }
  locSumAbs = Clip3( 0, 31, ( (locSumAbs+ *sh_residual_coding_rice_offset* )>> *sh_residual_coding_rice_shift* ) − baseLevel * 5 )
Given the variable locSumAbs, the Rice parameter cRiceParam is derived specified in Table 4.
*cRiceParam = cRiceParam+ sh_residual_coding_rice_shift*
When baseLevel is equal to 0, the variable ZeroPos[ n ] is derived as follows:
ZeroPos[ n ] = ( QState < 2 ? 1 : 2 ) << cRiceParam In yet another example, one control flag is signaled in picture parameter set range extensions syntax to indicate whether the signaling of Rice parameter for the transform skip blocks and the signaling of shift and/or offset parameters for derivation of the rice parameter in the transform blocks are enabled or disabled. When the control flag is signaled as enabled, one syntax element is further signaled to indicate the Rice parameter for transform skip residual coding of that picture and two syntax elements are further signaled for regular residual coding to indicate the shift and/or offset parameters for derivation of Rice parameter of that picture. When the control flag is signaled as disabled (e.g. set equal to "0"), no further syntax element is signaled at lower level to indicate the Rice parameter for transform skip residual coding and a default Rice parameter (e.g. 1) is used for all the transform skip residual coding and no further syntax element is signaled at lower level to indicate the shift and/or offset parameters for derivation of Rice parameter for the regular residual coding and default shift and/or offset parameters (e.g. 0) is used for all the regular residual coding. An example of the corresponding decoding process based on VVC Draft is illustrated as below, where TH is a predefined value (e.g. 0, 1, 2). The changes to the VVC Draft are shown in Table 64 in bold and italic font. In some embodiments, the pps_residual_coding_rice_shift, pps_residual_coding_rice_offset, and pps_ts_residual_coding_rice_idx can be coded in different ways and/or may have the maximum value. For example, u(n), unsigned integer using n bits, or f(n), fixed-pattern bit string using n bits written (from left to right) with the left bit first, may also be used to encode/decode the same syntax element.

Picture Parameter Set Range Extensions Syntax

TABLE 64

Syntax of residual coding

| | Descriptor |
|---|---|
| pps_range_extensions( ) { | |
| ... | |
|   *pps_residual_coding_info_flag* | *u(1)* |
|   *if(pps_ts_residual_coding_rice_flag )* | |
|     *pps_residual_coding_rice_shift* | *ue(v)* |
|     *pps_residual_coding_rice_offset* | *ue(v)* |
|     *pps_ts_residual_coding_rice_idx* | *ue(v)* |
| } | |
| ... | | pps_residual_coding_info_flag equal to 1 specifies that pps_residual_coding_rice_shift, pps_residual_coding_rice_offset, and pps_ts_residual_coding_rice_idx could be present in the current picture. pps_residual_coding_info_flag equal to 0 specifies that pps_residual_coding_rice_shift, pps_residual_coding_rice_offset, and pps_ts_residual_coding_rice_idx are not present in the current picture. When pps_residual_coding_info_flag is not present, the value of pps_residual_coding_info_flag is inferred to be equal to 0.

pps_residual_coding_rice_shift specifies the shift parameter used for the Rice parameter derivation process for abs_remainder[ ] and dec_abs_level[ ]. When pps_residual_coding_rice_shift is not present, the value of pps_residual_coding_rice_shift is inferred to be equal to 0.

pps_residual_coding_rice_offset specifies the offset parameter used for the Rice parameter derivation process for abs_remainder[ ] and dec_abs_level[ ]. When pps_residual_coding_rice_offset is not present, the value of pps_residual_coding_rice_offset is inferred to be equal to 0.

pps_ts_residual_coding_rice_idx specifies the rice parameter used for the residual_ts_coding( ) syntax structure. When pps_ts_residual_coding_rice_idx is not present, the value of pps_ts_residual_coding_rice_idx is inferred to be equal to 0.

TABLE 65

Rice parameter derivation process

Binarization process for abs_remainder[ ]
...
The rice parameter cRiceParam is derived as follows:
- If *pps_ts_residual_coding_rice_flag is equal to 1,
  transform_skip_flag[ x0 ][ y0 ][ cIdx ] is equal to 1 and
  sh_ts_residual_coding_disabled_flag is equal to 0, the Rice parameter cRiceParam is
  set equal to (pps_ts_residual_coding_rice_idx+TH).*
- If transform_skip_flag[ x0 ][ y0 ][ cIdx ] is equal to 1 and
  sh_ts_residual_coding_disabled_flag is equal to 0, the Rice parameter cRiceParam is set
  equal to 1.
- Otherwise, the rice parameter cRiceParam is derived by invoking the rice parameter
  derivation process for abs_remainder[ ] as specified in Table 3 with the variable
  baseLevel set equal to 4, the colour component index cIdx, the luma location ( x0, y0 ),
  the current coefficient scan location ( xC, yC ), the binary logarithm of the transfrom
  block width log2TbWidth, and the binary logarithm of the transform block height
  log2TbHeight as inputs.
...

TABLE 66

Rice parameter derivation process

Rice parameter derivation process for abs_remainder[ ] and dec_abs_level[ ]
Inputs to this process are the base level baseLevel, the colour
component index cIdx, the luma location ( x0, y0 ) specifying the top-
left sample of the current transform block relative to the top-left
sample of the current picture, the current coefficient scan location
( xC, yC ), the binary logarithm of the transform block width
log2TbWidth, the binary logarithm of the transform block height
log2TbHeight, *pps_residual_coding_rice_shift, and
pps_residual_coding_rice_offset.*
Output of this process is the Rice parameter cRiceParam.
Given the array AbsLevel[ x ][ y ] for the transform block with
component index cIdx and the top-left luma location ( x0, y0 ),
the variable locSumAbs is derived as specified by the following
pseudo code:
  locSumAbs = 0
  if( xC < (1 << log2TbWidth) − 1 ) {
    locSumAbs += AbsLevel[ xC + 1 ][ yC ]
    if( xC < (1 << log2TbWidth) − 2 )
      locSumAbs += AbsLevel[ xC + 2 ][ yC ]
    if( yC < (1 << log2TbHeight) − 1 )
      locSumAbs += AbsLevel[ xC + 1 ][ yC + 1 ]   (1494)
  }
  if( yC < (1 << log2TbHeight) − 1 ) {
    locSumAbs += AbsLevel[ xC ][ yC + 1 ]
    if( yC < (1 << log2TbHeight) − 2 )
      locSumAbs += AbsLevel[ xC ][ yC + 2 ]
  }
  locSumAbs = Clip3( 0, 31, ( (locSumAbs+
  *pps_residual_coding_rice_offset*)>>
  *pps_residual_coding_rice_shift*) − baseLevel * 5 )
Given the variable locSumAbs, the Rice parameter cRiceParam is
derived specified in Table 4.
*cRiceParam = cRiceParam+ pps_residual_coding_rice_shift*
When baseLevel is equal to 0, the variable ZeroPos[ n ] is
derived as follows:
ZeroPos[ n ] = ( QState < 2 ? 1 : 2 ) << cRiceParam According to the twenty-ninth aspect of the disclosure, it is proposed to use different rice parameters for coding certain syntax elements, e.g. abs_remainder in transform skip residual coding, shift and offset parameters for derivation of the rice parameter used for abs_remainder/dec_abs_level in regular residual coding, and determine which one to use according to certain coded information of the current block, e.g. quantization parameter or coding bit-depth associated with the TB/CB and/or the slice/profile, and/or according to a new flag associated with the TB/CB/slice/picture/sequence level, e.g. sps_residual_coding_info_present_in_sh_flag.

In one example, one control flag is signaled in slice header to indicate whether the derivation process of Rice parameter for the transform skip blocks and the derivation process of shift and/or offset parameters for the rice parameter in the transform blocks are enabled or disabled. When the control flag is signaled as enabled, the Rice parameter may be different in different condition according to certain coded information of the current block, e.g., quantization parameter and bit depth. And the shift and/or offset parameters for derivation of Rice parameter in regular residual coding may be different in different condition according to certain coded information of the current block, e.g., quantization parameter and bit depth. When the control flag is signaled as disabled (e.g., set equal to "0"), a default Rice parameter (e.g., 1) is used for all the transform skip slice and default shift and/or offset parameters (e.g., 0) are used for all the transform slice. An example of the corresponding decoding process based on VVC Draft is illustrated as below, where $TH_A$ and $TH_B$ are predefined thresholds (e.g., $TH_A$=8, $TH_B$=18 or 19). The changes to the VVC Draft are shown in Table 67 in bold and italic font. In some embodiments, the same logics can be implemented differently in practice. For example, certain equations, or a look-up table, may also be used to derive the same rice parameters.

Slice Header Syntax

TABLE 67

Syntax of residual coding

| | Descriptor |
|---|---|
| slice_header( ) {<br>...<br>if( sps_transform_skip_enabled_flag && !sh_dep_quant_used_flag &&<br>!sh_sign_data_hiding_used_flag )<br>   *sh_ts_residual_coding_disabled_flag* | u(1) |

TABLE 67-continued

Syntax of residual coding

| | Descriptor |
|---|---|
| sh_residual_coding_rice_flag | u(1) |
| ... | | sh_residual_coding_rice_flag equal to 1 specifies that bitdepth dependent Rice parameter derivation process is used in the current slice. sh_residual_coding_rice_flag equal to 0 specifies that bitdepth dependent Rice parameter derivation process is not used in the current slice.

TABLE 68

Rice parameter derivation process

Binarization process for abs_remainder[ ]
...
The rice parameter cRiceParam is derived as follows:
- *If sh_residual_coding_rice_flag is equal to 1, transform_skip_flag[ x0 ][ y0 ][ cIdx ]*
  *is equal to 1 and sh_ts_residual_coding_disabled_flag is equal to 0, the Rice*
  *parameter cRiceParam is set equal to Clip3( 1, BitDepth − THA, (THB − QP)/6 ).*
- If transform_skip_flag[ x0 ][ y0 ][ cIdx ] is equal to 1 and
  sh_ts_residual_coding_disabled_flag is equal to 0, the Rice parameter cRiceParam is
  set equal to 1.
- Otherwise, the rice parameter cRiceParam is derived by invoking the rice parameter
  derivation process for abs_remainder[ ] as specified in Table 3 with the variable
  baseLevel set equal to 4, the colour component index cIdx, the luma location ( x0, y0 ),
  the current coefficient scan location ( xC, yC ), the binary logarithm of the transform
  block width log2TbWidth, and the binary logarithm of the transform block height
  log2TbHeight as inputs.
...

TABLE 69

Rice parameter derivation process

Rice parameter derivation process for abs_remainder[ ] and dec_abs_level[ ]
Inputs to this process are the base level baseLevel, the colour
component index cIdx, the luma location ( x0, y0 ) specifying the top-
left sample of the current transform block relative to the top-left
sample of the current picture, the current coefficient scan location
( xC, yC ), the binary logarithm of the transform block width
log2TbWidth, the binary logarithm of the transform block height
log2TbHeight, *sh_residual_coding_rice_flag.*
Output of this process is the Rice parameter cRiceParam.
Given the array AbsLevel[ x ][ y ] for the transform block with
component index cIdx and the top-left luma location ( x0, y0 ),
the variable locSumAbs is derived as specified by the following
pseudo code:
  *ShiftRice = sh_residual_coding_rice_flag ? (BitDepth > 10) ?*
  *Floor(Log2(4 \*(Bitdepth − 10))) : 0 : 0*
  *OffsetRice = sh_residual_coding_rice_flag ? (ShiftRice >*
  *0) ? (1 << (ShiftRice − 1)) : 0 : 0*
  locSumAbs = 0
  if( xC < (1 << log2TbWidth) − 1 ) {
    locSumAbs += AbsLevel[ xC + 1 ][ yC ]
    if( xC < (1 << log2TbWidth) − 2 )
      locSumAbs += AbsLevel[ xC + 2 ][ yC ]
    if( yC < (1 << log2TbHeight) − 1 )
      locSumAbs += AbsLevel[ xC + 1 ][ yC + 1 ]    (1494)
  }
  if( yC < (1 << log2TbHeight) − 1 ) {
    locSumAbs += AbsLevel[ xC ][ yC + 1 ]
    if( yC < (1 << log2TbHeight) − 2 )
      locSumAbs += AbsLevel[ xC ][ yC + 2 ]
  }
  locSumAbs = Clip3( 0, 31, ( ( locSumAbs + *OffsetRice*) >>
  *ShiftRice*) − baseLevel \* 5 )
Given the variable locSumAbs, the Rice parameter cRiceParam is
derived specified in Table 4.

TABLE 69-continued

Rice parameter derivation process

*cRiceParam = cRiceParam+ ShiftRice*
When baseLevel is equal to 0, the variable ZeroPos[ n ] is
derived as follows:
ZeroPos[ n ] = ( QState < 2 ? 1 : 2 ) << cRiceParam In yet another example, the corresponding decoding process based on VVC Draft is illustrated as below, where TH is a predefined threshold (e.g., 18, 19). The changes to the VVC Draft are shown in Table 70 in bold and italic font. In some embodiments, the same logics can be implemented differently in practice. For example, certain equations, or a look-up table, may also be used to derive the same rice parameters.

TABLE 70

Rice parameter derivation process

Binarization process for abs_remainder[ ]
...
The rice parameter cRiceParam is derived as follows:
- *If BitDepth is greater than 10, transform_skip_flag[ x0 ][ y0 ][*
  *cIdx ] is equal to 1 and sh_ts_residual_coding_disabled_flag is*
  *equal to 0, the derivation process for Rice parameter cRiceParam*
  *is specified as below.*
      *rice parameter = Clip3( 1, 8, (TH − QP)/6 )*
- If transform_skip_flag[ x0 ][ y0 ][ cIdx ] is equal to 1 and
  sh_ts_residual_coding_disabled_flag is equal to 0, the Rice
  parameter cRiceParam is set equal to 1.
- Otherwise, the rice parameter cRiceParam is derived by invoking
  the rice parameter derivation process for abs_remainder[ ] as
  specified in Table 3 with the variable baseLevel set equal to 4,
  the colour component index cIdx, the luma location ( x0, y0 ), TABLE 70-continued Rice parameter derivation process the current coefficient scan location ( xC, yC ), the binary
logarithm of the transform block width log2TbWidth, and the binary
logarithm of the transform block height log2TbHeight as inputs.
**Rice parameter derivation process for abs_remainder[ ] and
dec_abs_level[ ]**
Inputs to this process are the base level baseLevel, the colour
component index cIdx, the luma location ( x0, y0 ) specifying the
top-left sample of the current transform block relative to the
top-left sample of the current picture, the current coefficient
scan location ( xC, yC ), the binary logarithm of the transform
block width log2TbWidth, the binary logarithm of the transform
block height log2TbHeight.
Output of this process is the Rice parameter cRiceParam.
Given the array AbsLevel[ x ][ y ] for the transform block with
component index cIdx and the top-left luma location ( x0, y0 ),
the variable locSumAbs is derived as specified by the following
pseudo code:
   *ShiftRice = (BitDepth > 10) ? Floor(Log2(4 \*(Bitdepth − 10))) : 0*
   *OffsetRice = (BitDepth > 10) ? (ShiftRice > 0) ? (1 <<
(ShiftRice − 1)) : 0 : 0*

TABLE 70-continued

Rice parameter derivation process

```
locSumAbs = 0
if( xC < (1 << log2TbWidth) − 1 ) {
  locSumAbs += AbsLevel[ xC + 1 ][ yC ]
  if( xC < (1 << log2TbWidth) − 2 )
    locSumAbs += AbsLevel[ xC + 2 ][ yC ]
  if( yC < (1 << log2TbHeight) − 1 )
    locSumAbs += AbsLevel[ xC + 1 ][ yC + 1 ]   (1494)
}
if( yC < (1 << log2TbHeight) − 1 ) {
  locSumAbs += AbsLevel[ xC ][ yC + 1 ]
  if( yC < (1 << log2TbHeight) − 2 )
    locSumAbs += AbsLevel[ xC ][ yC + 2 ]
}
locSumAbs = Clip3( 0, 31, ( ( locSumAbs + OffsetRice) >>
ShiftRice) − baseLevel * 5 )
```
Given the variable locSumAbs, the Rice parameter cRiceParam is
derived specified in Table 4.
cRiceParam = cRiceParam+ ShiftRice
When baseLevel is equal to 0, the variable ZeroPos[ n ] is
derived as follows:
   ZeroPos[ n ] = ( QState < 2 ? 1 : 2 ) << cRiceParam According to another aspect of the disclosure, it is proposed to add the constraint that the value of these above coding tools flags to provide the same general constraint controls as others in general constraint information.

For example, sps_ts_residual_coding_rice_present_in_sh_flag equal to 1 specifies that sh_ts_residual_coding_rice_idx could be present in SH syntax structures referring to the SPS. sps_ts_residual_coding_rice_present_in_sh_flag equal to 0 specifies that sh_ts_residual_coding_rice_idx is not present in SH syntax structures referring to the SPS.

According to the disclosure, it is proposed to add the syntax element, gci_no_ts_residual_coding_rice_constraint_flag, in the general constraint information syntax to provide the same general constraint controls as other flags. An example of the decoding process on VVC Draft is illustrated below. The changes to the VVC Draft are highlighted. The added parts are highlighted with italic fonts.

| | Descriptor |
|---|---|
| general_constraint_info( ) { | |
| ... | |
|    *gci_no_ts_residual_coding_rice_constraint_flag* | *u(1)* |
| ... | |
| } | |

*gci_no_ts_residual_coding_rice_constraint_flag* equal to 1 specifies that sps_ts_residual_coding_rice present_in_sh_flag shall be equal to 0.
*gci_no_ts_residual_coding_rice_constraint flag* equal to 0 does not impose such a constraint.

In another example, pps_ts_residual_coding_rice_flag equal to 1 specifies that pps_ts_residual_coding_rice_idx could be present in the current picture. pps_ts_residual_coding_rice_flag equal to 0 specifies that pps_ts_residual_coding_rice_idx is not present in the current picture. According to the disclosure, it is proposed to add the syntax element, gci_no_ts_residual_coding_rice_constraint_flag, in the general constraint information syntax to provide the same general constraint controls as other flags. An example of the decoding process on VVC Draft is illustrated below. The changes to the VVC Draft are highlighted. The added parts are highlighted with italic fonts.

| | Descriptor |
|---|---|
| general_constraint_info( ) { | |
| ... | |
|    *gci_no_ts_residual_coding_rice_constraint_flag* | *u(1)* |
| ... | |
| } | |

*gci_no_ts_residual_coding_rice_constraint_flag* equal to 1 specifies that pps_ts_residual_coding_rice_flag shall be equal to 0.
*gci_no_ts_residual_coding_rice_constraint flag* equal to 0 does not impose such a constraint.

In yet another example, sps_rice_adaptation_enabled_flag equal to 1 indicates that Rice parameter for the binarization of abs_remaining[ ] and dec_abs_level may be derived by a formula.

The formula may include: RiceParam=RiceParam+shiftVal and shiftVal=(localSumAbs<Tx[0])?Rx[0]:((localSumAbs<Tx[1])?Rx[1]:((localSumAbs<Tx[2])?Rx[2]:((localSumAbs<Tx[3])?Rx[3]:Rx[4]))), where the lists Tx[ ] and Rx[ ] are specified as follows: Tx[ ]={32, 128, 512, 2048}>>(1523)Rx[ ]={0, 2, 4, 6, 8}

According to the disclosure, it is proposed to add the syntax element, gci_no_rice_adaptation_constraint_flag, in the general constraint information syntax to provide the same general constraint controls as other flags. An example of the decoding process on VVC Draft is illustrated below. The changes to the VVC Draft are highlighted. The added parts are highlighted with italic fonts.

|  | Descriptor |
|---|---|
| general_constraint_info( ) { |  |
| ... |  |
| *gci_no_rice_adaptation_constraint_flag* | *u(1)* |
| ... |  |
| } |  |

*gci_no_rice_adaptation_constraint_flag* equal to 1 specifies that sps_rice_adaptation_enabled_flag shall be equal to 0.
*gci_no_rice_adaptation_constraint flag* equal to 0 does not impose such a constraint.

Since the proposed rice parameter adaptation scheme is only used for transform skip residual coding (TSRC), the proposed method can only take effective when the TSRC is enabled. Correspondingly, in one or more embodiments of the disclosure, it is proposed to add one bit-stream constraint that requires the value of gci_no_rice_adaptation_constraint_flag to be one when the transform skip mode is disabled from general constraint information level, e.g., when the value of gci_no_transform_skip_constraint_flag is set to one.

In yet another example, sps_range_extension_flag equal to 1 specifies that the sps_range_extension( ) syntax structure is present in the SPS RBSP syntax structure. sps_range_extension_flag equal to 0 specifies that this syntax structure is not present. According to the disclosure, it is proposed to add the syntax element, gci_no_range_extension_constraint_flag, in the general constraint information syntax to provide the same general constraint controls as other flags. An example of the decoding process on VVC Draft is illustrated below. The changes to the VVC Draft are highlighted. The added parts are highlighted with italic fonts.

|  | Descriptor |
|---|---|
| general_constraint_info( ) { |  |
| ... |  |
| *gci_no_range_extension_constraint_flag* | *u(1)* |
| ... |  |
| } |  |

*gci_no_range_extension_constraint_flag* equal to 1 specifies that sps_range_extension flag shall be equal to 0. *gci_no_range_extension_constraint_flag* equal to 0 does not impose such a constraint.

FIG. 19 shows a method for video coding according to one example of the present disclosure. The method may be, for example, applied to a decoder. In Step 1902, the decoder may receive a Sequence Parameter Set (SPS) range extension flag that indicates whether a syntax structure, sps_range_extension, is present in Slice Head (SH) Raw Byte Sequence Payload (RBSP) syntax structures based on a value of the SPS range extension flag.

In Step 1904, in response to determining that the value of the SPS range extension flag equals to 1, the decoder may determine that the sps_range_extension is present in the SH RBSP syntax structures.

In Step 1906, in response to determining that the value of the range extension flag equals to 0, the decoder may determine that the sps_range_extension is not present in the SH RBSP syntax structures.

In yet another example, sps_cabac_bypass_alignment_enabled_flag equal to 1 specifies that the value of ivlCurrRange may be aligned prior to bypass decoding of the syntax elements sb_coded_flag[ ][ ], abs_remainder[ ], dec_abs_level[n], and coeff_sign_flag[ ]. sps_cabac_bypass_alignment_enabled_flag equal to 0 specifies that the value of ivlCurrRange is not aligned prior to bypass decoding. According to the disclosure, it is proposed to add the syntax element, gci_no_cabac_bypass_alignment_constraint_flag, in the general constraint information syntax to provide the same general constraint controls as other flags. An example of the decoding process on VVC Draft is illustrated below. The changes to the VVC Draft are highlighted. The added parts are highlighted with italic fonts.

|  | Descriptor |
|---|---|
| general_constraint_info( ) { |  |
| ... |  |
| *gci_no_cabac_bypass_alignment_constraint_flag* | *u(1)* |
| ... |  |
| } |  |

*gci_no_cabac_bypass_alignment_constraint_flag* equal to 1 specifies that sps_cabac_bypass_alignment_enabled_flag shall be equal to 0.

*gci_no_cabac_bypass_alignment_constraint flag equal to 0 does not impose such a constraint.*

Figure 20:
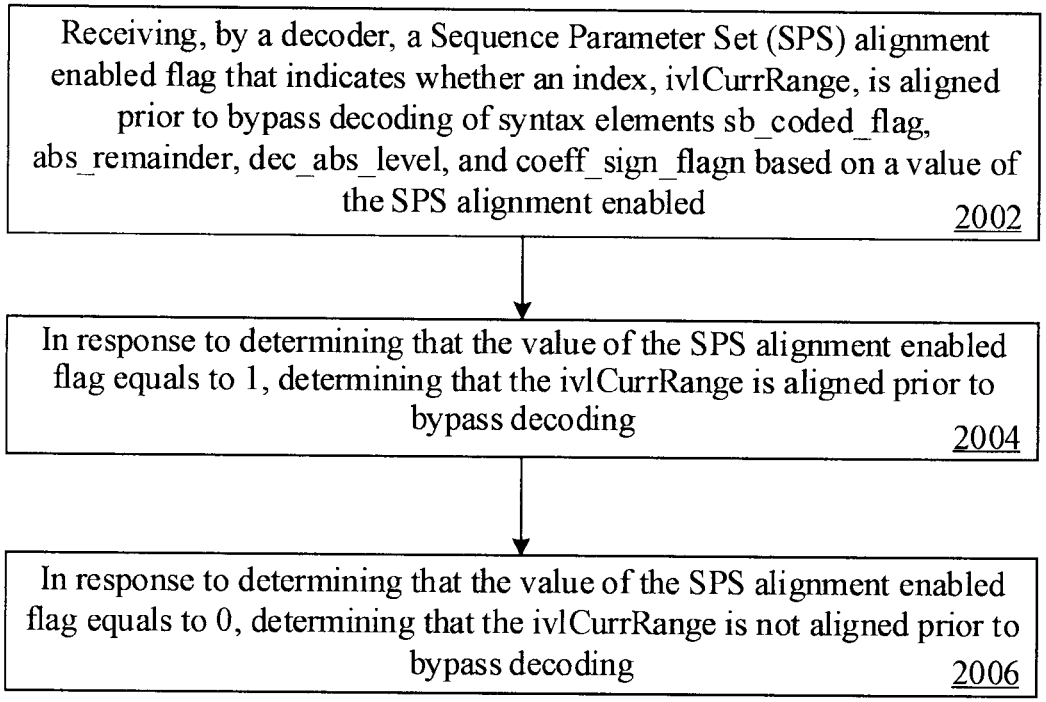
FIG. 20 illustrates a method for video coding, according to an example of the present disclosure.

FIG. 20 shows a method for video coding according to one example of the present disclosure. The method may be, for example, applied to a decoder. In Step 2002, the decoder may receive a Sequence Parameter Set (SPS) alignment enabled flag that indicates whether an index, ivlCurrRange, is aligned prior to bypass decoding of syntax elements sb_coded_flag, abs_remainder, dec_abs_level, and coeff_sign_flagn based on a value of the SPS alignment enabled.

In Step 2004, in response to determining that the value of the SPS alignment enabled flag equals to 1, the decoder may determine that the ivlCurrRange is aligned prior to bypass decoding.

In Step 2006, in response to determining that the value of the SPS alignment enabled flag equals to 0, the decoder may determine that the ivlCurrRange is not aligned prior to bypass decoding.

In yet another example, extended_precision_ processing_flag equal to 1 specifies that an extended dynamic range may be used for transform coefficients and transform processing. extended_precision_processing_flag equal to 0 specifies that the extended dynamic range is not used. According to the disclosure, it is proposed to add the syntax element, gci_no_extended_precision_ processing_constraint_flag, in the general constraint information syntax to provide the same general constraint controls as other flags. An example of the decoding process on VVC Draft is illustrated below. The changes to the VVC Draft are highlighted. The added parts are highlighted with italic fonts.

| | Descriptor |
|---|---|
| general constraint info( ) { | |
| ... | |
| *gci_no_extended_precision_processing_constraint_flag* | *u(1)* |
| ... | |
| } | |

*gci_no_extended_precision_processing_constraint_flag equal to 1 specifies that extended precision processing_flag shall be equal to 0.*
*gci_no_extended precision processing_constraint flag equal to 0 does not impose such a constraint.*

Figure 21:
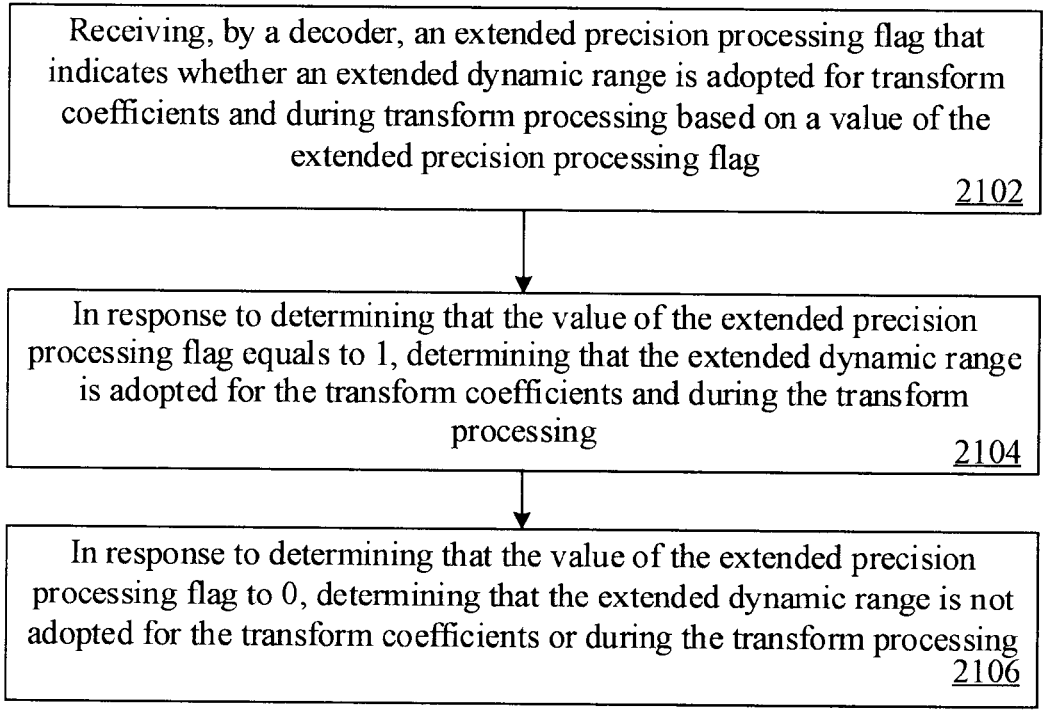
FIG. 21 illustrates a method for video coding, according to an example of the present disclosure.

FIG. 21 shows a method for video coding according to one example of the present disclosure. The method may be, for example, applied to a decoder. In Step 2102, the decoder may receive an extended_precision_processing_flag that indicates whether an extended dynamic range is adopted for transform coefficients and during transform processing based on a value of the extended_precision_processing_flag.

In Step 2104, in response to determining that the value of the extended precision processing flag equals to 1, the decoder may determine that the extended dynamic range is adopted for the transform coefficients and during the transform processing.

In Step 2106, in response to determining that the value of the extended precision processing flag to 0, the decoder may determine that the extended dynamic range is not adopted for the transform coefficients or during the transform processing.

In yet another example, persistent_rice_adaptation_enabled_flag equal to 1 specifies that the Rice parameter derivation for the binarization of abs_remaining[ ] and dec_abs_level may be initialized at the start of each sub-block using mode dependent statistics accumulated from previous sub-blocks. persistent_rice_adaptation_ enabled_flag equal to 0 specifies that no previous sub-block state is used in Rice parameter derivation. According to the disclosure, it is proposed to add the syntax element, gci_no_persistent_rice_adaptation_constraint_flag, in the general constraint information syntax to provide the same general constraint controls as other flags. An example of the decoding process on VVC Draft is illustrated below. The changes to the VVC Draft are highlighted. The added parts are highlighted with italic fonts.

| | Descriptor |
|---|---|
| general_constraint_info( ) { | |
| ... | |
| *gci_no_persistent_rice_adaptation_constraint_flag* | *u(1)* |
| ... | |
| } | |

*gci_no_persistent_rice_adaptation_constraint_flag equal to 1 specifies that persistent_rice_adaptation_enabled_flag shall be equal to 0.*
*gci_no_persistent_rice_adaptation_constraint_flag equal to 0 does not impose such a constraint.*

Figure 22:
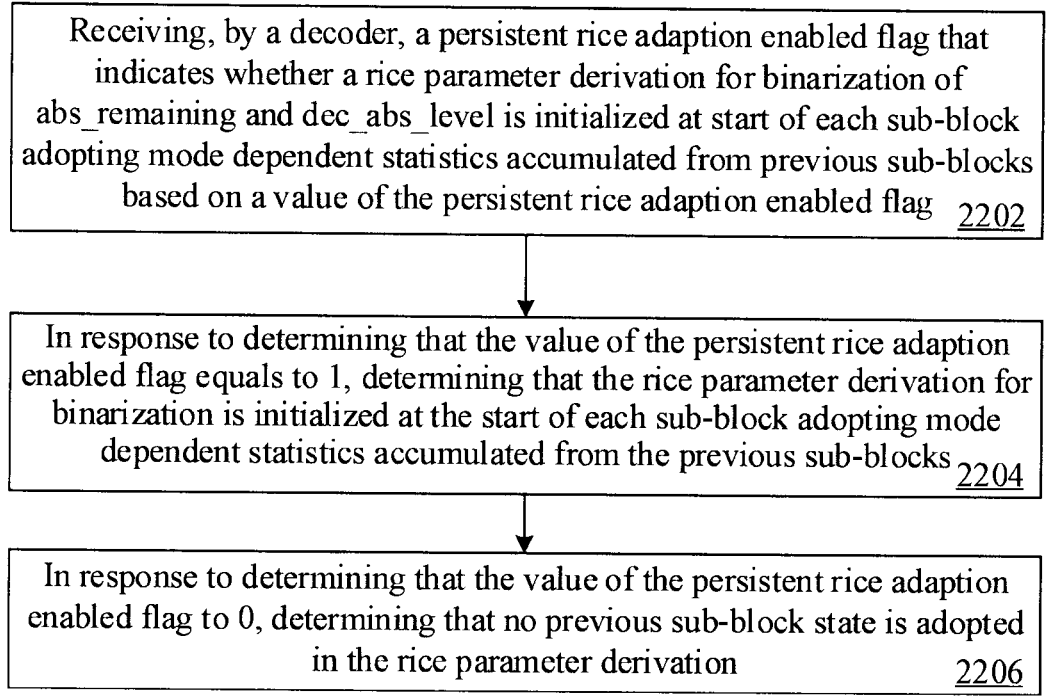
FIG. 22 illustrates a method for video coding, according to an example of the present disclosure.

FIG. 22 shows a method or video coding according to one example of the present disclosure. The method may be, for example, applied to a decoder. In Step 2202, the decoder may receive a persistent rice adaption enabled flag that indicates whether a rice parameter derivation for binarization of abs_remaining and dec_abs_level is initialized at start of each sub-block adopting mode dependent statistics accumulated from previous sub-blocks based on a value of the persistent rice adaption enabled flag.

In Step 2204, in response to determining that the value of the persistent rice adaption enabled flag equals to 1, the decoder may determine that the rice parameter derivation for binarization is initialized at the start of each sub-block adopting mode dependent statistics accumulated from the previous sub-blocks.

In Step 2206, in response to determining that the value of the persistent rice adaption enabled flag to 0, the decoder may determine that no previous sub-block state is adopted in the rice parameter derivation.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Rice Parameter Decision

At the encoder side, TSRC encoding may require multiple encoding passes to derive the best Rice parameter. This multi-pass encoding may not be suitable for practical hardware encoder designs. To solve this problem, a low-delay TSRC encoding method is also proposed. According to the thirtieth aspect of the disclosure, it is proposed to derive Rice parameter according to certain coded information of the current slice, e.g. quantization parameter and/or coding bit-depth associated with the slice/picture/sequence, and/or according to a hash ratio associated with the slice/picture/sequence level. Different methods may be used to derive the Rice parameter, with some exemplar methods listed as follows. In some embodiments, the following methods may be applied independently or jointly.

1. The Rice parameter mentioned in the embodiments above may be additionally dependent on video resolution, including both temporal resolution (e.g., frame rate) and spatial resolution (e.g., picture width and height) of the video.
2. The Rice parameter may vary at sequence level, picture level, slice level and/or any predefined region. In one specific example, different Rice values are used for pictures with different temporal layer IDs (which is related to the nuh_temporal_id_plus1 specified in VVC specification). Alternatively, Rice parameter may include a value determined based on the QP values used at sequence level, picture level, slice level and/or any predefined region. For example, rice parameter=Clip3 (1, 8, (TH−QP)/6), where TH is a predefined threshold (e.g. 18, 19).
3. The Rice parameter may be set as a default value, e.g., 1, according to the change of coded information between the current slice and previous slice. In one specific example, default Rice value is used for pictures when its temporal layer ID is changed compared to previous picture. Alternatively, default Rice value is used for pictures when ΔQ is larger than TH, where ΔQ is calculated as abs(QPcurrent−QPprevious) and TH is a predefined threshold. Rice parameter (e.g., 0, 5). For example, Rice parameter=1 when the hash ratio form Intra Block Copy mode in current slice is larger than TH, where TH is a predefined threshold, e.g., Max (41*(number of CTUs), 4200).
4. Rice parameter for each slice based on the values of abs_remainder that are coded in its preceding slice according to the coding order. In one specific example, after one slice is coded, the number of bins for the binarization of abs_remainder using different Rice parameters are computed which are then used to determine the Rice parameter of the following slice. For example, the Rice parameter which achieves the minimal bin number in the preceding slice will be selected for current slice. For another example, if the current slice and its preceding slice use one same QP, the Rice parameter which achieves the minimal bin number in the preceding slice will be selected for current slice; otherwise, the number of bins generated using the default Rice parameter (i.e., 1) in the preceding slice is scaled by TH before being compared with other Rice parameters and the Rice parameter which leads to the minimal number of bins will be selected for current slice, where TH is a predefined threshold, e.g. 0.9.
5. Rice parameter for each slice based on the values of abs_remainder that are coded in its preceding slice according to the coding order and the Rice parameter may be adjusted according to the change of coded information between the current slice and previous slice. In one specific example, the Rice parameter which achieves the minimal bin number in the preceding slice will be selected for current slice. And the Rice value may be adjusted when ΔQ is larger than TH, where ΔQ is calculated as abs(QPcurrent−QPprevious) and TH is a predefined threshold. Rice parameter (e.g., 0, 5). The adjustment may be adding a predefined offset (e.g., +1, −1) or scaling by a predefined value.

Figure 26:
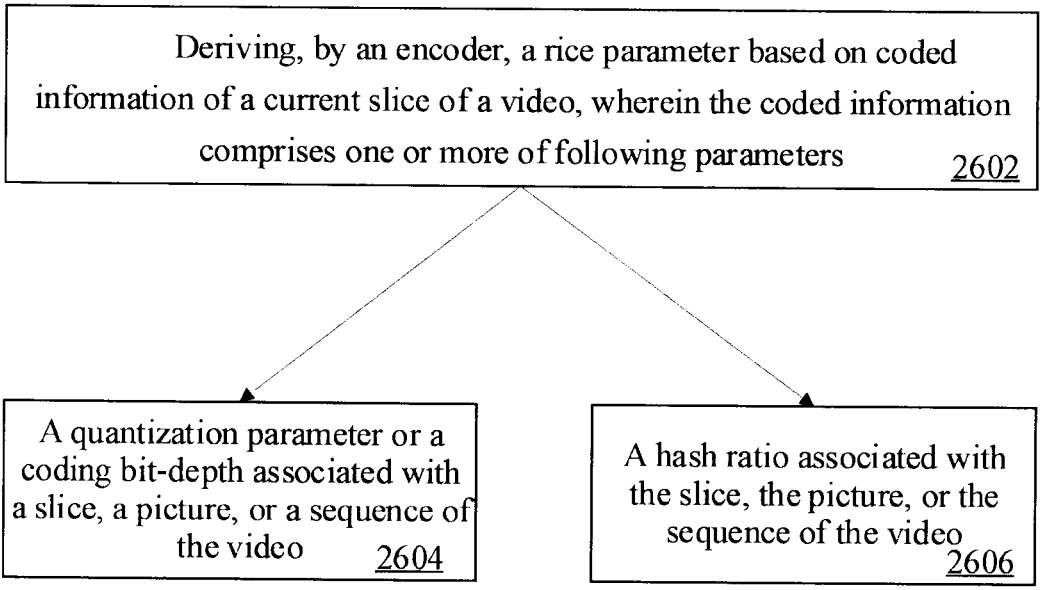
FIG. 26 illustrates a low-delay transform skip residual coding (TSRC) method according to an example of the present disclosure.

FIG. 26 shows a flow chart of a low-delay transform skip residual coding (TSRC) method according to one example of the present disclosure. The method may be, for example, applied to an encoder. In Step 2602, the encoder may derive a rice parameter based on coded information of a current slice of a video. The coded information may include one or more of the following parameters: a quantization parameter or a coding bit-depth associated with a slice, a picture, or a sequence of the video; or a hash ratio associated with the slice, the picture, or the sequence of the video.

In some embodiments, the above encoder methods may be applied in decoder side. In one specific example, the Rice parameter does not need to be signaled to decoder and encoder/decoder use the same method to derive the Rice parameter.

FIG. 18 shows a computing environment 1810 coupled with a user interface 1860. The computing environment 1810 can be part of a data processing server. The computing environment 1810 includes processor 1820, memory 1840, and I/O interface 1850.

The processor 1820 typically controls overall operations of the computing environment 1810, such as the operations associated with the display, data acquisition, data communications, and image processing. The processor 1820 may include one or more processors to execute instructions to perform all or some of the steps in the above-described methods. Moreover, the processor 1820 may include one or more modules that facilitate the interaction between the processor 1820 and other components. The processor may be a Central Processing Unit (CPU), a microprocessor, a single chip machine, a GPU, or the like.

The memory 1840 is configured to store various types of data to support the operation of the computing environment

1810. Memory 1840 may include predetermine software 1842. Examples of such data include instructions for any applications or methods operated on the computing environment 1810, video datasets, image data, etc. The memory 1840 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1850 provides an interface between the processor 1820 and peripheral interface modules, such as a keyboard, a click wheel, buttons, and the like. The buttons may include but are not limited to, a home button, a start scan button, and a stop scan button. The I/O interface 1850 can be coupled with an encoder and decoder.

In some embodiments, there is also provided a non-transitory computer-readable storage medium comprising a plurality of programs, such as comprised in the memory 1840, executable by the processor 1820 in the computing environment 1810, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 1810 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

Figure 23:
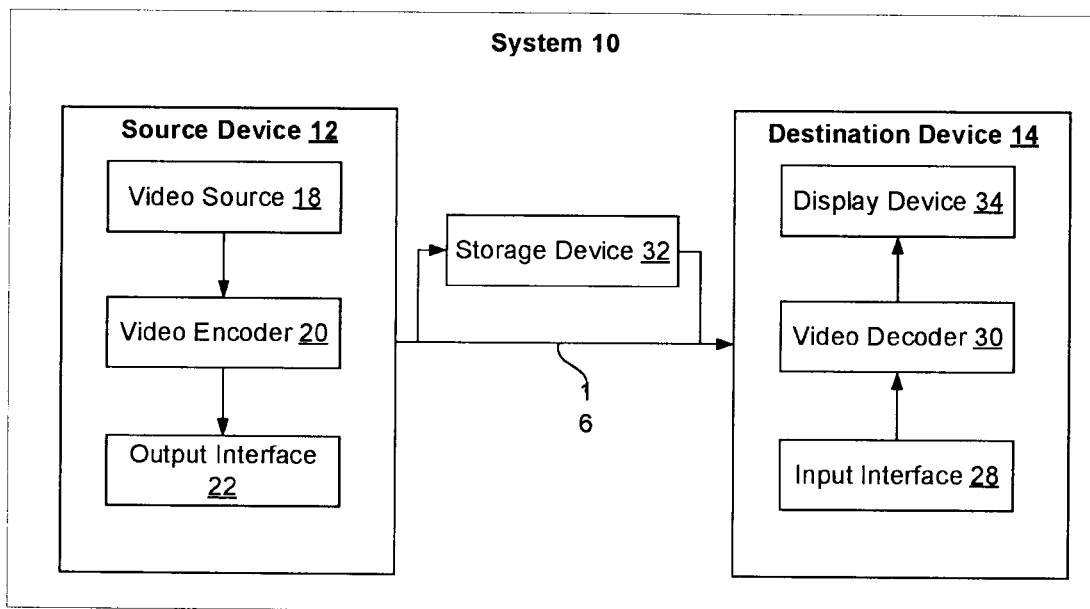
FIG. 23 is a block diagram illustrating an exemplary system for encoding and decoding video blocks according to an example of the present disclosure.

FIG. 23 is a block diagram illustrating an exemplary system 10 for encoding and decoding video blocks in parallel in accordance with some implementations of the present disclosure. As shown in FIG. 23, the system 10 includes a source device 12 that generates and encodes video data to be decoded at a later time by a destination device 14. The source device 12 and the destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may comprise any type of communication medium or device capable of moving the encoded video data from the source device 12 to the destination device 14. In one example, the link 16 may comprise a communication medium to enable the source device 12 to transmit the encoded video data directly to the destination device 14 in real time. The encoded video data may be modulated according to a communication standard, such as a wireless communication protocol, and transmitted to the destination device 14. The communication medium may comprise any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 23, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may comprise any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 24:
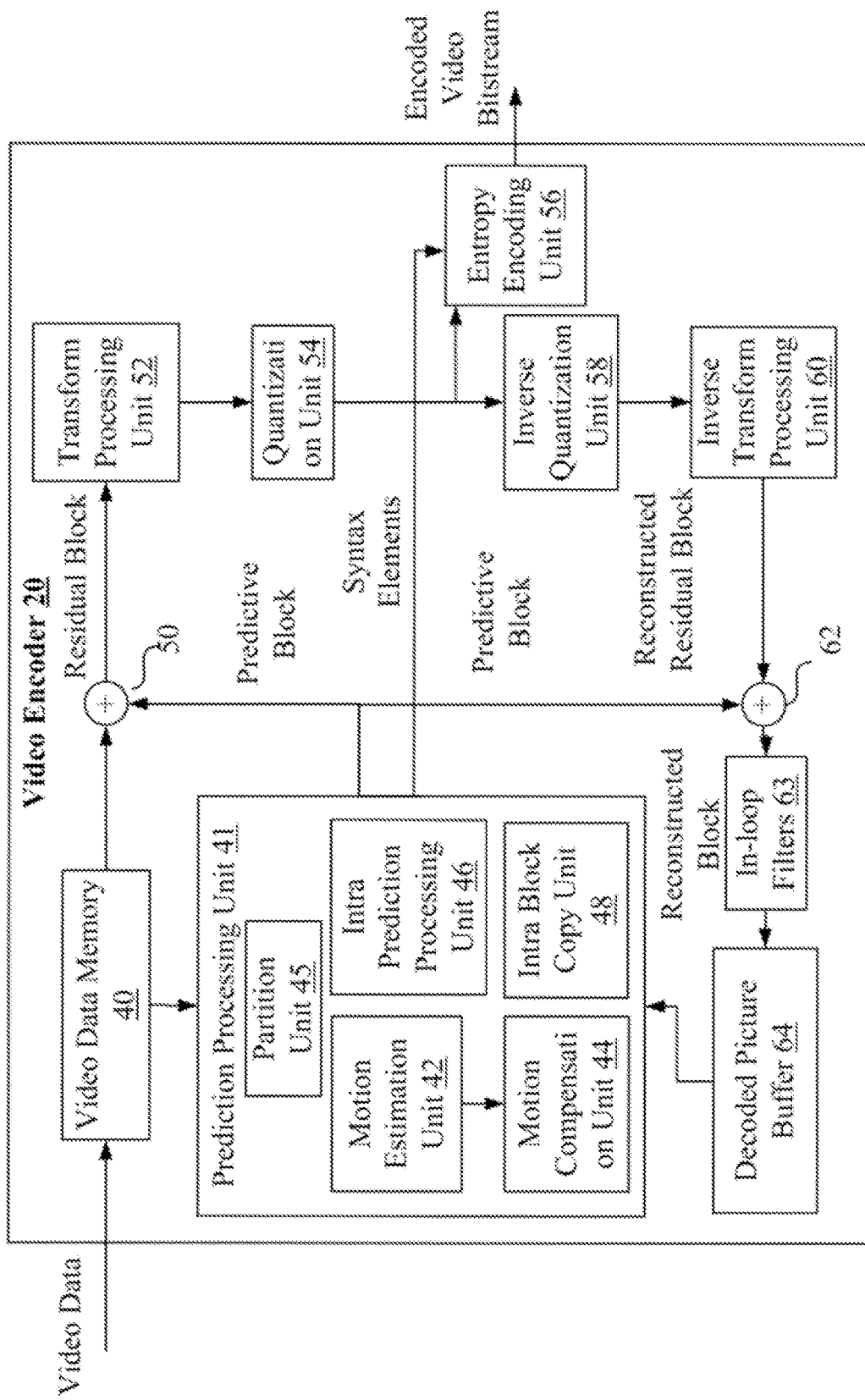
FIG. 24 is a block diagram illustrating an exemplary video encoder according to an example of the present disclosure.

FIG. 24 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. The term "frame" may be used as synonyms for the term "image" or "picture" in the field of video coding.

As shown in FIG. 24, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove blockiness artifacts from reconstructed video. Another in-loop filter, such as Sample Adaptive Offset (SAO) filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 23. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 24, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning or Triple-Tree (TT) partitioning or any combination thereof. The term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g., a Coding Tree Block (CTB), a Coding Block (CB), a Prediction Block (PB) or a Transform Block (TB) and/or to a sub-block.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a video block within a current video frame or picture relative to a predictive block within a reference frame relative to the current block being coded within the current frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or a different frame according to inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more TUs and is provided to the transform processing unit 52. The transform processing unit 52 transforms the residual video data into residual transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding or another entropy encoding methodology or technique. The encoded bitstream may then be transmitted to the video decoder 30 as shown in FIG. 23, or archived in the storage device 32 as shown in FIG. 23 for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

Figure 25:
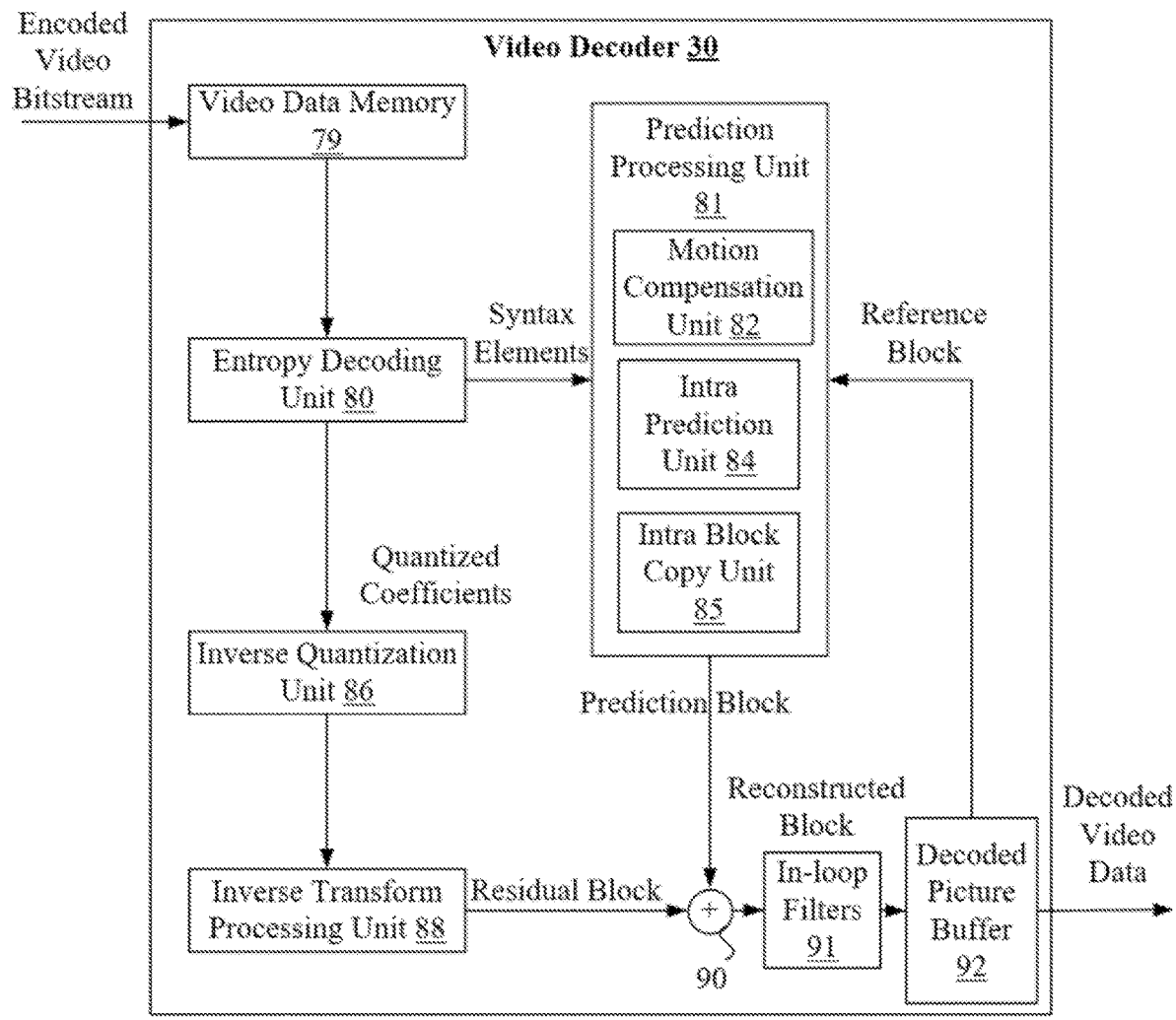
FIG. 25 is a block diagram illustrating an exemplary video decoder according to an example of the present disclosure.

FIG. 25 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 24. For example, the motion compensation unit 82 may generate prediction data based on motion vectors received from the entropy decoding unit 80, while the intra-prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 25. In some embodiments, the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 such as deblocking filter, SAO filter and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 23.

The description of the present disclosure has been presented for purposes of illustration and is not intended to be exhaustive or limited to the present disclosure. The modifications, variations, and alternative implementations made based on the principle of the present disclosure have the benefit of the teachings presented in the foregoing descriptions and the associated drawings.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video decoding, comprising: in response to determining that transform skip is disabled, determining, by a decoder, that a syntax element related to a rice parameter for transform skip residual coding is not present; and
adopting a flag of transform skip, sps_transform_skip_enabled_flag, to condition a presence of flag sps_ts_residual_coding_rice_present_in_sh_flag.

2. The method for video decoding of claim 1, further comprising: in response to determining that the flag, sps_transform_skip_enabled_flag, is equal to 0 indicating that the transform skip is disabled, inferring the sps_ts_residual_coding_rice_present_in_sh_flag to be 0 and not signaled.

3. The method for video decoding of claim 1, further comprising: in response to determining that the flag, sps_transform_skip_enabled_flag, is equal to 1 indicating that the transform skip is not disabled, receiving the sps_ts_residual_coding_rice_present_in_sh_flag.

4. The method for video decoding of claim 1, further comprising:
in response to determining that a flag of transform skip, sps_transform_skip_enabled_flag, is signaled as enabled, receiving a control flag, in a sequence parameter set or in a sequence parameter set range extension syntax, to indicate whether the syntax element related to the rice parameter for transform skip residual coding is present or not.

5. The method for video decoding of claim 4, further comprising:
in response to determining that the control flag is equal to 1, receiving one syntax element for a slice to determine the rice parameter for transform skip residual coding.

6. The method for video decoding of claim 4, further comprising:
in response to determining that the control flag is equal to 0, adopting a default rice parameter for a slice, and no further syntax element is signaled to indicate the rice parameter for transform skip residual coding.

7. The method for video decoding of claim 1, further comprising: in response to determining that sps_ts_residual_coding_rice_present_in_sh_flag is equal to 1, determining that an index, sh_ts_residual_coding_rice_idx_minus1, is present in slice header (SH) syntax structures referring to Sequence Parameter Set (SPS).

8. The method for video decoding of claim 1, further comprising: in response to determining that sps_ts_residual_coding_rice_present_in_sh_flag is equal to 0, determining that an index, sh_ts_residual_coding_rice_idx_minus1, is not present in slice header (SH) syntax structures referring to Sequence Parameter Set (SPS).

9. The method for video decoding of claim 1, further comprising: in response to determining that sps_ts_residual_coding_rice_present_in_sh_flag is not present, inferring a value of sps_ts_residual_coding_rice_present_in_sh_flag to be 0.

10. An apparatus for video decoding, comprising:
one or more processors; and
a memory configured to store instructions executable by the one or more processors; wherein
the one or more processors, upon execution of the instructions, are configured to perform operations comprising:
in response to determining that transform skip is disabled, determine that a syntax element related to a rice parameter for transform skip residual coding is not present; and
adopting a flag of transform skip, sps_transform_skip_enabled_flag, to condition a presence of flag sps_ts_residual_coding_rice_present_in_sh_flag.

11. The apparatus of claim 10, wherein the one or more processors, upon execution of the instructions, are further configured to: in response to determining that the flag, sps_transform_skip_enabled_flag, is equal to 0 indicating that the transform skip is disabled, infer the sps_ts_residual_coding_rice_present_in_sh_flag to be 0 and not signaled.

12. The apparatus of claim 10, wherein the one or more processors, upon execution of the instructions, are further configured to: in response to determining that the flag, sps_transform_skip_enabled_flag, is equal to 1 indicating that the transform skip is not disabled, receive the sps_ts_residual_coding_rice_present_in_sh_flag.

13. The apparatus of claim 10, wherein the one or more processors, upon execution of the instructions, are further configured to:
in response to determining that a flag of transform skip, sps_transform_skip_enabled_flag, is signaled as enabled, receive a control flag, in a sequence parameter set or in a sequence parameter set range extension syntax, to indicate whether the syntax element related to the rice parameter for transform skip residual coding is present or not.

14. A non-transitory computer-readable storage medium storing a bitstream to be decoded by a decoding method, wherein the decoding method comprises:
in response to determining that transform skip is disabled, determining that a syntax element related to a rice parameter for transform skip residual coding is not present; and
adopting a flag of transform skip, sps_transform_skip_enabled_flag, to condition a presence of flag sps_ts_residual_coding_rice_present_in_sh_flag.

15. A non-transitory computer-readable storage medium of claim 14, wherein the decoding method further comprises: in response to determining that the flag, sps_transform_skip_enabled_flag, is equal to 0 indicating that the transform skip is disabled, inferring the sps_ts_residual_coding_rice_present_in_sh_flag to be 0 and not signaled.

16. A non-transitory computer-readable storage medium of claim 14, wherein the decoding method further comprises: in response to determining that the flag, sps_transform_skip_enabled_flag, is equal to 1 indicating that the transform skip is not disabled, receiving the sps_ts_residual_coding_rice_present_in_sh_flag.

17. A method for transmitting a bitstream, comprising:
generating a bitstream by performing an encoding method; and
transmitting the bitstream,
wherein the encoding method comprises:
when transform skip is disabled, not signaling a syntax element related to a rice parameter for transform skip residual coding; and
adopting a flag of transform skip, sps_transform_skip_enabled_flag, to condition a presence of flag sps_ts_residual_coding_rice_present_in_sh_flag.

* * * * *